(12) United States Patent
Ritter et al.

(10) Patent No.: US 11,520,150 B2
(45) Date of Patent: Dec. 6, 2022

(54) DEVICE COMPRISING OPTICAL ELEMENTS OF SELECTED REFRACTIVE INDEX

(71) Applicant: SCHOTT AG, Mainz (DE)

(72) Inventors: Simone Monika Ritter, Mainz (DE); Antoine Carré, Mainz (DE); Peter Naß, Mainz (DE); Frank-Thomas Lentes, Bingen (DE)

(73) Assignee: SCHOTT AG, Mainz (DE)

( * ) Notice: Subject to any disclaimer, the term of this patent is extended or adjusted under 35 U.S.C. 154(b) by 247 days.

(21) Appl. No.: 17/035,241

(22) Filed: Sep. 28, 2020

(65) Prior Publication Data

US 2021/0096376 A1    Apr. 1, 2021

(30) Foreign Application Priority Data

Sep. 27, 2019  (EP) .................................. 19200294

(51) Int. Cl.
*G02B 27/01*    (2006.01)
*G06F 3/01*    (2006.01)

(52) U.S. Cl.
CPC ......... *G02B 27/0172* (2013.01); *G06F 3/013* (2013.01)

(58) Field of Classification Search
CPC ................ G06F 3/013; G02B 27/0172; G02B 2027/0178
See application file for complete search history.

(56) References Cited

U.S. PATENT DOCUMENTS

| 2008/0278823 | A1 | 11/2008 | Peuchert |
| 2014/0168260 | A1 | 6/2014 | O'Brien |
| 2017/0235142 | A1 | 8/2017 | Wall |
| 2017/0283305 | A1 | 10/2017 | Brocheton |
| 2017/0322418 | A1* | 11/2017 | Lin .......................... G02B 5/30 |
| 2018/0186689 | A1 | 7/2018 | Melli |
| 2018/0231702 | A1* | 8/2018 | Lin ...................... G02B 5/1809 |
| 2018/0348522 | A1 | 12/2018 | Young |
| 2021/0141130 | A1* | 5/2021 | Lee ..................... G02B 27/0172 |
| 2022/0113313 | A1* | 4/2022 | Daaboul .......... G01N 33/57488 |
| 2022/0115564 | A1* | 4/2022 | Jeon ....................... H01L 33/505 |

FOREIGN PATENT DOCUMENTS

| CN | 109239842 | 1/2019 |
| DE | 102007022048 | 11/2008 |
| EP | 2887128 | 6/2015 |
| WO | 2017176861 | 10/2017 |
| WO | 2018052868 | 3/2018 |

OTHER PUBLICATIONS

ASTM F534.
ASTM F657.
ASTM C693-93 (reapproved 2008).

* cited by examiner

*Primary Examiner* — Christopher E Leiby
(74) *Attorney, Agent, or Firm* — Ruggiero McAllister & McMahon LLC

(57) ABSTRACT

The present disclosure relates to a device, in particular an augmented reality device. In particular, the disclosure relates to a device, a kit, a process for making the device, and a process for making a visual impression.

18 Claims, 7 Drawing Sheets

DEVICE COMPRISING OPTICAL ELEMENTS OF SELECTED REFRACTIVE INDEX

CROSS-REFERENCE TO RELATED APPLICATION

The present application claims the benefit of European Patent Application No. 19200294.7, filed on Sep. 27, 2019, which is herein incorporated by reference.

BACKGROUND OF THE DISCLOSURE

1. Field of the Disclosure

In general, the present disclosure relates to a device, in particular an augmented reality device. In particular, the disclosure relates to a device, a kit, a process for making the device, and a process for making a visual impression.

2. Discussion of the Related Art

Augmented reality is a high activity technological area serving a range of use areas, such as entertainment, medical, educational, construction and transport, to name just a few examples. By contrast to the related area of virtual reality, augmented reality centers on a close integration of multimedia information with real world sensory input, typically by selectively overlaying a digital image onto a spectacle window. Technical challenges arise from the simultaneous requirements of a good real world image, a good overlaid image along with good wearability. One approach to an augmented reality device is presented in International patent application number 2017/176861A1. That document teaches a system in which an overlaid image is coupled into a wearable screen and propagated in a transverse direction. A requirement still exists for improved devices for augmented reality.

SUMMARY OF THE DISCLOSURE

It is an object to overcome at least one of the challenges encountered in the state of the art in relation to augmented reality devices or virtual reality devices, in particular in relation to propagation of an image in an optical body.

It is an object to provide a device, preferably an augmented reality device or a virtual reality device, having an improved transmission.

It is an object to provide a device, preferably an augmented reality device or a virtual reality device, having an improved field of view.

It is an object to provide a device, preferably an augmented reality device or a virtual reality device, having an reduced weight.

It is an object to provide a device, preferably an augmented reality device or a virtual reality device, having an improved color balance.

It is an object to provide a device, preferably an augmented reality device or a virtual reality device, simultaneously having two or more improvements selected from the group consisting of: improved transmission, improved field of view, reduced weight and improved color balance.

DETAILED DESCRIPTION OF THE DISCLOSURE

Figure 1:
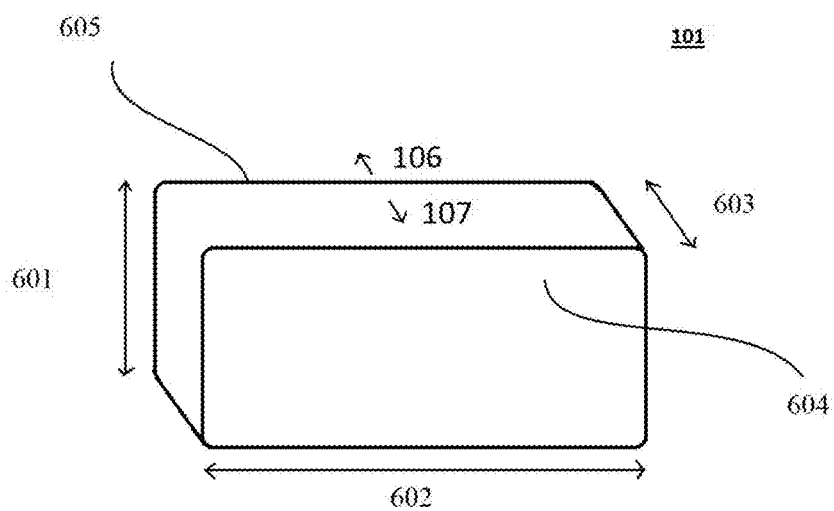
FIG. 1 shows a substrate employed in the present disclosure.

A contribution is made to at least partially overcoming at least one of the above-mentioned objects by the embodiments of the present disclosure. In the following, the $X^{th}$ embodiment number is denoted as |X|.

|1| A device comprising:
  a. a grouping of x optical elements, each optical element having a front face and a back face, the x optical elements being arranged in a stack from first to last in which the front face of an optical element faces the back face of the next optical element, and
  b. a spacer region made of a material having a refractive index below 1.4 for vacuum wavelengths in the range from 400 to 760 nm located between each pair of adjacent optical elements,
wherein:
  x is an integer at least 3,
  the grouping of x optical elements comprises a first R-type optical element, a first G-type optical element and a first B-type optical element,
  $R_{610}$ is the refractive index of the first R-type optical element for light of vacuum wavelength 610 nm;
  $R_{760}$ is the refractive index of the first R-type optical element for light of vacuum wavelength 760 nm;
  $G_{500}$ is the refractive index of the first G-type optical element for light of vacuum wavelength 500 nm;
  $G_{610}$ is the refractive index of the first G-type optical element for light of vacuum wavelength 610 nm;
  $B_{400}$ is the refractive index of the first B-type optical element for light of vacuum wavelength 400 nm;
  $B_{500}$ is the refractive index of the first B-type optical element for light of vacuum wavelength 500 nm;
  $n_0$ is the minimum selected from $R_{760}$; $G_{610}$ and $B_{500}$;
  $\delta$ is the difference between $n_0$ and the maximum selected from $R_{610}$; $G_{500}$ and $B_{400}$;
  $n_0$ is in the range from 1.550 to 2.500
  $\delta$ is equal to or less than 0.200.

In one aspect of this embodiment, $n_0$ is at least 1.550. In one aspect of this embodiment, $n_0$ is at least 1.600. In one aspect of this embodiment, $n_0$ is at least 1.650. In one aspect of this embodiment, $n_0$ is at least 1.700. In one aspect of this embodiment, $n_0$ is at least 1.750. In one aspect of this embodiment, $n_0$ is at least 1.800. In one aspect of this embodiment, $n_0$ is at least 1.825. In one aspect of this embodiment, $n_0$ is at least 1.850. In one aspect of this embodiment, $n_0$ is at least 1.875. In one aspect of this embodiment, $n_0$ is at least 1.900. In one aspect of this embodiment, no is at least 1.925. In one aspect of this embodiment, $n_0$ is at least 1.950. In one aspect of this embodiment, $n_0$ is at least 1.960. In one aspect of this embodiment, $n_0$ is at least 1.97. In one aspect of this embodiment, $n_0$ is at least 1.975. In one aspect of this embodiment, $n_O$ is at least 1.980. In one aspect of this embodiment, $n_O$ is at least 1.990. In one aspect of this embodiment, $n_O$ is at least 2.000. In one aspect of this embodiment, $n_O$ is at least 2.025. In one aspect of this embodiment, no is at least 2.050. In one aspect of this embodiment, $n_O$ is at least 2.075. In one aspect of this embodiment, $n_O$ is at least 2.100. In one aspect of this embodiment, $n_O$ is at least 2.150. In one aspect of this embodiment, $n_O$ is at least 2.200. In one aspect of this embodiment, $n_O$ is at least 2.250. In one aspect of this embodiment, $n_O$ is at least 2.300. In one aspect of this embodiment, $n_O$ is at least 2.350. In one aspect of this embodiment, $n_O$ is at least 2.400. In one aspect of this embodiment, no is at most 2.500. In one aspect of this embodiment, $n_O$ is at most 2.400. In one aspect of this embodiment, $n_O$ is at most 2.300. In one aspect of this embodiment, $n_O$ is at most 2.200. In one aspect of this embodiment, $n_O$ is at most 2.100. In one aspect of this embodiment, $n_O$ is at most 2.000. In one aspect of this embodiment, $n_O$ is at most 1.950. In one aspect of this embodiment, $n_O$ is at most 1.900. In one aspect of this embodiment, $n_O$ is at most 1.850. In one aspect of this embodiment, $n_O$ is at most 1.800. In one aspect of this embodiment, $n_O$ is at most 1.750. In one aspect of this embodiment, $n_O$ is at most 1.700. In one aspect of this embodiment, $n_O$ is at most 1.650. In one aspect of this embodiment, $n_O$ is at most 1.600. In one aspect of this embodiment, $n_O$ is at most 1.550.

In one aspect of this embodiment, δ is at least 0.010. In one aspect of this embodiment, δ is at least 0.020. In one aspect of this embodiment, δ is at least 0.030. In one aspect of this embodiment, δ is at least 0.040. In one aspect of this embodiment, δ is at least 0.050. In one aspect of this embodiment, δ is at least 0.060. In one aspect of this embodiment, δ is at least 0.070. In one aspect of this embodiment, δ is at least 0.080. In one aspect of this embodiment, δ is at least 0.090. In one aspect of this embodiment, δ is at least 0.100. In one aspect of this embodiment, δ is at least 0.110. In one aspect of this embodiment, δ is at least 0.120. In one aspect of this embodiment, δ is at least 0.130. In one aspect of this embodiment, δ is at least 0.140. In one aspect of this embodiment, δ is at least 0.150. In one aspect of this embodiment, δ is at least 0.160. In one aspect of this embodiment, δ is at least 0.170. In one aspect of this embodiment, δ is at least 0.180. In one aspect of this embodiment, δ is at least 0.190. In one aspect of this embodiment, δ is at most 0.200. In one aspect of this embodiment, δ is at most 0.190. In one aspect of this embodiment, δ is at most 0.180. In one aspect of this embodiment, δ is at most 0.170. In one aspect of this embodiment, δ is at most 0.160. In one aspect of this embodiment, δ is at most 0.15. In one aspect of this embodiment, δ is at most 0.140. In one aspect of this embodiment, δ is at most 0.130. In one aspect of this embodiment, δ is at most 0.120. In one aspect of this embodiment, δ is at most 0.110. In one aspect of this embodiment, δ is at most 0.100. In one aspect of this embodiment, δ is at most 0.090. In one aspect of this embodiment, δ is at most 0.08. In one aspect of this embodiment, δ is at most 0.070. In one aspect of this embodiment, δ is at most 0.060. In one aspect of this embodiment, δ is at most 0.050. In one aspect of this embodiment, δ is at most 0.040. In one aspect of this embodiment, δ is at most 0.030. In one aspect of this embodiment, δ is at most 0.020.

In the various aspects of this embodiment, the first R-type, G-type and B-type optical elements are ordered as follows: RGB, RBG, GRB, GBR, BRG & BGR.

|2| The device according to embodiment |1|, wherein one or more of the following is satisfied:
  i.) $n_O$ is in the range from 1.550 to less than 1.600 and δ satisfies:

$$\delta \leq 0.05(1+(n_O-1.54)*10/6);$$

ii.) $n_O$ is in the range from 1.600 to less than 1.650 and δ satisfies:

$$\delta \leq 0.05(1+(n_O-1.52)*10/6);$$

iii.) $n_O$ is in the range from 1.650 to less than 1.700 and δ satisfies:

$$\delta \leq 0.05(1+(n_O-1.54)*10/6);$$

iv.) $n_O$ is in the range from 1.700 to less than 1.750 and δ satisfies:

$$\delta \leq 0.05(1+(n_O-1.58)*10/6);$$

v.) $n_O$ is in the range from 1.750 to less than 1.800 and δ satisfies:

$$\delta \leq 0.05(1+(n_O-1.34)*10/6);$$

vi.) $n_O$ is in the range from 1.800 to less than 1.850 and δ satisfies:

$$\delta \leq 0.05(1+(n_O-1.40)*10/6);$$

vii.) $n_O$ is in the range from 1.850 to less than 1.900 and δ satisfies:

$$\delta \leq 0.05(1+(n_O-1.43)*10/6);$$

viii.) no is in the range from 1.900 to less than 1.950 and δ satisfies:

$$\delta \leq 0.05(1+(n_O-0.39)*10/6);$$

ix.) $n_O$ is in the range from 1.950 to less than 2.500 and δ satisfies:

$$\delta \leq 0.05(1+(n_O-0.30)*10/6);$$

|3| The device according to embodiment |1|, wherein one of the following criteria is satisfied:
  i.) $n_O$ is in the range from 1.550 to less than 1.750 and δ≤0.070;
  ii.) $n_O$ is in the range from 1.750 to less than 2.000 and δ≤0.200;
  iii.) $n_O$ is in the range from 2.000 and 2.500 and δ≤0.200.

In one embodiment, $n_O$ is in the range from 1.550 to less than 1.600 and the average density is at most 3.75 g/cm$^3$, preferably at most 3.69 g/cm$^3$, more preferably at most 3.50 g/cm$^3$, more preferably at most 3.10 g/cm$^3$, more preferably at most 3.00 g/cm$^3$, most preferably at most 2.95 g/cm$^3$.

In one embodiment, $n_O$ is in the range from 1.600 to less than 1.650 and the average density is at most 3.80 g/cm$^3$, preferably at most 3.70 g/cm$^3$, more preferably at most 3.50 g/cm$^3$, more preferably at most 3.10 g/cm$^3$, more preferably at most 3.00 g/cm$^3$, most preferably at most 2.80 g/cm$^3$.

In one embodiment, $n_O$ is in the range from 1.650 to less than 1.700 and the average density is at most 3.98 g/cm$^3$, preferably at most 3.90 g/cm$^3$, more preferably at most 3.80 g/cm$^3$, more preferably at most 3.60 g/cm$^3$, more preferably at most 3.10 g/cm$^3$, most preferably at most 2.90 g/cm$^3$.

In one embodiment, $n_O$ is in the range from 1.700 to less than 1.750 and the average density is at most 4.34 g/cm$^3$, preferably at most 4.15 g/cm$^3$, more preferably at most 4.10 g/cm$^3$, more preferably at most 3.95 g/cm$^3$, more preferably at most 3.50 g/cm$^3$, most preferably at most 3.30 g/cm$^3$.

In one embodiment, $n_0$ is in the range from 1.750 to less than 1.800 and the average density is at most 4.55 g/cm$^3$, preferably at most 4.40 g/cm$^3$, more preferably at most 4.20 g/cm$^3$, more preferably at most 3.80 g/cm$^3$, more preferably at most 3.50 g/cm$^3$, most preferably at most 3.40 g/cm$^3$.

In one embodiment, $n_0$ is in the range from 1.800 to less than 1.850 and the average density is at most 4.81 g/cm$^3$, preferably at most 4.70 g/cm$^3$, more preferably at most 4.60 g/cm$^3$, more preferably at most 4.50 g/cm$^3$, more preferably at most 4.10 g/cm$^3$, most preferably at most 3.60 g/cm$^3$.

In one embodiment, $n_0$ is in the range from 1.850 to less than 1.900 and the average density is at most 5.20 g/cm$^3$, preferably at most 5.00 g/cm$^3$, more preferably at most 4.90 g/cm$^3$, more preferably at most 4.80 g/cm$^3$, more preferably at most 4.50 g/cm$^3$, most preferably at most 4.30 g/cm$^3$.

In one embodiment, $n_0$ is in the range from 1.900 to less than 1.950 and the average density is at most 5.30 g/cm$^3$, preferably at most 5.20 g/cm$^3$, more preferably at most 5.00 g/cm$^3$, more preferably at most 4.90 g/cm$^3$, more preferably at most 4.60 g/cm$^3$, most preferably at most 4.40 g/cm$^3$.

In one embodiment, $n_0$ is at least 1.950 and the average density is at most 5.37 g/cm$^3$, preferably at most 5.30 g/cm$^3$, more preferably at most 5.20 g/cm$^3$, more preferably at most 5.00 g/cm$^3$, more preferably at most 4.80 g/cm$^3$, most preferably at most 4.70 g/cm$^3$.

In one embodiment, $n_0$ is in the range from 1.550 to less than 1.600 and the geometric average integrated internal transmission in RGB-range is at least 0.988, preferably at least 0.989, more preferably at least 0.991, more preferably at least 0.993, more preferably at least 0.995, more preferably at least 0.996, most preferably at least 0.997.

In one embodiment, $n_0$ is in the range from 1.600 to less than 1.650 and the geometric average integrated internal transmission in RGB-range is at least 0.987, preferably at least 0.988, more preferably at least 0.990, more preferably at least 0.991, more preferably at least 0.993, more preferably at least 0.994, most preferably at least 0.996.

In one embodiment, $n_0$ is in the range from 1.650 to less than 1.700 and the geometric average integrated internal transmission in RGB-range is at least 0.976, preferably at least 0.980, more preferably at least 0.985, more preferably at least 0.990, more preferably at least 0.991, more preferably at least 0.993, most preferably at least 0.995.

In one embodiment, $n_0$ is in the range from 1.700 to less than 1.750 and the geometric average integrated internal transmission in RGB-range is at least 0.977, preferably at least 0.980, more preferably at least 0.983, more preferably at least 0.985, more preferably at least 0.988, more preferably at least 0.990, most preferably at least 0.992.

In one embodiment, $n_0$ is in the range from 1.750 to less than 1.800 and the geometric average integrated internal transmission in RGB-range is at least 0.975, preferably at least 0.978, more preferably at least 0.980, more preferably at least 0.983, more preferably at least 0.985, more preferably at least 0.987, most preferably at least 0.990.

In one embodiment, $n_0$ is in the range from 1.800 to less than 1.850 and the geometric average integrated internal transmission in RGB-range is at least 0.945, preferably at least 0.950, more preferably at least 0.953, more preferably at least 0.955, more preferably at least 0.960, more preferably at least 0.965, most preferably at least 0.975.

In one embodiment, $n_0$ is in the range from 1.850 to less than 1.900 and the geometric average integrated internal transmission in RGB-range is at least 0.945, preferably at least 0.950, more preferably at least 0.955, more preferably at least 0.960, more preferably at least 0.962, more preferably at least 0.963, most preferably at least 0.967.

In one embodiment, $n_0$ is in the range from 1.900 to less than 1.950 and the geometric average integrated internal transmission in RGB-range is at least 0.885, preferably at least 0.890, more preferably at least 0.900, more preferably at least 0.910, more preferably at least 0.920, more preferably at least 0.930, most preferably at least 0.960.

In one embodiment, $n_0$ is at least 1.950 and the geometric average integrated internal transmission in RGB-range is at least 0.890, preferably at least 0.895, more preferably at least 0.900, more preferably at least 0.905, more preferably at least 0.910, more preferably at least 0.913, most preferably at least 0.920.

In one embodiment, $n_0$ is in the range from 1.550 to less than 1.600 and the geometric average integrated internal transmission in RGB-range divided by the average density is at least 0.263 g$^{-1}$·cm$^3$, preferably at least 0.268 g$^{-1}$·cm$^3$, more preferably at least 0.280 g$^{-1}$·cm$^3$, more preferably at least 0.300 g$^{-1}$·cm$^3$, more preferably at least 0.320 g$^{-1}$·cm$^3$, more preferably at least 0.330 g$^{-1}$·cm$^3$, most preferably at least 0.360 g$^{-1}$·cm$^3$.

In one embodiment, $n_0$ is in the range from 1.600 to less than 1.650 and the geometric average integrated internal transmission in RGB-range divided by the average density is at least 0.260 g$^{-1}$·cm$^3$, preferably at least 0.271 g$^{-1}$·cm$^3$, more preferably at least 0.283 g$^{-1}$·cm$^3$, more preferably at least 0.320 g$^{-1}$·cm$^3$, more preferably at least 0.332 g$^{-1}$·cm$^3$, more preferably at least 0.345 g$^{-1}$·cm$^3$, most preferably at least 0.355 g$^{-1}$·cm$^3$.

In one embodiment, $n_0$ is in the range from 1.650 to less than 1.700 and the geometric average integrated internal transmission in RGB-range divided by the average density is at least 0.261 g$^{-1}$·cm$^3$, preferably at least 0.265 g$^{-1}$·cm$^3$, more preferably at least 0.259 g$^{-1}$·cm$^3$, more preferably at least 0.275 g$^{-1}$·cm$^3$, more preferably at least 0.320 g$^{-1}$·cm$^3$, more preferably at least 0.330 g$^{-1}$·cm$^3$, most preferably at least 0.347 g$^{-1}$·cm$^3$.

In one embodiment, $n_0$ is in the range from 1.700 to less than 1.750 and the geometric average integrated internal transmission in RGB-range divided by the average density is at least 0.230 g$^{-1}$·cm$^3$, preferably at least 0.237 g$^{-1}$·cm$^3$, more preferably at least 0.245 g$^{-1}$·cm$^3$, more preferably at least 0.266 g$^{-1}$·cm$^3$, more preferably at least 0.310 g$^{-1}$·cm$^3$, more preferably at least 0.320 g$^{-1}$·cm$^3$, most preferably at least 0.330 g$^{-1}$·cm$^3$.

In one embodiment, $n_0$ is in the range from 1.750 to less than 1.800 and the geometric average integrated internal transmission in RGB-range divided by the average density is at least 0.220 g$^{-1}$·cm$^3$, preferably at least 0.225 g$^{-1}$·cm$^3$, more preferably at least 0.235 g$^{-1}$·cm$^3$, more preferably at least 0.260 g$^{-1}$·cm$^3$, more preferably at least 0.282 g$^{-1}$·cm$^3$, more preferably at least 0.300 g$^{-1}$·cm$^3$, most preferably at least 0.310 g$^{-1}$·cm$^3$.

In one embodiment, $n_0$ is in the range from 1.800 to less than 1.850 and the geometric average integrated internal transmission in RGB-range divided by the average density is at least 0.200 g$^{-1}$·cm$^3$, preferably at least 0.215 g$^{-1}$·cm$^3$, more preferably at least 0.216 g$^{-1}$·cm$^3$, more preferably at least 0.217 g$^{-1}$·cm$^3$, more preferably at least 0.235 g$^{-1}$·cm$^3$, more preferably at least 0.250 g$^{-1}$·cm$^3$, most preferably at least 0.268 g$^{-1}$·cm$^3$.

In one embodiment, $n_0$ is in the range from 1.850 to less than 1.900 and the geometric average integrated internal transmission in RGB-range divided by the average density is at least 0.190 g$^{-1}$·cm$^3$, preferably at least 0.191 g$^{-1}$·cm$^3$, more preferably at least 0.192 g$^{-1}$·cm$^3$, more preferably at least 1.197 g$^{-1}$·cm$^3$, more preferably at least 0.215 g$^{-1}$·cm$^3$, more preferably at least 0.220 g$^{-1}$·cm$^3$, most preferably at least 0.225 g$^{-1}$·cm$^3$.

In one embodiment, $n_0$ is in the range from 1.900 to less than 1.950 and the geometric average integrated internal transmission in RGB-range divided by the average density is at least 0.180 g$^{-1}$·cm$^3$, preferably at least 0.182 g$^{-1}$·cm$^3$, more preferably at least 0.185 g$^{-1}$·cm$^3$, more preferably at least 0.186 g$^{-1}$·cm$^3$, more preferably at least 0.189 g$^{-1}$·cm$^3$, more preferably at least 0.206 g$^{-1}$·cm$^3$, most preferably at least 0.212 g$^{-1}$·cm$^3$.

In one embodiment, $n_0$ is at least 1.950 and the geometric average integrated internal transmission in RGB-range divided by the average density is at least 0.173 g$^{-1}$·cm$^3$, preferably at least 0.177 g$^{-1}$·cm$^3$, more preferably at least 0.179 g$^{-1}$·cm$^3$, more preferably at least 0.182 g$^{-1}$·cm$^3$, more preferably at least 0.191 g$^{-1}$·cm$^3$, more preferably at least 0.194 g$^{-1}$·cm$^3$, most preferably at least 0.200 g$^{-1}$·cm$^3$.

It has been found that the combination according to the disclosure shows a good balance between low density and high transmission at a specific $n_0$.

|4| The device according to any of the preceding embodiments, wherein one or more of the optical elements has a coating. In one aspect of this embodiment, a coating is present on the front face. In one aspect of this embodiment, a coating is present on the back face. In one aspect of this embodiment, a coating is present on the front face and a coating is present on the back face.

|5| The device according to embodiment |4|, wherein the coating has a thickness in the range from 20 to 500 nm, preferably in the range from 30 to 400, more preferably in the range from 35 to 300 nm.

In one embodiment, the coating has a thickness of at least 20 nm, preferably at least 30 nm, more preferably at least 35 nm.

In one embodiment, the coating has a thickness of at most 500 nm, preferably at most 400 nm, more preferably at most 300 nm.

|6| The device according to embodiment |4| or |5|, wherein the coating is of a different material to the optical element. In one aspect of this embodiment, the coating has a different chemical composition to the optical element. In one aspect of this embodiment, the coating has a different refractive index to the optical element.

|7| The device according to any of the embodiments |4| to |6|, wherein the coating is an antireflective coating.

|8| The device according to any of the preceding embodiments, wherein the first R-type optical element is at least 50% by volume of a material A, preferably at least 80%, more preferably at least 90%, most preferably at least 99%; the first G-type optical element is at least 50% by volume of a material B, preferably at least 80%, more preferably at least 90%, most preferably at least 99%; and the first B-type optical element is at least 50% by volume of a material C, preferably at least 80%, more preferably at least 90%, most preferably at least 99%; wherein A, B and C are different materials.

|9| The device according to any of the preceding embodiments, wherein the first R-type optical element is at least 50% by volume of a material A, preferably at least 80%, more preferably at least 90%, most preferably at least 99%; the first G-type optical element is at least 50% by volume of the material A, preferably at least 80%, more preferably at least 90%, most preferably at least 99%; and the first B-type optical element is at least 50% by volume of a material B, preferably at least 80%, more preferably at least 90%, most preferably at least 99%; wherein A and B are different materials.

|10| The device according to any of the preceding embodiments, wherein the first R-type optical element is at least 50% by volume of a material A, preferably at least 80%, more preferably at least 90%, most preferably at least 99%; the first G-type optical element is at least 50% by volume of a material B, preferably at least 80%, more preferably at least 90%, most preferably at least 99%; and the first B-type optical element is at least 50% by volume of the material A, preferably at least 80%, more preferably at least 90%, most preferably at least 99%; wherein A and B are different materials.

|11| The device according to any of the preceding embodiments, wherein the first R-type optical element is at least 50% by volume of a material A, preferably at least 80%, more preferably at least 90%, most preferably at least 99%; the first G-type optical element is at least 50% by volume of a material B, preferably at least 80%, more preferably at least 90%, most preferably at least 99%; and the first B-type optical element is at least 50% by volume of the material B, preferably at least 80%, more preferably at least 90%, most preferably at least 99%; wherein A and B are different materials.

|12| The device according to any of the preceding embodiments, wherein the first R-type optical element is at least 50% by volume of a material A, preferably at least 80%, more preferably at least 90%, most preferably at least 99%; the first G-type optical element is at least 50% by volume of the material A, preferably at least 80%, more preferably at least 90%, most preferably at least 99%; and the first B-type optical element is at least 50% by volume of the material A preferably at least 80%, more preferably at least 90%, most preferably at least 99%.

|13| The device according to any of the preceding embodiments, wherein the x optical elements comprises an optical element which comprises an inorganic compound. Preferred inorganic compounds are nitrides, oxides, fluorides, chlorides and bromides, preferably oxides.

A preferred inorganic oxide comprises oxygen and a further element having an electronegativity below 2.15, preferably above 0.65. Electronegativity is preferably according to the Pauling method.

|14| The device according to any of the preceding embodiments, wherein the x optical elements comprises an optical element which comprises a material selected from the group consisting of: a glass, a ceramic, a crystal, a polymer and a combination of two or more thereof.

Preferred ceramics are opto-ceramics, glass ceramics and other ceramics.

Preferred ceramics are polycrystalline. Preferred ceramics have a crystallinity of at least 90%, preferably at least 95%, more preferably at least 99%. Preferred ceramics are glass ceramics.

Preferred opto-ceramics are transparent in the visible spectrum. Preferred opto-ceramics are transparent to at least one vacuum wavelength in the range from 380 nm to 760 nm. Preferred opto-ceramics are transparent over the entire visible range. Preferred opto-ceramics are transparent over the range of vacuum wavelengths from 380 nm to 760 nm. A material which is transparent to a wavelength λ preferable has an extinction coefficient less than 5 m$^{-1}$, preferably less than 3 m$^{-1}$, preferably less than 1 m$^{-1}$, measured at the wavelength λ.

Preferred polymers are plastics. Preferred plastics are solid. Preferred plastics are thermoplastics or thermosets. Preferred plastics are the product of a polymerization reaction. Preferred polymers are suitable for preparing a substrate with low water absorption and low birefringence. Preferred polymer substrates have low water absorption and low birefringence. A preferred polymer is a cyclic olefin copolymer. Preferred cyclic olefin copolymers are derived from ethene. Preferred cyclic olefin copolymers are prepared from ethene and one or both selected from: 8,9,10-trinorborn-2-ene (norbornene) and 1,2,3,4,4a,5,8,8a-octahydro-1,4:5,8-dimethanonaphthalene (tetracyclododecene).

|15| The device according to any of the preceding embodiments, wherein the first R-type optical element is separated from the first G-type optical element by a distance RG, the first R-type optical element is separated from the first B-type optical element by a distance RB and the first G-type optical element is separated from the first B-type optical element by a distance GB, wherein RG, RB and GB are each less than 500 µm, independently of each other, preferably each less than 300 µm, more preferably less than 100 µm, particular preferably 50 µm. RG, RB and GB are preferably each more than 5 µm, more preferably more than 10 µm. Where second optical elements are present, this relation preferably holds as between those second optical elements. Where further optical elements are present, this relation preferably holds as between each RGB triplet of those further optical elements. In the various aspects of this embodiment, the first R-type, G-type and B-type optical elements are ordered as follows: RGB, RBG, GRB, GBR, BRG & BGR.

|16| The device according to any of the preceding embodiments wherein the x optical elements comprises one or more selected from the group consisting of: a second R-type optical element satisfying the R-type criterion, a second G-type optical element satisfying the G-type criterion and a second B-type optical element satisfying the B-type criterion.

Preferably, the device comprises a second R-type optical element, a second G-type optical element and a second B-type optical element. The further preferred features laid out in the embodiments and otherwise throughout this document in relation to the first optical elements preferably also apply to the second optical elements.

|17| The device according to embodiment |16|, wherein the x optical elements comprises the following consecutive sequence:
i.) A first sub-grouping of the first R-type optical element, the first G-type optical element and the first B-type optical element, these optical elements being spaced by a first intra spacer region and a second intra spacer region;
ii.) An inter spacer region;
iii.) A second sub-grouping of the second R-type optical element, the second G-type optical element and the second B-type optical element, these optical elements being spaced by a third intra spacer region and a fourth intra spacer region;
wherein the inter spacer region is at least 2 times as thick as each of the above intra spacer regions, preferably at least 5 times as thick, more preferably at least 10 times as thick.

|18| The device according to any of the preceding embodiments, wherein the x optical elements comprises y R-type optical elements, y G-type optical elements and y B-type optical elements, wherein each of the y R-type optical elements satisfies the R-type criterion, each of the y G-type optical elements satisfies the G-type criterion, and each of the y B-type optical elements satisfies the B-type criterion, wherein y is an integer at least 2 and x is an integer at least 6. The further features of the first R-type optical element preferably also apply to each of the y R-type optical elements. The further features of the first G-type optical element preferably also apply to each of the y G-type optical element. The further preferred features laid out in the embodiments and otherwise throughout this document in relation to the first optical elements preferably also apply to the further optical elements. In various aspects of this the value of y is 2, 3, 4, 5, 6 or 7, preferably 2, 3 or 4.

|19| The device according to any of the preceding embodiments, wherein one or more of the spacer regions has a thickness in the range from 50 µm to 5 mm, preferably in the range from 60 µm to 3 mm, more preferably from 70 µm to 1 mm.

In one embodiment, one or more of the spacer regions has a thickness of at least 50 µm, preferably at least 60 µm, more preferably at least 70 µm.

In one embodiment, one or more of the spacer regions has a thickness of at most 5 mm, preferably at most 3 mm, more preferably at most 1 mm.

|20| The device according to any of the preceding embodiments, wherein one or more of the following is satisfied by one or more of the x optical elements, preferably for 3 or more of the x optical elements, more preferably for all of the x optical elements:
i.) A thickness in the range from 10 to 1500 µm, more preferably in the range from 10 to 1000 µm, more preferably in the range from 10 to 500 µm, more preferably in the range from 20 to 450 µm, more preferably in the range from 30 to 400 µm; or A thickness of at least 10 µm, preferably at least 20 µm, more preferably at least 30 µm; or a thickness of up to 1500 µm, more preferably up to 1000 µm, more preferably up to 500 µm, more preferably up to 450 µm, more preferably up to 400 µm; or
ii.) A radius of curvature greater than 600 mm, preferably greater than 800 mm, more preferably greater than 1100 mm. In one aspect, this condition holds for one selected from a front face and a back face. In another aspect, this condition holds for both a front face and a back face;
iii.) An optical loss measured perpendicular to the front face of at most 25%, preferably at most 8%, more preferably at most 5%;
iv.) A surface roughness of the substrate of less than 5 nm, preferably less than 3 nm, more preferably less than 2 nm;
v.) A surface roughness of the coating of less than 5 nm, preferably less than 3 nm, more preferably less than 2 nm;
vi.) Maximum thickness variation over the area of the optical element of less than 5 µm, preferably less than 4 µm, more preferably less than 3 µm, more preferably less than 2 µm;
vii.) A min-max local thickness variation over 75% of the total area of the optical element of less than 5 µm preferably less than 4 µm, more preferably less than 3 µm, more preferably less than 2 µm;
viii.) A warp of less than 350 µm, preferably warp of less than 300 µm, more preferably a warp of less than 250 µm;

ix.) A bow of less than 300 μm, preferably bow of less than 250 μm, more preferably a bow of less than 200 μm.

In some individual aspects of this embodiment at least the following feature combinations are fulfilled: ix.)+viii.)+vii.)+vi.)+v.)+iv.)+iii.)+ii.)+i.), ix.)+viii.)+vii.)+vi.)+v.)+iv.)+iii.)+ii.), ix.)+viii.)+vii.)+vi.)+v.)+iv.)+iii.)+i.), ix.)+viii.)+vii.)+vi.)+v.)+iv.)+iii.), ix.)+viii.)+vii.)+vi.)+v.)+iv.)+ii.)+i.), ix.)+viii.)+vii.)+vi.)+v.)+iv.)+ii.), ix.)+viii.)+vii.)+vi.)+v.)+iv.)+i.), ix.)+viii.)+vii.)+vi.)+v.)+iv.), ix.)+viii.)+vii.)+vi.)+v.)+iii.)+ii.)+i.), ix.)+viii.)+vii.)+vi.)+v.)+iii.)+ii.), ix.)+viii.)+vii.)+vi.)+v.)+iii.)+i.), ix.)+viii.)+vii.)+vi.)+v.)+iii.), ix.)+viii.)+vii.)+vi.)+v.)+ii.)+i.), ix.)+viii.)+vii.)+vi.)+v.)+ii.), ix.)+viii.)+vii.)+vi.)+v.)+i.), ix.)+viii.)+vii.)+vi.)+v.), ix.)+viii.)+vii.)+vi.)+iv.)+iii.)+ii.)+i.), ix.)+viii.)+vii.)+vi.)+iv.)+iii.)+ii.), ix.)+viii.)+vii.)+vi.)+iv.)+iii.)+i.), ix.)+viii.)+vii.)+vi.)+iv.)+ix.)+vii.)+vii.)+vi.)+iv.)+ii.)+i.), ix.)+vii.)+vii.)+vi.)+iv.)+ii.), ix.)+vii.)+vii.)+vi.)+iv.)+i.), ix.)+vii.)+vii.)+vi.)+iv.), ix.)+vii.)+vii.)+vi.)+iii.)+ii.)+i.), ix.)+vii.)+vii.)+vi.)+iii.)+ii.), ix.)+viii.)+vii.)+vi.)+iii.)+i.), ix.)+viii.)+vii.)+vi.)+ix.)+viii.)+vii.)+vi.)+ii.)+i.), ix.)+viii.)+vii.)+vi.)+ii.), ix.)+viii.)+vii.)+vi.)+i.), ix.)+viii.)+vii.)+vi.), ix.)+viii.)+vii.)+v.)+iv.)+iii.)+ii.)+i.), ix.)+viii.)+vii.)+v.)+iv.)+iii.)+ii.), ix.)+viii.)+vii.)+v.)+iv.)+iii.)+i.), ix.)+viii.)+vii.)+v.)+iv.)+ix.)+viii.)+vii.)+v.)+iv.)+ii.)+i.), ix.)+viii.)+vii.)+vii.)+v.)+iv.)+ii.), ix.)+viii.)+vii.)+v.)+iv.)+i.), ix.)+viii.)+vii.)+v.)+iv.), ix.)+viii.)+vii.)+v.)+iii.)+ii.)+i.), ix.)+viii.)+vii.)+v.)+iii.)+ii.), ix.)+viii.)+vii.)+v.)+iii.)+i.), ix.)+viii.)+vii.)+v.)+ix.)+viii.)+vii.)+v.)+ii.)+i.), ix.)+vii.)+vii.)+v.)+ii.), ix.)+vii.)+vii.)+v.)+i.), ix.)+vii.)+vii.)+v.), ix.)+vii.)+vii.)+iv.)+iii.)+ii.)+i.), ix.)+vii.)+vii.)+iv.)+iii.)+ii.), ix.)+vii.)+vii.)+iv.)+iii.)+i.), ix.)+viii.)+vii.)+iv.)+iii.), ix.)+viii.)+vii.)+iv.)+ii.)+i.), ix.)+viii.)+vii.)+iv.)+ii.), ix.)+viii.)+vii.)+iv.)+i.), ix.)+viii.)+vii.)+iv.), ix.)+viii.)+vii.)+iii.)+ii.)+i.), ix.)+viii.)+vii.)+iii.)+ii.), ix.)+viii.)+vii.)+iii.)+i.), ix.)+viii.)+vii.)+ix.)+viii.)+vii.)+ii.)+i.), ix.)+viii.)+vii.)+ii.), ix.)+viii.)+vii.)+i.), ix.)+viii.)+vii.), ix.)+viii.)+vi.)+v.)+iv.)+iii.)+ii.)+i.), ix.)+viii.)+vi.)+v.)+iv.)+iii.)+ii.), ix.)+viii.)+vi.)+v.)+iv.)+iii.)+i.), ix.)+viii.)+vi.)+v.)+iv.)+iii.), ix.)+viii.)+vi.)+v.)++iv.)+ii.)+i.), ix.)+viii.)+vi.)+v.)++iv.)+ii.), ix.)+viii.)+vi.)+v.)+iv.)+i.), ix.)+viii.)+vi.)+v.)+iv.), ix.)+viii.)+vi.)+v.)+iii.)+ii.)+i.), ix.)+viii.)+vi.)+v.)+iii.)+ii.), ix.)+viii.)+vi.)+v.)+iii.)+i.), ix.)+viii.)+vi.)+v.)+iii.)+ii.), ix.)+viii.)+vi.)+v.)+iii.)+i.), ix.)+viii.)+vi.)+v.)+iii.), ix.)+viii.)+vi.)+v.)+ii.)+i.), ix.)+viii.)+vi.)+iv.)+iii.)+ii.), ix.)+viii.)+vi.)+iv.)+iii.)+i.), ix.)+viii.)+vi.)+iv.)+ix.)+viii.)+vi.)+iv.)+ii.)+i.), ix.)+viii.)+vi.)+iv.)+ii.), ix.)+viii.)+vi.)+iv.)+i.), ix.)+viii.)+vi.)+iv.), ix.)+viii.)+vi.)+iii.)+ii.), ix.)+viii.)+vi.)+iii.)+i.), ix.)+viii.)+vi.)+ix.)+viii.)+vi.)+ii.)+i.), ix.)+viii.)+vi.)+ii.), ix.)+viii.)+vi.)+i.), ix.)+viii.)+vi.), ix.)+viii.)+v.)+iv.)+iii.)+ii.), ix.)+viii.)+v.)+iv.)+iii.), ix.)+viii.)+v.)+iv.)+iii.)+i.), ix.)+viii.)+v.)+iv.)+ii.)+i.), ix.)+viii.)+v.)+iv.)+ii.), ix.)+viii.)+v.)+iv.)+i.), ix.)+viii.)+v.)+iv.), ix.)+viii.)+v.)+iii.)+ii.)+i.), ix.)+viii.)+v.)+iii.)+ii.), ix.)+viii.)+v.)+iii.)+i.), ix.)+viii.)+v.)+iii.), ix.)+viii.)+v.)+ii.)+i.), ix.)+viii.)+v.)+ii.), ix.)+viii.)+v.)+i.), ix.)+viii.)+v.), ix.)+viii.)+iv.)+iii.)+ii.)+i.), ix.)+viii.)+iv.)+iii.)+ii.), ix.)+viii.)+iv.)+iii.)+i.), ix.)+viii.)+iv.)+ix.)+viii.)+iv.)+ii.)+i.), ix.)+viii.)+iv.), ix.)+viii.)+iii.)+ii.)+i.), ix.)+viii.)+iii.)+ii.), ix.)+viii.)+iii.)+i.), ix.)+viii.)+ii.), ix.)+viii.)+i.), ix.)+viii.), ix.)+vii.)+vi.)+v.)+iv.)+iii.)+ii.)+i.), ix.)+vii.)+vi.)+v.)+iv.)+iii.)+ii.), ix.)+vii.)+vi.)+v.)+iv.)+iii.)+i.), ix.)+vii.)+vi.)+v.)+iv.)+iii.), ix.)+vii.)+vi.)+v.)+iv.)+ii.)+i.), ix.)+vii.)+vi.)+v.)+iv.)+ii.), ix.)+vii.)+vi.)+v.)+iv.)+i.), ix.)+vii.)+vi.)+v.)+iv.), ix.)+vii.)+vi.)+v.)+iii.)+ii.)+i.), ix.)+vii.)+vi.)+v.)+iii.)+ii.), ix.)+vii.)+vi.)+v.)+iii.)+i.), ix.)+vii.)+vi.)+v.)+iii.), ix.)+vii.)+vi.)+v.)+ii.)+i.), ix.)+vii.)+vi.)+v.)+ii.), ix.)+vii.)+vi.)+v.)+i.), ix.)+vii.)+vi.)+v.), ix.)+vii.)+vi.)+iv.)+iii.)+ii.)+i.), ix.)+vii.)+vi.)+iv.)+iii.)+ii.), ix.)+vii.)+vi.)+iv.)+iii.)+i.), ix.)+vii.)+vi.)+iv.)+iii.), ix.)+vii.)+vi.)+iv.)+ii.)+i.), ix.)+vii.)+vi.)+iv.)+ii.), ix.)+vii.)+vi.)+iv.)+i.), ix.)+vii.)+vi.)+iv.), ix.)+vii.)+vi.)+iii.)+ii.)+i.), ix.)+vii.)+vi.)+iii.)+ii.), ix.)+vii.)+vi.)+iii.)+i.), ix.)+vii.)+vi.)+iii.), ix.)+vii.)+vi.)+ii.)+i.), ix.)+vii.)+vi.)+ii.), ix.)+vii.)+vi.)+i.), ix.)+vii.)+vi.), ix.)+vii.)+v.)+iv.)+iii.)+ii.)+i.), ix.)+vii.)+v.)+iv.)+iii.)+ii.), ix.)+vii.)+v.)+iv.)+iii.)+i.), ix.)+vii.)+v.)+iv.)+ix.)+vii.)+v.)+iv.)+ii.)+i.), ix.)+vii.)+v.)+iv.)+ii.), ix.)+vii.)+v.)+iv.)+i.), ix.)+vii.)+v.)+iv.), ix.)+vii.)+v.)+iii.)+ii.)+i.), ix.)+vii.)+v.)+iii.)+ii.), ix.)+vii.)+v.)+iii.)+i.), ix.)+vii.)+v.)+iii.), ix.)+vii.)+v.)+ii.)+i.), ix.)+vii.)+v.)+ii.), ix.)+vii.)+v.)+i.), ix.)+vii.)+v.), ix.)+vii.)+iv.)+iii.)+ii.)+i.), ix.)+vii.)+iv.)+iii.)+ii.), ix.)+vii.)+iv.)+iii.)+i.), ix.)+vii.)+iv.)+ix.)+vii.)+iv.)+ii.)+i.), ix.)+vii.)+iv.)+ii.), ix.)+vii.)+iv.)+i.), ix.)+vii.)+iv.), ix.)+vii.)+iii.)+ii.)+i.), ix.)+vii.)+iii.)+ii.), ix.)+vii.)+iii.)+i.), ix.)+vii.)+ix.)+vii.)+ii.)+i.), ix.)+vii.)+ii.), ix.)+vii.)+i.), ix.)+vii.), ix.)+vi.)+v.)+iv.)+iii.)+ii.)+i.), ix.)+vi.)+v.)+iv.)+iii.)+ii.), ix.)+vi.)+v.)+iv.)+iii.)+i.), ix.)+vi.)+v.)+iv.)+iii.), ix.)+vi.)+v.)+iv.)+ii.)+i.), ix.)+vi.)+v.)+iv.)+ii.), ix.)+vi.)+v.)+iv.)+i.), ix.)+vi.)+v.)+iv.), ix.)+vi.)+v.)+iii.)+ii.)+i.), ix.)+vi.)+v.)+iii.)+ii.), ix.)+vi.)+v.)+iii.)+i.), ix.)+vi.)+v.)+iii.), ix.)+vi.)+v.)+ix.)+vi.)+v.)+ii.)+i.), ix.)+vi.)+v.)+ii.), ix.)+vi.)+v.)+i.), ix.)+vi.)+v.), ix.)+vi.)+iv.)+iii.)+ii.)+i.), ix.)+vi.)+iv.)+iii.)+ii.), ix.)+vi.)+iv.)+iii.)+i.), ix.)+vi.)+iv.)+iii.), ix.)+vi.)+iv.)+ii.)+i.), ix.)+vi.)+iv.)+ii.), ix.)+vi.)+iv.)+i.), ix.)+vi.)+iv.), ix.)+vi.)+iii.)+ii.)+i.), ix.)+vi.)+iii.)+ii.), ix.)+vi.)+iii.)+i.), ix.)+vi.)+iii.), ix.)+vi.)+ii.)+i.), ix.)+vi.)+ii.), ix.)+vi.)+i.), ix.)+vi.), ix.)+v.)+iv.)+iii.)+ii.)+i.), ix.)+v.)+iv.)+iii.)+ii.), ix.)+v.)+iv.)+iii.)+i.), ix.)+v.)+iv.)+iii.), ix.)+v.)+iv.)+ii.)+i.), ix.)+v.)+iv.)+ii.), ix.)+v.)+iv.)+i.), ix.)+v.)+iv.), ix.)+v.)+iii.)+ii.)+i.), ix.)+v.)+iii.)+ii.), ix.)+v.)+iii.)+i.), ix.)+v.)+iii.), ix.)+v.)+ix.)+v.)+ii.)+i.), ix.)+v.)+ii.), ix.)+v.)+i.), ix.)+v.), ix.)+iv.)+iii.)+ii.)+i.), ix.)+iv.)+iii.)+ii.), ix.)+iv.)+iii.)+i.), ix.)+iv.)+iii.), ix.)+iv.)+ix.)+iv.)+ii.)+i.), ix.)+iv.)+ii.), ix.)+iv.)+i.), ix.)+iv.), ix.)+iii.)+ii.)+i.), ix.)+iii.)+ii.), ix.)+iii.)+i.), ix.)+iii.), ix.)+ix.)+ii.)+i.), ix.)+ii.), ix.)+i.), ix.), viii.)+vii.)+vi.)+v.)+iv.)+iii.)+ii.)+i.), viii.)+vii.)+vi.)+v.)+iv.)+iii.)+ii.), viii.)+vii.)+vi.)+v.)+iv.)+iii.)+i.), viii.)+vii.)+vi.)+v.)+iv.)+iii.), viii.)+vii.)+vi.)+v.)+iv.)+ii.)+i.), viii.)+vii.)+vi.)+v.)+iv.)+ii.), viii.)+vii.)+vi.)+v.)+iv.)+i.), viii.)+vii.)+vi.)+v.)+iv.), viii.)+vii.)+vi.)+v.)+iii.)+ii.)+i.), viii.)+vii.)+vi.)+v.)+iii.)+ii.), viii.)+vii.)+vi.)+v.)+iii.)+i.), viii.)+vii.)+vi.)+v.)+iii.), viii.)+vii.)+vi.)+v.)+ii.)+i.), viii.)+vii.)+vi.)+v.)+ii.), viii.)+vii.)+vi.)+v.)+i.), viii.)+vii.)+vi.)+v.), viii.)+vii.)+vi.)+iv.)+iii.)+ii.)+i.), viii.)+vii.)+vi.)+iv.)+iii.)+ii.), viii.)+vii.)+vi.)+iv.)+iii.)+i.), viii.)+vii.)+vi.)+iv.)+ii.)+i.), viii.)+vii.)+vi.)+iv.)+ii.), viii.)+vii.)+vi.)+iv.)+i.), viii.)+vii.)+vi.)+iv.), viii.)+vii.)+vi.)+iii.)+ii.)+i.), viii.)+vii.)+vi.)+iii.)+ii.), viii.)+vii.)+vi.)+iii.)+i.), viii.)+vii.)+vi.)+iii.), viii.)+vii.)+vi.)+ii.)+i.), viii.)+vii.)+vi.)+ii.), viii.)+vii.)+vi.)+i.), viii.)+vii.)+vi.), viii.)+vii.)+v.)+iv.)+iii.)+ii.)+i.), viii.)+vii.)+v.)+iv.)+iii.)+ii.), viii.)+vii.)+v.)+iv.)+iii.)+i.), viii.)+vii.)+v.)+iv.)+iii.), viii.)+vii.)+v.)+iv.)+ii.)+i.), viii.)+vii.)+v.)+iv.)+ii.), viii.)+vii.)+v.)+iv.)+i.), viii.)+vii.)+v.)+iv.), viii.)+vii.)+v.)+iii.)+ii.)+i.), viii.)+vii.)+v.)+iii.)+ii.), viii.)+vii.)+v.)+iii.)+i.), viii.)+vii.)+v.), viii.)+vii.)+v.)+ii.)+i.), viii.)+vii.)+v.)+ii.), viii.)+vii.)+v.)+i.), viii.)+vii.)+v.), viii.)+vii.)+iv.)+iii.)+ii.)+i.), viii.)+vii.)+iv.)+iii.)+ii.), viii.)+vii.)+iv.)+iii.)+i.), viii.)+vii.)+iv.)+iii.), viii.)+vii.)+iv.)+ii.)+i.), viii.)+vii.)+iv.)+ii.), viii.)+vii.)+iv.)+i.), viii.)+vii.)+iv.), viii.)+vii.)+iii.)+ii.)+i.), viii.)+vii.)+iii.)+ii.), viii.)+vii.)+iii.)+i.), viii.)+vii.)+iii.), viii.)+vii.)+ii.)+i.), viii.)+vii.)+ii.), viii.)+vii.)+i.), viii.)+vii.), viii.)+vi.)+v.)+iv.)+iii.)+ii.)+i.), viii.)+vi.)+v.)+iv.)+iii.)+ii.), viii.)+vi.)+v.)+iv.)+iii.)+i.), viii.)+vi.)+v.)+iv.)+iii.), viii.)+vi.)+v.)+iv.)+ii.)+i.), viii.)+vi.)+v.)+iv.)+ii.), viii.)+vi.)+ v.)+iv.)+iii.)+i.), viii.)+vi.)+v.)+iv.)+viii.)+vi.)+v.)+iv.)+ii.)+ i.), viii.)+vi.)+v.)+iv.)+ii.), viii.)+vi.)+v.)+iv.)+i.), viii.)+ vi.)+v.)+iv.), viii.)+vi.)+v.)+iii.)+ii.)+i.), viii.)+vi.)+v.)+ iii.)+ii.), viii.)+vi.)+v.)+iii.)+i.), viii.)+vi.)+v.)+viii.)+vi.)+ v.)+ii.)+i.), viii.)+vi.)+v.)+ii.), viii.)+vi.)+v.)+i.), viii.)+vi.)+ v.), viii.)+vi.)+iv.)+iii.)+ii.)+i.), viii.)+vi.)+iv.)+iii.)+ii.), viii.)+vi.)+iv.)+iii.)+i.), viii.)+vi.)+iv.)+iii.), viii.)+vi.)+iv.)+ ii.)+i.), viii.)+vi.)+iv.)+ii.), viii.)+vi.)+iv.)+i.), viii.)+vi.)+ iv.), viii.)+vi.)+iii.)+ii.)+i.), viii.)+vi.)+iii.)+ii.), viii.)+vi.)+ iii.)+i.), viii.)+vi.)+viii.)+vi.)+ii.)+i.), viii.)+vi.)+ii.), viii.)+ vi.)+i.), viii.)+vi.), viii.)+v.)+iv.)+iii.)+ii.)+i.), viii.)+v.)+ iv.)+iii.)+ii.), viii.)+v.)+iv.)+iii.)+i.), viii.)+v.)+iv.)+viii.)+ v.)+iv.)+ii.)+i.), viii.)+v.)+iv.)+ii.), viii.)+v.)+iv.)+i.), viii.)+ v.)+iv.), viii.)+v.)+iii.)+ii.)+i.), viii.)+v.)+iii.)+ii.), viii.)+v.)+ iii.)+i.), viii.)+v.)+viii.)+v.)+ii.)+i.), viii.)+v.)+ii.), viii.)+v.)+ i.), viii.)+v.), viii.)+iv.)+iii.)+ii.)+i.), viii.)+iv.)+iii.)+ii.), viii.)+iv.)+iii.)+i.), viii.)+iv.)+viii.)+iv.)+ii.)+i.), viii.)+iv.)+ ii.), viii.)+iv.)+i.), viii.)+iv.), viii.)+iii.)+ii.)+i.), viii.)+iii.)+ ii.), viii.)+iii.)+i.), viii.)+viii.)+ii.)+i.), viii.)+ii.), viii.)+i.), viii.), vii.)+vi.)+v.)+iv.)+iii.)+ii.)+i.), vii.)+vi.)+v.)+iv.)+ iii.)+ii.), vii.)+vi.)+v.)+iv.)+iii.)+i.), vii.)+vi.)+v.)+iv.)+ vii.)+vi.)+v.)+iv.)+ii.)+i.), vii.)+vi.)+v.)+iv.)+ii.), vii.)+vi.)+ v.)+iv.)+i.), vii.)+vi.)+v.)+iv.), vii.)+vi.)+v.)+iii.)+ii.)+i.), vii.)+vi.)+v.)+iii.)+ii.), vii.)+vi.)+v.)+iii.)+i.), vii.)+vi.)+v.)+ vii.)+vi.)+v.)+ii.)+i.), vii.)+vi.)+v.)+ii.), vii.)+vi.)+v.)+i.), vii.)+vi.)+v.), vii.)+vi.)+iv.)+iii.)+ii.)+i.), vii.)+vi.)+iv.)+ iii.)+ii.), vii.)+vi.)+iv.)+iii.)+i.), vii.)+vi.)+iv.)+iii.), vii.)+ vi.)+iv.)+ii.)+i.), vii.)+vi.)+iv.)+ii.), vii.)+vi.)+iv.)+i.), vii.)+ vi.)+iv.), vii.)+vi.)+iii.)+ii.)+i.), vii.)+vi.)+iii.)+ii.), vii.)+ vi.)+iii.)+i.), vii.)+vi.)+vii.)+vi.)+ii.)+i.), vii.)+vi.)+ii.), vii.)+vi.)+i.), vii.)+vi.), vii.)+v.)+iv.)+iii.)+ii.)+i.), vii.)+v.)+ iv.)+iii.)+ii.), vii.)+v.)+iv.)+iii.)+i.), vii.)+v.)+iv.)+vii.)+v.)+ iv.)+ii.)+i.), vii.)+v.)+iv.)+ii.), vii.)+v.)+iv.)+i.), vii.)+v.)+ iv.), vii.)+v.)+iii.)+ii.)+i.), vii.)+v.)+iii.)+ii.), vii.)+v.)+iii.)+ i.), vii.)+v.)+vii.)+v.)+ii.)+i.), vii.)+v.)+ii.), vii.)+v.)+i.), vii.)+v.), vii.)+iv.)+iii.)+ii.)+i.), vii.)+iv.)+iii.)+ii.), vii.)+ iv.)+iii.)+i.), vii.)+iv.)+vii.)+iv.)+ii.)+i.), vii.)+iv.)+ii.), vii.)+ iv.)+i.), vii.)+iv.), vii.)+iii.)+ii.)+i.), vii.)+iii.)+ii.), vii.)+ iii.)+i.), vii.)+vii.)+ii.)+i.), vii.)+ii.), vii.)+i.), vii.), vi.)+v.)+ iv.)+iii.)+ii.)+i.), vi.)+v.)+iv.)+iii.)+ii.), vi.)+v.)+iv.)+iii.)+ i.), vi.)+v.)+iv.)+iii.), vi.)+v.)+iv.)+ii.)+i.), vi.)+v.)+iv.)+ii.), vi.)+v.)+iv.)+i.), vi.)+v.)+iv.), vi.)+v.)+iii.)+ii.)+i.), vi.)+v.)+ iii.)+v.)+iii.)+i.), vi.)+v.)+vi.)+v.)+ii.)+i.), vi.)+v.)+ii.), vi.)+v.)+i.), vi.)+v.), vi.)+iv.)+iii.)+ii.)+i.), vi.)+iv.)+iii.)+ii.), vi.)+iv.)+iii.)+i.), vi.)+iv.)+vi.)+iv.)+ii.)+i.), vi.)+iv.)+ii.), vi.)+iv.)+i.), vi.)+iv.), vi.)+iii.)+ii.)+i.), vi.)+iii.)+ii.), vi.)+ iii.)+i.), vi.)+vi.)+ii.)+i.), vi.)+ii.), vi.)+i.), vi.), v.)+iv.)+iii.)+ ii.)+i.), v.)+iv.)+iii.)+ii.), v.)+iv.)+iii.)+i.), v.)+iv.)+v.)+iv.)+ ii.)+i.), v.)+iv.)+ii.), v.)+iv.)+i.), v.)+iv.), v.)+iii.)+ii.)+i.), v.)+iii.)+ii.), v.)+iii.)+i.), v.)+v.)+ii.)+i.), v.)+ii.), v.)+i.), v.), iv.)+iii.)+ii.)+i.), iv.)+iii.)+ii.), iv.)+iii.)+i.), iv.)+iv.)+ii.)+i.), iv.)+ii.), iv.)+i.), iv.), iii.)+ii.)+i.), iii.)+ii.), iii.)+i.), iii.), ii.)+i.), ii.), i.).

|21| The device according to any of the preceding embodiments, wherein one or more of the x optical elements comprises a means for coupling light into or decoupling light out of the optical element, preferably 3 or more of the optical elements, more preferably all of the optical elements.

|22| The device according to embodiment |21|, wherein the first R-type optical element comprises an R-type means for coupling light into or decoupling light out of the R-type optical element, the G-type optical element comprises a G-type means for coupling light into or decoupling light out of the G-type optical element and the B-type optical element comprises a B-type means for coupling light into or decoupling light out of the B-type optical element and one of the following criteria is satisfied:
   i.) The R-type means is the same as the G-type means and different to the B-type means;
   ii.) The R-type means is the same as the B-type means and different to the G-type means;
   iii.) The G-type means is the same as the B-type means and different to the R-type means
   iv.) The R-type means, the G-type means and the B-type means are all the same.

In embodiments in which the device comprises second optical elements or further optical elements, it is preferred for the one or more, preferably all of the second or further optical elements to have coupling or decoupling means, more preferably being the same as the R-type means, G-type means, B-type means, or two or three thereof.

|23| A kit comprising two or more devices according to any of the preceding embodiments.

|24| A kit of x optical elements, the x optical elements comprising a an R-type optical element, a G-type optical element and a B-type optical element, wherein:
   $R_{610}$ is the refractive index of the first R-type optical element for light of vacuum wavelength 610 nm;
   $R_{760}$ is the refractive index of the first R-type optical element for light of vacuum wavelength 760 nm;
   $G_{500}$ is the refractive index of the first G-type optical element for light of vacuum wavelength 500 nm;
   $G_{610}$ is the refractive index of the first G-type optical element for light of vacuum wavelength 610 nm;
   $B_{400}$ is the refractive index of the first B-type optical element for light of vacuum wavelength 400 nm;
   $B_{500}$ is the refractive index of the first B-type optical element for light of vacuum wavelength 500 nm;
   $n_0$ is the minimum selected from $R_{760}$, $G_{610}$ and $B_{500}$;
   $\delta$ is the difference between $n_0$ and the maximum selected from $R_{610}$, $G_{500}$ and $B_{400}$;
   $n_0$ is in the range from 1.550 to 2.500
   $\delta$ is equal to or less than 0.200.

The further preferred features laid out in the embodiments and otherwise throughout this document in relation to the optical elements of the device preferably also apply to the optical elements of the kit.

|25| The kit according to embodiment |24|, wherein one or more of the optical elements is a wafer. Preferably two or more of the optical elements are wafers, more preferably three or more of the optical elements are wafers, most preferably all of the optical elements are wafers.

|26| The kit according to embodiment |25|, wherein one or more of the wafer satisfies one or more of the following criteria, preferably two or more of the wafers, more preferably all of the wafers:
   i.) The front face has a surface area in the range from 0.010 to 0.500 m², preferably in the range 0.013 to 0.200 m², more preferably in the range from 0.017 to 0.100 m²; or
   The front face has a surface area of at least 0.010 m², preferably at least 0.013 m², from more preferably at least 0.017 m²; or
   The front face has a surface area of up to 0.500 m², preferably up to 0.200 m², more preferably up to 0.100 m²;
   ii.) A thickness $d_s$ in the range from 10 to 1500 µm, more preferably in the range from 10 to 1000 µm, more preferably in the range from 10 to 500 µm, more preferably in the range from 20 to 450 µm, more preferably in the range from 30 to 400 µm; or
The thickness $d_s$ is at least 10 µm, more preferably at least 20 µm, more preferably at least 30 µm; or
The thickness $d_s$ is up to 1500 µm, more preferably up to 1000 µm, more preferably up to 500 µm, more preferably up to 450 µm, more preferably up to 400 µm;

iii.) A radius of curvature greater than 600 mm, preferably greater than 800 mm, more preferably greater than 1100 mm. In one aspect, this condition holds for one selected from a front face and a back face. In another aspect, this condition holds for both a front face and a back face;

iv.) A in-plane optical loss measured perpendicular to the front face of at most 20%, preferably at most 15%, more preferably at most 10%;

v.) A surface roughness of the substrate of less than 5 nm, preferably less than 3 nm, more preferably less than 2 nm;

vi.) A surface roughness of the coating of less than 5 nm, preferably less than 3 nm, more preferably less than 2 nm;

vii.) Total thickness variation of less than 5 µm, preferably less than 4 µm, more preferably less than 3 µm, more preferably less than 2 µm;

viii.) A min-max local thickness variation over 75% of the front face of less than 5 µm preferably less than 4 more preferably less than 3 more preferably less than 2 µm;

ix.) A warp of less than 350 µm, preferably warp of less than 300 µm, more preferably a warp of less than 250 µm;

x.) A bow of less than 300 µm, preferably bow of less than 250 µm, more preferably a bow of less than 200 µm;

xi.) A square or circular shape.

xii.) Has an indentation of depth in the range from 100 µm to 5 mm, preferably in the range from 500 µm to 3 mm, more preferably from 1 mm to 2 mm. A preferred indentation is a notch. An indentation or notch can serve for positioning the wafer.

In some individual aspects of this embodiment at least the following feature combinations are fulfilled:

i.), ii.), iii.), iv.), v.), vi.), vii.), viii.), ix.), x.), xi.), xii.), ii.)+i.), iii.)+i.), iv.)+i.), v.)+i.), vi.)+i.), vii.)+i.), viii.)+i.), ix.)+i.), x.)+i.), xi.)+i.), xii.)+i.), i.)+ii.), iii.)+ii.), iv.)+ii.), v.)+ii.), vi.)+ii.), vii.)+ii.), viii.)+ii.), ix.)+ii.), x.)+ii.), xi.)+ii.), xii.)+ii.), i.)+ii.)+iii.), iv.)+v.)+vi.)+vii.)+viii.)+iii.), ix.)+iii.), x.)+iii.), xi.)+iii.), xii.)+iii.), i.)+iv.), ii.)+iv.), iii.)+iv.), v.)+iv.), vi.)+iv.), vii.)+iv.), viii.)+iv.), ix.)+iv.), x.)+iv.), xi.)+iv.), xii.)+iv.), i.)+v.), ii.)+v.), iii.)+v.), iv.)+v.), vi.)+v.), vii.)+v.), viii.)+v.), ix.)+v.), x.)+v.), xi.)+v.), xii.)+v.), i.)+vi.), ii.)+vi.), iii.)+vi.), iv.)+vi.), v.)+vi.), vii.)+vi.), viii.)+vi.), ix.)+vi.), x.)+vi.), xi.)+vi.), xii.)+vi.), i.)+vii.), ii.)+vii.), iii.)+vii.), iv.)+vii.), v.)+vii.), vi.)+vii.), viii.)+vii.), ix.)+vii.), x.)+vii.), xi.)+vii.), xii.)+vii.), i.)+viii.), ii.)+viii.), iii.)+viii.), iv.)+viii.), v.)+viii.), vi.)+viii.), vii.)+viii.), ix.)+viii.), x.)+viii.), xi.)+viii.), xii.)+viii.), i.)+ix.), ii.)+ix.), iii.)+ix.), iv.)+ix.), v.)+ix.), vi.)+ix.), vii.)+ix.), viii.)+ix.), x.)+ix.), xi.)+ix.), xii.)+ix.), i.)+xi.), ii.)+xi.), iii.)+xi.), iv.)+xi.), v.)+xi.), vi.)+xi.), vii.)+xi.), viii.)+xi.), ix.)+xi.), x.)+xi.), xii.)+xi.), i.)+x.), ii.)+x.), iii.)+x.), iv.)+x.), v.)+x.), vi.)+x.), vii.)+x.), viii.)+x.), ix.)+x.), xi.)+x.), xii.)+x.), i.)+xii.), 10+xii.), xii.), iv.)+xii.), v.)+xii.), vi.)+xii.), vii.)+xii.), viii.)+xii.), ix.)+xii.), x.)+xii.), xi.)+xii.), ii.)+iii.)+iv.)+v.)+vi.)+vii.)+ viii.)+ix.)+x.)+xi.)+xii.), i.)+iii.)+iv.)+v.)+vi.)+vii.)+viii.)+ ix.)+x.)+xi.)+xii.), i.)+ii.)+iv.)+v.)+vi.)+vii.)+viii.))+ix.)+ x.)+xi.)+xii.), i.)+ii.)+iii.)+v.)+vi.)+vii.)+viii.))+ix.)+x.)+ xi.)+xii.), i.)+ii.)+iii.)+iv.)+vi.)+vii.)+viii.)+ix.)+x.)+xi.)+ xii.), i.)+ii.)+iii.)+iv.)+v.)+vii.)+viii.))+ix.)+x.)+xi.)+xii.), i.)+ii.)+iii.)+iv.)+v.)+vi.)+viii.))+ix.)+x.)+xi.)+xii.), i.)+ii.)+ iii.)+iv.)+v.)+vi.)+vii.)+ix.)+x.)+xi.)+xii.), i.)+ii.)+ iii.)+iv.)+v.)+vi.)+vii.)+viii.)+x.)+xi.)+xii.), i.)+ii.)+iii.)+iv.)+ v.)+vi.)+vii.)+viii.)+ix.)+xi.)+xii.), i.)+ii.)+iii.)+iv.)+v.)+ vi.)+vii.)+viii.)+ix.)+xi.)+xii.), i.)+ii.)+iii.)+iv.)+v.)+vi.)+ vii.)+viii.)+ix.)+x.)+xii.) & i.)+ii.)+iii.)+iv.)+v.)+vi.)+vii.)+ viii.)+ix.)+x.)+xi.).

|27| A process for making a device comprising the following steps:
  i.) Providing a kit according to any of the embodiments |23| to |26|;
  ii.) Reducing the surface area of the front face of each of the optical elements to obtain portions;
  iii.) Providing the portions as a viewing screen in the device.

|28| A device obtainable by the process of embodiment |27|.

|29| A device according to any of the embodiments |1| to |22| or |28|, wherein the device is an augmented reality device, a virtual reality device or a mixed reality device.

|30| A process for creating a visual impression comprising the following steps:
  i.) Providing a device according to any of the embodiments |1| to |22| or |28| or |29|;
  ii.) Coupling a generated light image into the device
  iii.) Decoupling the generated light image out of the device.

|31| The process according to embodiment |30|, wherein the generated light image is superimposed on a real-world image.

|3| A process for preparing a set of 3 optical elements comprising the following steps:
  a. Provide a group of at least 2 optical elements; wherein each optical element has:
    a refractive index $R_{610}$ for light of vacuum wavelength 610 nm;
    a refractive index $R_{760}$ for light of vacuum wavelength 760 nm;
    a refractive index $G_{500}$ for light of vacuum wavelength 500 nm;
    a refractive index $G_{610}$ for light of vacuum wavelength 610 nm;
    a refractive index $B_{400}$ for light of vacuum wavelength 400 nm;
    a refractive index $B_{500}$ for light of vacuum wavelength 500 nm,
  b. For a value of $n_0$ in the range from 1.550 to 2.500 and for a value of $\delta$ of 0.200 or less, select the following from the group:
    a. A first optical element satisfying the following:
      i. $R_{760} \geq n_0$;
      ii. $R_{610} \leq n_0 + \delta$;
    b. A second optical element satisfying the following:
      i. $G_{610} \geq n_0$;
      ii. $G_{500} \leq n_0 + \delta$;
    c. A third optical element satisfying the following:
      i. $B_{500} \geq n_0$;
      ii. $B_{400} \leq n_0 + \delta$.

Refractive Indices

In the case of a body of homogeneous refractive index, the refractive index of the body is preferably the refractive index of the material from which it is made. In a preferred substrate, the different between the highest and lowest local values for refractive index is less than $10^{-3}$ preferably less than $10^{-4}$, more preferably less than $10^{-5}$.

In the case of a body of heterogeneous refractive index, the effective refractive index of the body is preferably the refractive index required of a body of the same thickness having homogeneous refractive index to bring about the same level of refraction for light passing through it in the direction of the normal to the front face. Where there is heterogeneity across the transverse extension, the effective refractive index is an arithmetic mean over the transverse extension.

Wavelengths

Unless otherwise indicated, wavelengths presented in this document are vacuum wavelengths. The vacuum wavelength of radiation is the wavelength it would have if it were propagating in a vacuum.

A typical wavelength range for visible light or an RGB-range is from 400 nm to 800 nm.

Thickness

Thicknesses, for example thickness of an optical element or of a coating, is preferably measured in a direction perpendicular to the front face. Thicknesses, for example thickness of an optical element or of a coating, is preferably measured in a direction normal to the front face.

In the case of a body having a thickness varying across its transverse extension, the thickness is preferably the arithmetic mean of the thickness over the transverse extension.

Min-max local thickness variation over a portion of an area is the maximum value of thickness variation over the portion, but which has been minimized through selection of the portion. The min-max local thickness variation over 75% of an area is arrived at by selecting a 75% portion of the area in such a manner that the maximum variation over the portion is minimized.

Optical Element

Preferred optical elements are adapted and adjusted to propagate light, preferably an image. A preferred optical element is suitable for propagating light perpendicular to its front face, preferably an image, preferably a real world image. A preferred optical element is suitable for propagating light transverse to its front face, preferably an image, preferably an overlaid image.

In one embodiment, it is preferred for a real world image and an overlaid image to overlap at least partially. This overlapping may be observed at an observation surface displaced from the back face of the optical element, for example at an eye.

An overlaid image is preferably a generated image. An overlaid image is preferably generated by the device of the disclosure. The overlaid image is preferably generated by a controlled light source.

A preferred optical element has a coating. In one embodiment, the coating comprises two or more coating layers. The thickness of the optical element is preferably at least 20 times the thickness of the coating, more preferably at least 50 times, more preferably at least 100 times. The thickness of the optical element is preferably up to 15,000 times the thickness of the coating, more preferably up to 5,000 times the thickness of the coating, more preferably up to 2,000 times the thickness of the coating. The ratio of the thickness of the coating to the thickness of the substrate is preferably in the range from 1:20 to 1:15,000, more preferably in the range from 1:50 to 1:5,000, more preferably in the range from 1:100 to 1:2,000.

Preferred optical elements are laminar. Preferred optical elements have a smallest Cartesian dimension which less than half the width of the next smallest Cartesian dimension. The ratio of the smallest Cartesian dimension to the next smallest Cartesian dimension is preferably in the range from 1:1000 to 1:2, more preferably in the range from 1:1000 to 1:10, more preferably in the range from 1:1000 to 1:100. The next smallest Cartesian dimension is preferably at least 2 times the smallest Cartesian dimension, preferably at least 10 times, more preferably at least 100 times. The next smallest Cartesian dimension is preferably up to 1000 times the smallest Cartesian dimension. The next smallest Cartesian dimension might be as large as 10000 times the smallest Cartesian dimension.

In one embodiment, a preferred optical element has an aspect ratio in the range from 2 to 1000, more preferably in the range from 10 to 1000 more preferably in the range from 100 to 1000. In one embodiment, a preferred optical element has an aspect ratio of up to 1000. In one embodiment, a preferred optical element has an aspect ratio of at least 2, more preferably at least 10, more preferably at least 100. The aspect ratio might be as high as 10000.

Preferred laminar optical elements are suitable for transverse propagation of light, preferably of an overlaid image. Preferred laminar optical elements are suitable for transverse propagation of light.

A preferred thickness of the optical element is in the range from 10 to 1500 μm, more preferably in the range from 10 to 1000 μm, more preferably in the range from 10 to 500 μm, more preferably in the range from 20 to 450 μm, more preferably in the range from 30 to 400 μm.

A preferred thickness of the optical element is up to 1500 μm, more preferably up to 1000 μm, more preferably up to 500 μm, more preferably up to 450 μm, more preferably up to 400 μm.

A preferred thickness of the optical element is at least 10 μm, more preferably at least 20 μm, more preferably at least 30 μm.

Orientations

The optical element has a front face and a back face. The front face and the back face are preferably parallel, having a normal varying by less than 15°, more preferably by less than 10°, more preferably by less than 5°. The normal of the back face is measured at the point on the back face through which the normal to the front face passes. The front face of the optical element defines a principal direction. The principal direction is preferably the normal to the front face at the geometric center of the front face. The principal is variously referred to throughout this document as "normal to the front face" and "perpendicular to the front face". As used throughout this document, the term "longitudinal" refers to a direction either parallel or anti-parallel to the principal direction. A direction parallel to the normal or longitudinal is preferably less than 45°, more preferably less than 30°, more preferably less than 10°, more preferably less than 5° from the normal. In the case of a laminar or planar optical element, longitudinal propagation corresponds to travel across the smallest Cartesian dimension.

The front face defines a plane. The plane is preferably perpendicular to the normal to the front face. The terms "transverse", "lateral" or "in plane" as used in this disclosure refer to a direction perpendicular to the normal to the front face, parallel to the plane. A direction perpendicular to the normal, transverse, lateral or in plane is preferably more than 45°, more preferably more than 60°, more preferably less than 80°, more preferably less than 85° from the normal. In the case of a laminar or planar optical element, transverse, lateral or in plane propagation corresponds to travel within the laminar or planar extension.

In the device, preferably an augmented reality device, it is preferred for one or more of, preferably all of, the optical elements to be oriented with the back face towards the user and the front face towards the real world.

A coating maybe present on the front face of the optical element. A coating may be present on the back face of the optical element. Coatings may be present on both the front and back faces of the optical element.

A preferred optical element may consist of a single layer or may consist of two or more layers, preferably of a single layer.

In the case of a single layer, the optical element may have a homogeneous chemical composition or a heterogeneous chemical composition, preferably a homogeneous chemical composition. In the case of a single layer, the optical element may have a homogeneous refractive index or a heterogeneous refractive index, preferably a homogeneous refractive index. In the case of a heterogeneous refractive index, the preferred ranges disclosed above preferably hold for the effective refractive index.

In the case of more than one layer, each layer may have a homogeneous chemical composition or a heterogeneous chemical composition, preferably a homogeneous chemical composition. In the case of more than one layer, the preferred ranges disclosed above preferably hold for the mean refractive index of the optical element as a whole. In the case of more than one layer, each layer may have a homogeneous refractive index or a heterogeneous refractive index, preferably a homogeneous refractive index. In the case of a heterogeneous refractive index, the preferred ranges disclosed above preferably hold for the mean refractive index of each layer.

The chemical composition of preferred materials for the optical element is preferably selected to fulfil one or more of the above described physical, optical and chemical requirements.

Preferred materials for the optical element are glass polymer or opto-ceramic, preferably glass. An opto-ceramic is highly transparent material that is essentially single phase, polycrystalline and based on an oxide or other chalcogenide. Opto-ceramics are a subdivision of ceramics. "Single phase" in this context means that more than 95% by weight of the material, preferably at least 97% by weight, further preferred at least 99% by weight and most preferred 99.5 to 99.9% by weight of the material are present in the form of crystals of the desired composition (target composition). The individual crystals are arranged densely and have densities relative to their theoretical densities of at least 99%, preferably at least 99.9%, further preferred at least 99.99%. Accordingly, the opto-ceramics are nearly free of pores.

Preferred glasses as categorized by the Abbe diagram are glasses having a refractive index of 1.6 or more such as dense flint glasses, lanthanum flint glasses, dense lanthanum flint glasses, barium flint glasses, dense barium flint glasses, dense crown glasses, lanthanum crown glasses, extra dense crown glasses, flint glasses, dense phosphorous crown glasses, low flint glasses.

In one embodiment, a preferred glass for the optical element is a niobium phosphate glass.

In one embodiment, a preferred glass for the optical element is a lanthanum borate glass.

In one embodiment, a preferred glass for the optical element is a lanthanum glass.

In one embodiment, a preferred glass for the optical element is a silicate based glass.

A preferred glass group comprises one or more selected from the group consisting of: niobium phosphate glasses, lanthanum (borate) glasses, titanate glasses, bismuth oxide glasses, silicate glasses whereas silicate glasses preferably contain one or more of $TiO_2$, $La_2O_3$, $Bi_2O_3$, $Gd_2O_3$, $Nb_2O_5$, $Y_2O_3$, $Yb_2O_3$, $Ta_2O_5$, $WO_3$, $GeO_2$, $Ga_2O_3$, $ZrO_2$, $HfO_2$, $MgO$, $CaO$, $BaO$, $SrO$, $ZnO$, $Li_2O$, $K_2O$, $Na_2O$, $Cs_2O$, $P_2O_5$, $Al_2O_3$, $B_2O_3$, CdO and PbO.

One option for a glass is a Nb—P glass having a refractive index of at least 1.80.

One option for a glass is a lanthanum containing glass having a refractive index of at least 1.64.

In one embodiment, a preferred glass is commercially available from SCHOTT under one of the following names: N—SF66, N-BASF64, N—SF1, N—SF6, N-SF6HT, N—SF8, N—SF15 and N—SF57, from Sumita under the name K-PSFn214, from OHARA under the name L-BBH1, S-LAH98, S-LAH99, from HOYA under the name TAFD40, TAFD40-W, TAFD45, TaFD55, TAFD55-W, from Corning under the name 1.7/35, 1.8/35 and 1.9/31, from Hikari under the name J-SF6, J-SF6HS, JSFH1, Q-SF6S, J-LASFH23, LASFH24HS, from CDGM under the name H-ZF7LA, HZF7LA GT, H—ZF1, H—ZF52, H-ZF52A, H-ZF52GT, H-ZF52TT, H—ZLaF91 and from NHGunder the name H—ZLaF66, H-ZF7L, H-ZLaF56A, H—ZF52, H—ZF52H, H—ZLaF60, H—ZLaF80.

A preferred polymer in this context is a plastic.

Preferred polymers in this context are polycarbonates (PC) such as Lexan® or Merlon®, polystyrenes (PS) such as Styron® or Lustrex®, acrylic polymers (PMMA) such as Lucite®, Plexiglass® or Polycast®, polyetherimides (PEI) such as Ultem® or Extern®, polyurethanes (PU) such as Isoplast®, cyclic olefin copolymers (COC) such as Topas®, cyclic olefin polymer (COP) such as Zeonex® or Zeonor®, polyesters, such as OKP4 and OKP4HP, polyethersulfones (PES) such as Radel®, and HTLT®. One preferred polymer material is allyl diglycol carbonate (such as CR-39). One preferred polymer material is urethane based.

Preferred opto-ceramics are yttrium aluminum granite (YAG, $Y_3Al_5O_{12}$) and variants thereof, lutetium aluminum granite (LuAG), opto-ceramics with cubic pyrochloric structure or fluorite structure as described in DE 10 2007 022 048 A1 or zinc sulphide.

Preferred crystals are sapphire, anatase, rutile, diamond, zinc sulphide and spinel.

Coating

A coating may be present on the optical element. A preferred coating is suitable for reducing reflection of light incident on the optical element. In the case of a coating applied to the front face, the coating is suitable for reducing reflection of light at the front face. In the case of a coating applied to the back face, the coating is suitable for reducing reflection of light at the back face.

A preferred coating reduces impairment of light propagation in the optical element, preferably reduces impairment of transverse propagation of light in the optical element.

A preferred coating layer is laminar or planar. The coating preferably extends in a plane parallel to that of the optical element.

The coating preferably coats at least 80% of the front face by area, preferably at least 90%, more preferably at least 95%, more preferably at least 99%, most preferably all of the front face.

A coating comprises one or more coating layers. The coating is preferably made as a stack of coating layers, preferably arranged as a stack of co-planer laminas.

The thickness of the coating is preferably determined normal to the front face.

A preferred coating produces a low reflectance region.

A preferred low reflectance region is over the range from 450 to 650 nm. The maximum reflectance in the range from 450 to 650 nm is preferably not more than 50% of the maximum reflectance in the range from 450 to 650 nm for the uncoated optical element, preferably not more than 40%, more preferably not more than 30%.

The maximum reflectance in the range from 450 to 650 nm is preferably less than 5%, preferably less than 4%, more preferably less than 3%, more preferably less than 2%, more preferably less than 1.5%, more preferably less than 1.1%.

A preferred low reflectance region covers a broad vacuum wavelength range. Preferably there is a region of width of at least 175 nm, more preferably at least 200 nm, more preferably at least 225 nm, more preferably at least 250 nm, in which the maximum reflectance minus the minimum reflectance is less than 1%.

A preferred low reflectance region is flat. The maximum reflectance in the range from 450 to 650 nm minus the minimum reflectance in the range from 450 to 650 nm is preferably less than 1.5%, more preferably less than 1.0%, most preferably less than 0.8%.

Coating Layers

A preferred coating comprises 1 or more coating layers. Coating layers are preferably arranged in a stack with each coating layer parallel to the front face.

A preferred coating layer has a chemical composition which either does not vary through its interior or varies smoothly and continuously through its interior, preferably does not vary through its interior. A preferred coating layer either has a homogeneous chemical composition or a smoothly and continuously varying chemical composition, preferably a homogeneous chemical composition. A preferred coating layer has a chemical composition in which the maximum local wt. % of an element is less than 1.2 times the minimum local wt. % of the element, preferably less than 1.1, more preferably less than 1.05. Preferably this applies for each element.

A preferred coating layer has a refractive index which either does not vary through its interior or varies smoothly and continuously through its interior, preferably does not vary through its interior. A preferred coating layer either has a homogeneous refractive index or a smoothly and continuously varying refractive index, preferably a homogeneous refractive index. A preferred coating layer has a maximum local refractive index which is less than 1.2 time the minimum local refractive index, preferably less than 1.1, more preferably less than 1.05.

A preferred coating layer has a constant thickness across its transverse extension. A preferred coating layer has a ratio of smallest thickness to largest thickness in the range from 1:1 to 1:1.1, preferably in the range from 1:1 to 1:1.05, more preferably in the range from 1:1 to 1:1.01.

In one embodiment, the coating comprises one or more coating layers of group A. Coating layers of group A have a refractive index of at least 1.7. A preferred coating layer of group A has a refractive index in the range from 1.70 to 2.60, preferably in the range from 1.80 to 2.60, more preferably from 1.90 to 2.50, more preferably from 1.95 to 2.45. A preferred coating layer of group A has a refractive index of at least 1.80, more preferably at least 1.90, more preferably at least 1.95. A preferred coating layer of group A has a refractive index up to 2.60, more preferably up to 2.50, more preferably up to 2.45. A preferred coating layer of group A is made of a material selected from the group consisting of: $Si_3N_4$, $ZrO_2$, $Ta_2O_5$, $HfO_2$, $Nb_2O_5$, $TiO_2$, $SnO_2$, indium tin oxide, $ZnO_2$, AlN, a mixed oxide comprising at least one thereof, a mixed nitride comprising at least one thereof and a mixed oxynitride comprising at least one thereof; preferably made of a material selected from the group consisting of $ZrO_2$, $Ta_2O_5$, $HfO_2$, $Nb_2O_5$, $TiO_2$. and a mixed oxide comprising at least one thereof. In one aspect of this embodiment, the coating layer is made of $ZrO_2$, or $HfO_2$, preferably $ZrO_2$. Preferred mixed oxides are $TiO_2/SiO_2$; $Nb_2O_5/SiO_2$ and $ZrO_2/Y_2O_3$. A preferred mixed nitride is AlSiN. A preferred mixed oxynitride is AlSiON.

In one embodiment, the optical element comprises two or more layers of group A, wherein at least one pair of the group A layers are of different materials. In another embodiment, the optical element comprises two or more layers of group A, wherein all of the group A layers are of the same material.

In one embodiment, the coating comprises one or more coating layers of group B. Coating layers of group B have a refractive index less than 1.7. A preferred coating layer of group B has a refractive index in the range from 1.37 to 1.60, preferably from 1.37 to 1.55, more preferably from 1.38 to 1.50. A preferred coating layer of group B has a refractive index of at least 1.37, preferably at least 1.38. A preferred coating layer of group B has a refractive index of up to 1.60, preferably up to 1.55, more preferably up to 1.50.

A preferred coating layer of group B is made of a material selected from the group consisting of: $SiO_2$, $MgF_2$ and a mixed oxide comprising $SiO_2$ and a further oxide. A preferred mixed oxide in this context comprises $SiO_2$ and $Al_2O_3$. A preferred mixed oxide in this context comprises $SiO_2$ in the range from 50 to 98 wt. %, more preferably from 60 to 95 wt. %, more preferably from 70 to 93 wt. %. A preferred mixed oxide in this context comprises $SiO_2$ up to 98 wt. %, more preferably up to 95 wt. %, more preferably up to 93 wt. %. A preferred mixed oxide in this context comprises at least 50 wt. % $SiO_2$, more preferably at least 60 wt. %, more preferably at least 70 wt. %. A preferred mixed oxide in this context is comprises $SiO_2$ in the range from 50 to 98 wt. %, more preferably from 60 to 95 wt. %, more preferably from 70 to 93 wt. % and $Al_2O_3$ in the range from 2 to 50 wt. %, more preferably from 5 to 40 wt. %, more preferably from 7 to 30 wt. %.

In one embodiment, the optical element comprises two or more layers of group B, wherein at least one pair of the group B layers are of different materials. In another embodiment, the optical element comprises two or more layers of group B, wherein all of the group B layers are of the same material.

In some of the embodiments, the coating structure is described in terms of regions of type A and type B, wherein regions of type A have a higher refractive index and regions of type B have a lower refractive index. So-called needle layers having a thickness of 5 nm or less do not influence the nature of a region as type A or B. Regions are characterized based on coating layers having a thickness of above 5 nm.

So-called needle layers might have a thickness of as low as 1 nm. A so-called needle layer could be as thin as an atomic mono-layer.

Coupling and Decoupling

A preferred coupling means is suitable for introducing light into the optical element, preferably for introducing an image into the optical element, preferably an overlaid image. A preferred decoupling means is suitable for removing light from the optical element, preferably for removing an image from the optical element, preferably an overlaid image.

In one embodiment, a coupling means is provided for introducing an overlaid image into the optical element. In one embodiment, a coupling means is provided for introducing an image into the optical element for transverse propagation.

In one embodiment, a decoupling means is provided for removing an overlaid image from the optical element, preferably out of the back face. In one embodiment, a decoupling means is provided for removing an image from the optical element, wherein the image is propagating in a transverse direction.

In one embodiment, $n_0$ coupling or decoupling means is provided for the real world image.

In one embodiment, a coupling means is provided for introducing light into the optical element.

In one embodiment, a de-coupling means is provided for taking light out of the optical element.

Preferred coupling means are refractive and/or diffractive optical elements, preferably a prism or a diffraction grating.

Coupling and decoupling means may be integrated into the optical element or provide externally to it, preferably attached to it.

In one embodiment the optical element comprises more decoupling means than coupling means.

In one embodiment light coupled in by a single coupling means is decoupled by two or more decoupling means.

In one embodiment, the optical element comprises two or more decoupling means and each decoupling means corresponds to a pixel of an image.

A coupling means may be present at the front, side or rear of the optical element, preferably at the rear or at the side.

A decoupling means may be present on the front side or on the back side of the optical element.

Coupling preferably comprises deviation of light by an angle in the range from 30 to 180°, preferably in the range from 45 to 180°, more preferably in the range from 90 to 180°, more preferably in the range from 135 to 180°. Coupling preferably comprises deviation of light by an angle of at least 30°, preferably at least 45°, more preferably at least 90°, more preferably at least 135°.

Decoupling preferably comprises deviation of light by an angle in the range from 30 to 180°, preferably in the range from 45 to 135°, more preferably in the range from 60 to 120°, more preferably in the range from 70 to 110°. Decoupling preferably comprises deviation of light by an angle of at least 30°, preferably at least 45°, more preferably at least 60°, more preferably at least 70°. Decoupling preferably comprises deviation of light by an angle up to 180°, preferably up to 135°, more preferably up to 120°, more preferably up to 110°.

Process

The optical element can be prepared by any method known to the skilled person and which he considers suitable. Preferred methods for applying a coating comprise physical vapor deposition. Preferred physical vapor deposition is sputtering or evaporation, preferably evaporation. A preferred physical vapor deposition is oxidative physical vapor deposition.

The process preferably comprises a cleaning step, preferably of the front face. A preferred cleaning step may comprise ultrasound. A preferred cleaning step may involve water; an alkaline cleaner, preferably having a pH in the range from 7.5 to 9; or a pH neutral cleaner other than water.

Coating layers are preferably deposited at a rate in the range from 0.5 to 10 Å/s, preferably in the range from 0.75 to 8 Å/s, more preferably in the range from 1 to 5 Å/s. Coating layers are preferably deposited at a rate of at least 0.5 Å/s, preferably at least 0.75 Å/s, more preferably at least 1 Å/s. Coating layers are preferably deposited at a rate of up to 10 Å/s, preferably up to 8 Å/s, more preferably up to 5 Å/s.

Physical vapor deposition is preferably performed with a optical element temperature in the range from 110 to 250° C., more preferably in the range from 120 to 230° C., more preferably in the range from 140 to 210° C. Physical vapor deposition is preferably performed with a optical element temperature of at least 110° C., more preferably at least 120° C., more preferably at least 140° C. Physical vapor deposition is preferably performed with a optical element temperature up to 250° C., more preferably up to 230° C., more preferably up to 210° C.

In the case of polymer optical elements, lower deposition ranges are preferred such as from 100 to 150° C.

Physical vapor deposition is preferably performed under a pressure of less than 1×10' Pa, more preferably less than $5 \times 10^{-3}$ Pa, more preferably less than $3 \times 10^{-3}$ Pa.

Device

A contribution to overcoming at least one of the above referenced objects is made by a device comprises optical elements according to the disclosure.

Optical elements are preferably spaced. A preferred spacing is in the range from 600 nm to 1 mm, preferably in the range from 5 μm to 500 μm, more preferably in the range from 50 μm to 400 nm. A preferred spacing is at least 600 nm, preferably at least 5 μm, more preferably at least 50 μm. A preferred spacing is up to 1 mm, preferably up to 500 μm, more preferably up to 400 nm.

In one embodiment, three optical elements are provided for propagating red, green and blue light respectively. In one aspect of this embodiment, an optical element is provided for propagating light having a vacuum wavelength in the range from 564 to 580 nm. In one aspect of this embodiment, an optical element is provided for propagating light having a vacuum wavelength in the range from 534 to 545 nm. In one aspect of this embodiment, an optical element is provided for propagating light having a vacuum wavelength in the range from 420 to 440 nm.

The device preferably comprises a projector for projecting an image into the optical element via a coupling means.

Combinations of Materials

In one embodiment, the R-type, G-type and B-type optical elements, being the first optical elements or the second optical elements or the further optical elements or two or more or all thereof, are made of the same material. In this context, at least 50% by volume of an optical element consists of the material from which it is made.

In one embodiment, the R-type, G-type and B-type optical elements, being the first optical elements or the second optical elements or the further optical elements or two or more or all thereof, are all made of different materials. In this context, at least 50% by volume of an optical element consists of the material from which it is made.

In one embodiment, R-type and G-type optical elements, being the first optical elements or the second optical elements or the further optical elements or two or more or all thereof, are made of the same material and the B-type optical element is made of a different material.

In one embodiment, B-type and G-type optical elements, being the first optical elements or the second optical elements or the further optical elements or two or more or all thereof, are made of the same material and the R-type optical element is made of a different material.

In one embodiment, R-type and B-type optical elements, being the first optical elements or the second optical elements or the further optical elements or two or more or all thereof, are made of the same material and the G-type optical element is made of a different material.

Image Distances

A preferred device may present generated images at different image distances. In one embodiment, the device presents a first generated image at a first image distance and a second generated image at a second image distance, wherein the first and the second image distances are different. The first and second image distances are preferably separated by more than 2 mm, more preferably more than 3 mm, more preferably more than 5 mm.

In a device in which generated images are presented at different image distances, it is preferred for one or more of the images to be generated by two or more colored sources. In a preferred embodiment, one or more of the generated images is an RGB image. Where a generated image at a given image distance is generated by two or more colored sources, it is preferred for these colored sources to correspond to optical elements which are relatively close to each other, preferably less than 2 mm, more preferably less than 500 µm, more preferably less than 300 µm, more preferably less than 200 µm. In one embodiment, a generated image at a given image distance is produced by a triplet of an R-type optical element, a G-type optical element and a B-type optical element, preferably with $n_0$ spaces of more than 2 mm in between, more preferably less than 500 µm, more preferably less than 300 µm, more preferably less than 200 µm. In one aspect of this embodiment, the device comprises two or more such triplets, the spacings between triplets being more than 2 mm, preferably more than 3 mm, more preferably more than 5 mm.

FIG. 1 shows an optical element employed in the present disclosure. The optical element 101 has a front face 604, a back face 605. The direction 107 emanates from the front face 604 and is perpendicular to it. The direction 106 emanates from the back face 605 and is perpendicular to it. The optical element has a length 602 and width 601, each parallel to the front face. The optical element has a thickness 603 determined perpendicular to the front face 604.

Figure 2:
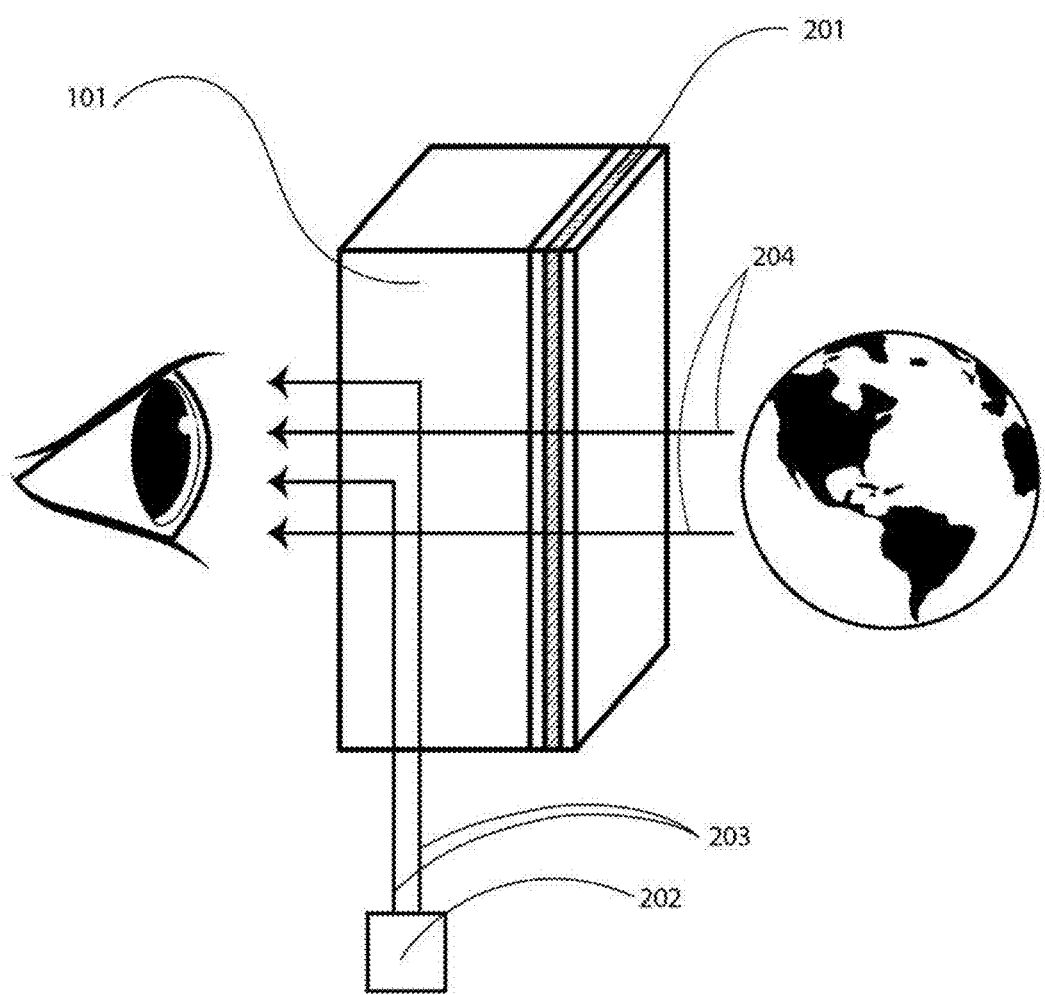
FIG. 2 shows an optical element according to the present disclosure with side coupling of an overlaid image.

FIG. 2 shows an optical element according to the present disclosure with side coupling of an overlaid image. The optical element 101 has a front face and a back face. On the front face of the optical element 101 is applied a coating 201. A real world image 204 enters the optical element through the front face, piercing the coating 201 and the optical element 101, to pass out of the back face. An overlaid image 203 is generated at a projector 202, positioned to the side of the optical element, and passes through the optical element transverse to the front face to then exit through the back face. The real world image 204 and the overlaid image 203 are both viewed by a viewer located behind the back face. In a variant, the coating 201 may be applied to the back face rather than the front face. In a variant, coatings 201 are applied to both the back face and the front face. Not shown are decoupling means on the back face, for example diffraction gratings. Where a coating is present on the back face, the decoupling means is preferably located between the optical element and the coating.

Figure 3:
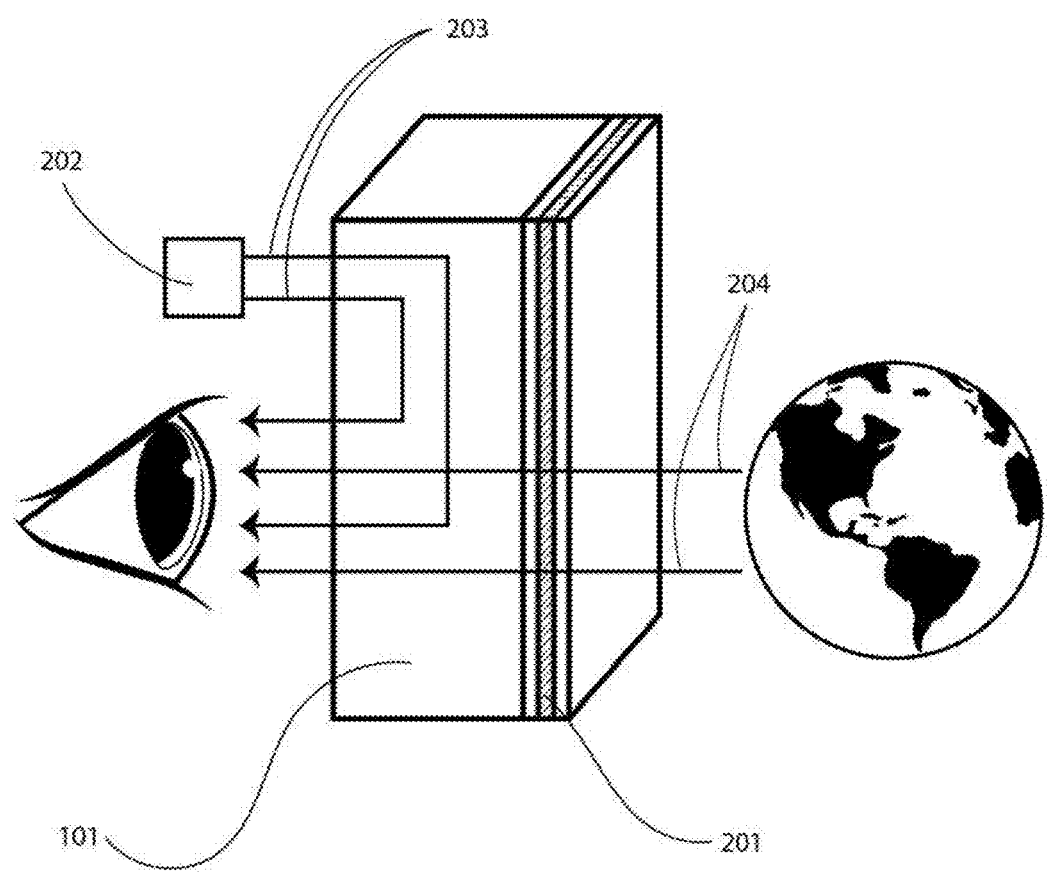
FIG. 3 shows an optical element according to the present disclosure with back side coupling of an overlaid image.

FIG. 3 shows an optical element according to the present disclosure with back side coupling of an overlaid image. The optical element 101 has a front face and a back face. On the front face of the optical element 101 is applied a coating 201. A real world image 204 enters the optical element through the front face, piercing the coating 201 and the optical element 101, to pass out of the back face. An overlaid image 203 is generated at a projector 202, positioned at the back of the optical element, and passes through the optical element transverse to the front face to then exit through the back face. The real world image 204 and the overlaid image 203 are both viewed by a viewer located behind the back face. In a variant, the coating 201 may be applied to the back face rather than the front face. In a variant, coatings 201 are applied to both the back face and the front face. Not shown are decoupling means on the back face, for example diffraction gratings. Where a coating is present on the back face, the decoupling means is preferably located between the optical element and the coating.

Figure 4:
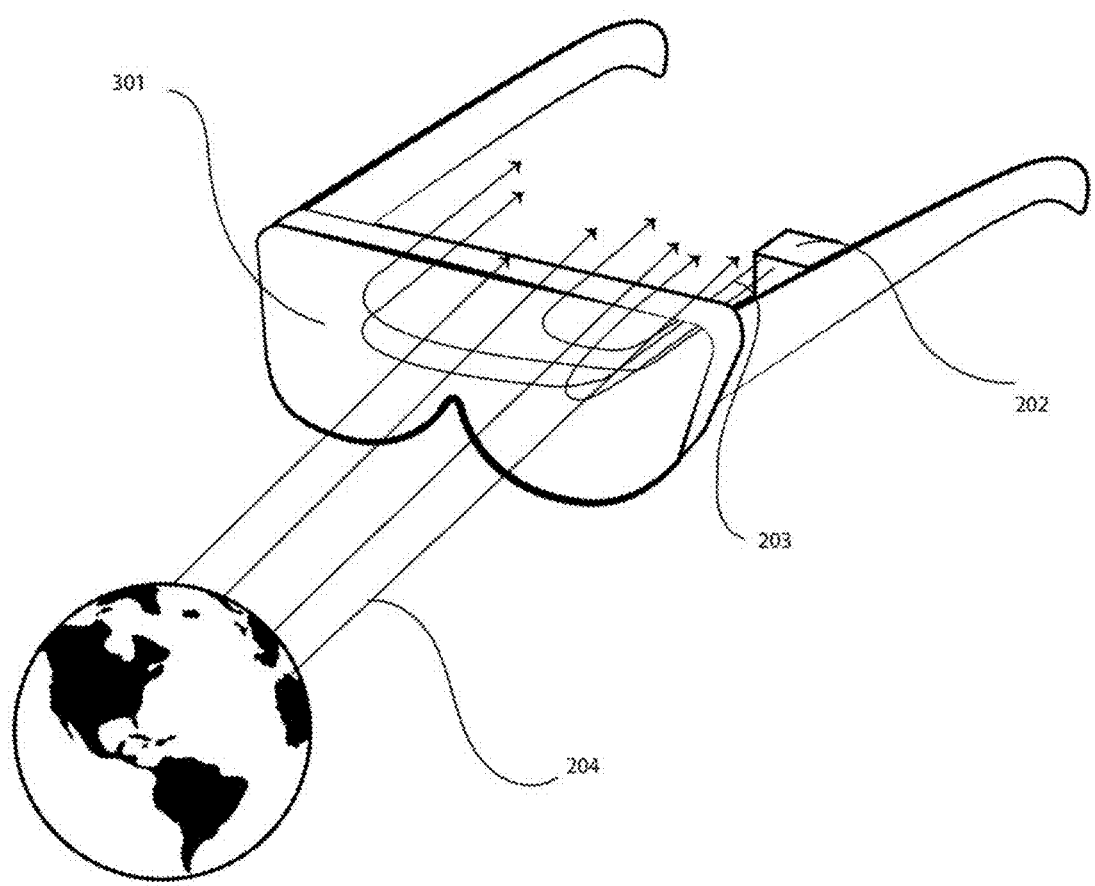
FIG. 4 shows an AR device according to the present disclosure.

FIG. 4 shows an AR device according to the present disclosure. A set of glasses/visor has a screen 301 comprising the optical element of the disclosure. A real world image 204 penetrates the screen 301 from the front side to reach the back side. An overlaid image 203 is projected from a projector 202 located behind the screen 301. The overlaid image 203 propagates within the plane of the screen 301 and exits through its back face. Both the real world image 204 and the overlaid image 203 are received behind the back face.

Figure 5:
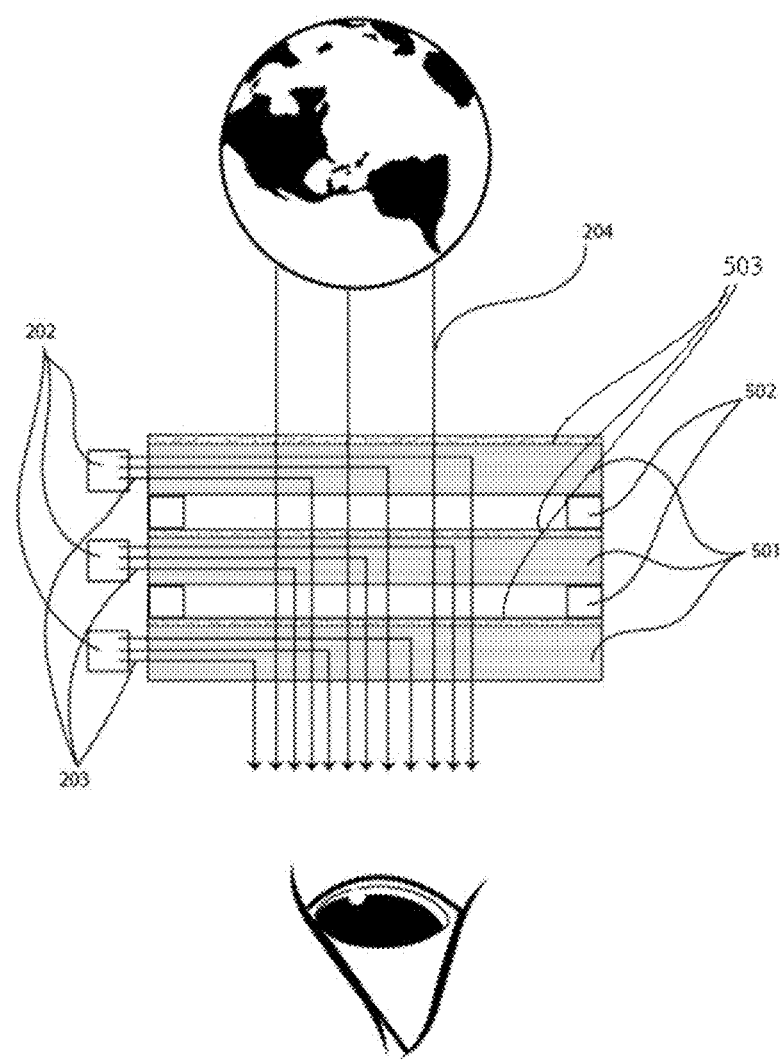
FIG. 5 shows a device comprising three optical elements according to the present disclosure arranged in a stack.

FIG. 5 shows a device comprising three optical elements according to the present disclosure arranged in a stack. The optical elements 501 are oriented parallel, overlapping as a stack, with their front faces in the same direction. Coatings 503 are present on the front faces. The optical elements 501 are spaced by spacers 502 to leave an air gap betwixt. A real world image 204 penetrates through the optical elements sequentially and exits through the back face of the last thereof. A separate projector 202 injects an overlaid image 203 into each of the optical elements. In each case, the overlaid image 203 exits the optical element through the back face and combines with the real world image behind the back faces to give the augmented reality.

Figure 6:
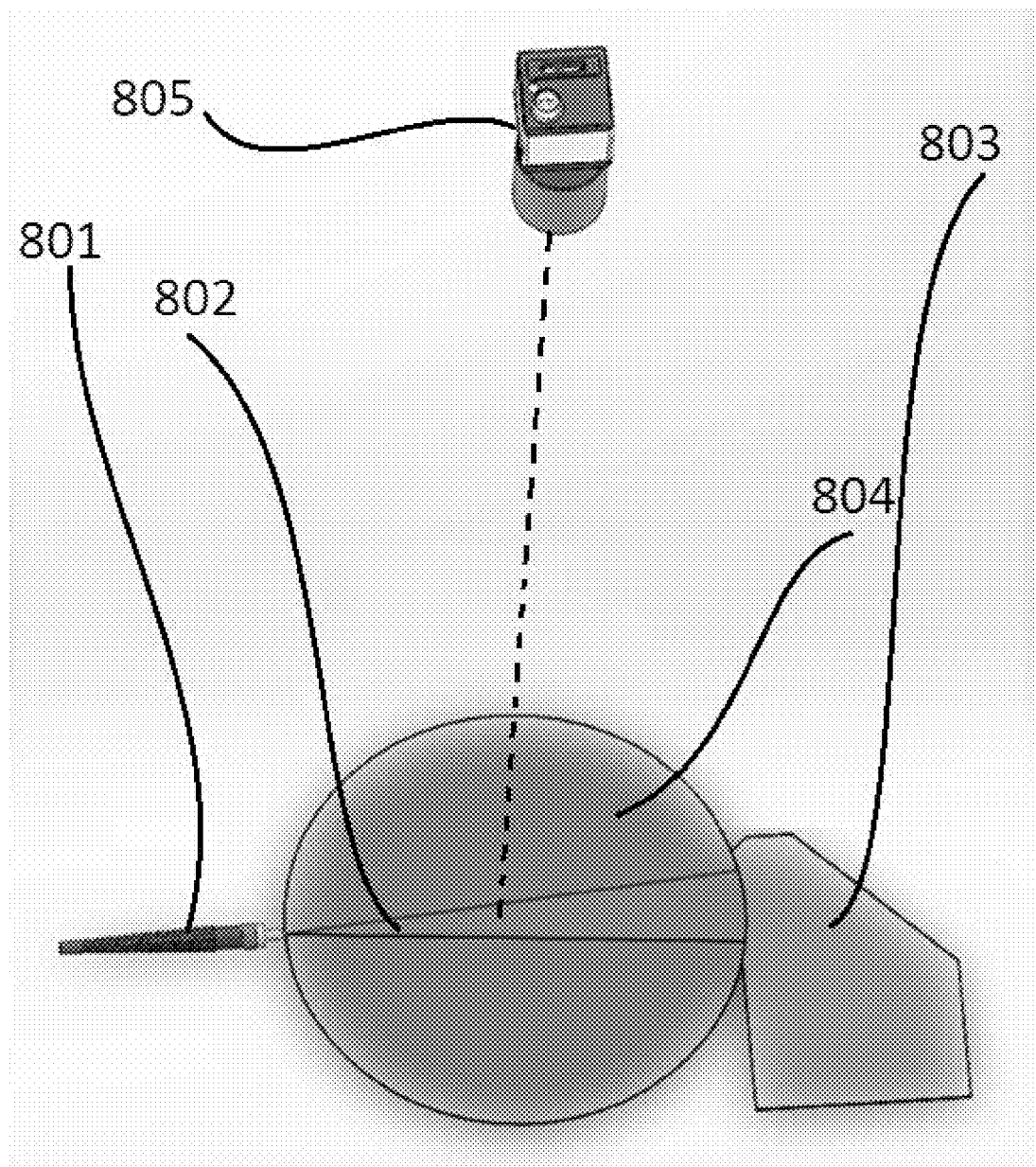
FIG. 6 shows an arrangement for determining in-plane optical loss of a target.

FIG. 6 shows an arrangement for determining in-plane optical loss of a target. The target 804 is of circular cross-section, having a diameter of 20 cm. Light is introduced into the target 804 from a light guiding FIG. 801 and follows a path 802 through the target 804. On the opposite side of the target 804 is located a light trap 803. Intensity of scattered light is measured using a camera located 50 cm above the geometric center of the target.

Figure 7:
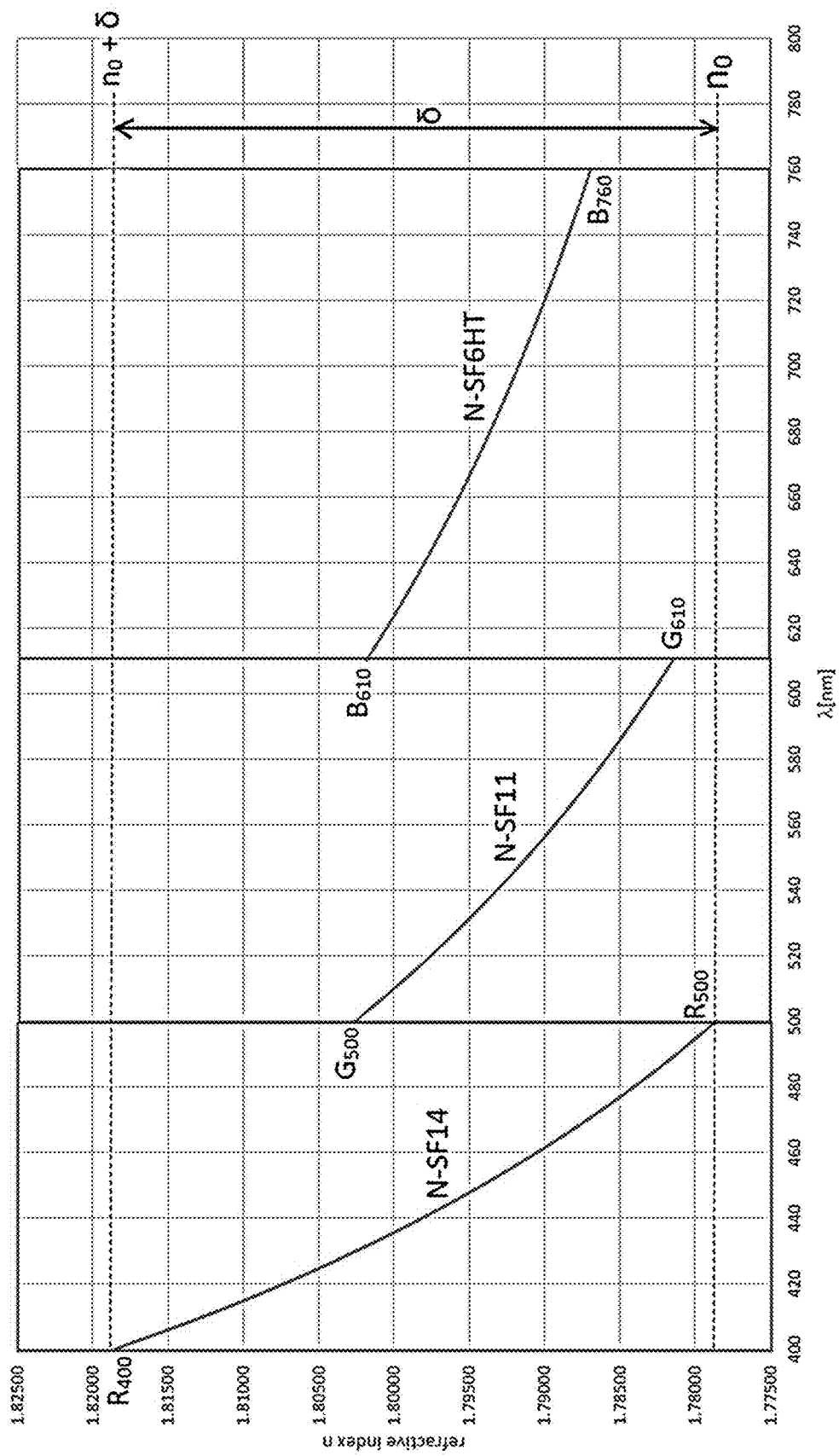
FIG. 7 is a graph of refractive index against wavelength for the three optical elements of example 394.

FIG. 7 is a graph of refractive index against wavelength for the three optical elements of example 394 (examples section). N—SF14 has been selected as the R-type optical element and its refractive index is shown in the range from 400 to 500 nm. Its refractive index at 400 nm and 500 nm is labelled as $R_{400}$ and $R_{500}$ respectively. N—SF11 has been selected as the G-type optical element and its refractive index is shown in the range from 500 to 610 nm. Its refractive index at 610 nm and 760 nm is labelled as $G_{400}$ and $G_{500}$ respectively. N-SF6HT has been selected as the B-type optical element and its refractive index is shown in the range from 610 to 760 nm. Its value at 610 nm and 760 nm are labelled as $B_{610}$ and $B_{760}$ respectively. In this case, $R_{500}$ is the lowest refractive index in the system and defines no. $R_{400}$ is the highest refractive index in the system, thus defining $n_0+\delta$.\

Test Methods

Unless otherwise stated, all test methods are performed at a temperature of 25° C. and a pressure of 101,325 Pa. Unless otherwise stated, optical measurements are made using a 550 nm vacuum wavelength source.

Bow

Bow is measured according to ASTM F534

Warp

Warp is measured according to ASTM F657

In-Plane Optical Loss

The target substrate or optical element is provided as a circular disk of diameter 15 cm. In the case of the optical element, the front face (with the coating) is oriented upwards. A light guiding fiber having a numerical aperture of 0.15 is arranged to inject light into the target by polishing a 3 mm flat area at one side of the target and arranging the outlet face of the fiber parallel to and in physical contact with it. An immersion oil selected from the following list is deployed between the fiber and the target: Cargille Labs Series A (1.460≤n≤1.640), Cargille Labs Series B (1.642≤n≤1.700), Cargille Labs Series M (1.705≤n≤1.800), Cargille Labs Series H (1.81≤n≤2.00), Cargille Labs Series EH (2.01≤n≤2.11), Cargille Labs Series FH (2.12≤n≤2.21), Cargille Labs Series GH (2.22≤n≤2.31). The immersion oil having a refractive index closest to that of the target is selected. The light from the fiber is injected towards the geometric center of the target and travels through the target to the opposite side. The spreading is determined by the numerical aperture of 0.15. A light trap is arranged at the opposite side to reduce reflection. A digital camera (CMOS or CCD (charge coupled device) camera is located 50 cm above the geometric center of the target, directed towards the target. The camera takes a grey scale picture of the target which is calibrated in linear response curve. The intensity of scattered light is measured at 0.8 cm intervals along the line between the point of injection and the opposite side. Intensity of scattered light is fitted to an exponential decay curve, normalized and the value at the opposite side extrapolated to give the in-plane optical loss. Unless otherwise stated, in-plane optical loss is measured using a 450 nm vacuum wavelength light source.

The apparatus is calibrated by measuring photo current using an integrating sphere at the target's center. The image processing algorithm generates a circular region of the same size and position as the sphere's input port. The grey scale signal within this region is cumulated in order to calibrate the camera's grey scale signal to the radiometric world.

Internal Transmission

The internal transmittance is measured for a 10 mm thick sample and calculated using:

$\tau_i(\lambda)=T(\lambda)/P$ wherein "T" indicates the measured transmittance from glass sample and "P" indicates the reflection factor, which is calculated by $P=2n/(n^2+1)$ wherein "n" indicates the refractive index of the sample glass. "n" slightly changes following vacuum wavelength.

The transmittance T was determined by means of a double beam spectral photometer (e.g. from Perkin Elmer).

In particular, the transmittance T is generally determined as the ratio $I/I_0$, wherein $I_0$ is the light intensity applied to the sample and I is the light intensity detected behind the sample. In other words, the measured transmittance T reflects the fraction of light of a particular vacuum wavelength that has been transmitted through the sample.

Integrated internal transmission for a single optical element is found by integrating the transmission over the relevant wavelength range and dividing by the width of the wavelength range. The range 400 to 500 nm is employed for B-type optical elements, 500 to 570 nm for G-type optical elements and 610 to 760 nm for R-type optical elements.

Integrated internal transmission for a set of three optical elements, in particularly an RGB triplet, is the geometric mean of the integrated internal transmission for the three individual elements, namely the cube root of their product:

$T=(T_{red} \cdot T_{blue} \cdot T_{green})^{1/3}$

Refractive Index

The refractive index n is preferably determined using a refractometer, preferably a v-block refractometer. First, the samples were shaped in a nearly square shape (about 20×20×5 mm). Then, the samples were placed in a v shaped block prism having a known refractive index. The refraction of an incoming light beam depends on the refractive index difference between the sample and the v-block prism. Standard measurement temperature is 22° C.

Density

The density of the glasses was determined according to ASTM C693-93 (reapproved in the year 2008) at or near 25° C. by buoyancy. Average density of three optical elements is measured for three optical elements of the same size and thickness and is found by adding their values and dividing by 3.

Roughness

Surface roughness is measured using an atomic force microscope, model DI nanoscope D3100-S1 from Digital Instruments. An area of the sample of 2 μm by 2 μm is scanned in tapping mode, scanning the area with 256 lines per picture and 256 dots per line. The scan rate is 0.7 Hz. The cantilever has a tip with a tip radius of ≤10 nm. The sample's topography is measured by evaluating the change of the amplitude of the oscillating cantilever when scanning the surface. The raw data is levelled by a line fit, using a $3^{rd}$ order polynomial fit. The root mean squared roughness $R_{rms}$ is calculated by the AFM's software using the formula $$R_{rms} = \sqrt{\frac{1}{n}\sum_{i=1}^{n} y_i^2},$$

where n=256*256=65536 and $y_i$ is the height value at each of the 65536 measured positions.

EXAMPLES

The present disclosure is now exemplified by means of non-limiting examples.

Example 1

Preparing Coated Optical Elements

Coatings were applied to 300 μm optical elements as follows: A front face of the wafer was cleaned in a bath of de-ionized water at 40° C. with ultrasound at 130 kHz for 200 seconds. The wafer was then dried with air at 60° C. for 500 seconds. A surface almost entirely devoid of impurity particles thereon was obtained. The wafer was mounted on the evaporation dome in the vacuum chamber of a Leybold APS 1104 and the evaporation machine was charged with the appropriate coating materials. The pressure of the evacuation chamber was lowered to 1×10⁻³ Pa. Layers where deposited at a rate of 2.5 Å/s with an ion energy 60 eV. In each case, the following layers were applied in order, starting from the surface of the optical element: a 22 nm layer of $TiO_2$; a 33 nm layer of $SiO_2$, a 28 nm layer of $TiO_2$; a 109 nm layer of $SiO_2$.

Example 2

Construction of Devices

Devices were constructed according to FIG. 4, the screen comprising an arrangement of three optical elements as shown in FIG. 5. FIG. 5 shows the materials used for the red-type, green-type and blue-type optical elements, along with refractive index at two vacuum wavelengths for each. The red-type optical element is furthest from the viewer, followed by the green-type optical element and finally the blue-type optical element is closest to the viewer. The optical elements are spaced with 200 μm air. The gap between the blue-type optical element and the viewer's eyes is 40 mm. The substrate material for the three optical elements were configured as shown in tables 1 to 11. The materials are available from Schott AG and other glass producers. For each example, internal transmission and density is given for each optical element and the integrated internal transmission, density and their quotient determined therefrom. The results are shown in tables 1 to 11.

Table 12 shows some comparative examples with minimum value of refractive index of around 1.55. Example 1001 is taken from Table 1 and examples 1002 to 1007 combine one or two glasses from table 1 with two or one glasses from table 9.

Table 13 shows some comparative examples with minimum value of refractive index of around 1.7. Example 1101 is taken from Table 5 and examples 1102 to 1107 combine one or two glasses from table 5 with two or one glasses from table 9.

TABLE 1a

| | | | Glass for B-position | | | |
|---|---|---|---|---|---|---|
| Ex | glass company: | glass name: | from n(400 nm) | to n(500 nm) | density [g/cm³] | Ti integral (400-500 nm) |
| 101 | Schott | N-BALF5 | 1.5657 | 1.5533 | 2.61 | 0.993 |
| 102 | Schott | N-BALF5 | 1.5657 | 1.5533 | 2.61 | 0.993 |
| 103 | Schott | N-BALF5 | 1.5657 | 1.5533 | 2.61 | 0.993 |
| 104 | Schott | N-BALF5 | 1.5657 | 1.5533 | 2.61 | 0.993 |
| 105 | Schott | LLF1HTi | 1.5700 | 1.5551 | 2.94 | 0.999 |
| 106 | Schott | LLF1HTi | 1.5700 | 1.5551 | 2.94 | 0.999 |
| 107 | Schott | LLF1 | 1.5701 | 1.5551 | 2.94 | 0.998 |
| 108 | Schott | N-PSK3 | 1.5675 | 1.5573 | 2.91 | 0.995 |
| 109 | Schott | N-BAK4HT | 1.5869 | 1.5747 | 3.05 | 0.997 |
| 110 | Schott | N-BAK4 | 1.5869 | 1.5747 | 3.05 | 0.995 |
| 111 | Schott | N-SK11 | 1.5802 | 1.5692 | 3.08 | 0.995 |
| 112 | Schott | N-BAK4HT | 1.5869 | 1.5747 | 3.05 | 0.997 |
| 113 | Schott | N-SK11 | 1.5802 | 1.5692 | 3.08 | 0.995 |
| 114 | Schott | N-BAK4 | 1.5869 | 1.5747 | 3.05 | 0.995 |
| 115 | Schott | N-BAK4HT | 1.5869 | 1.5747 | 3.05 | 0.997 |
| 116 | Schott | N-BAK4 | 1.5869 | 1.5747 | 3.05 | 0.995 |
| 117 | Schott | N-BAK1 | 1.5902 | 1.5782 | 3.19 | 0.996 |
| 118 | Schott | LLF1HTi | 1.5700 | 1.5551 | 2.94 | 0.999 |
| 119 | Schott | N-BAK4HT | 1.5869 | 1.5747 | 3.05 | 0.997 |
| 120 | Schott | N-BAK4HT | 1.5869 | 1.5747 | 3.05 | 0.997 |
| 121 | Schott | N-BAK1 | 1.5902 | 1.5782 | 3.19 | 0.996 |
| 122 | Schott | N-BAK1 | 1.5902 | 1.5782 | 3.19 | 0.996 |
| 123 | Schott | LF5HTi | 1.6079 | 1.5897 | 3.22 | 0.999 |
| 124 | Schott | LF5HTi | 1.6079 | 1.5897 | 3.22 | 0.999 |
| 125 | Schott | LF5HTi | 1.6079 | 1.5897 | 3.22 | 0.999 |
| 126 | Schott | LF5 | 1.6079 | 1.5897 | 3.22 | 0.998 |
| 127 | Sumita | K-SKLD120 | 1.6040 | 1.5924 | 2.64 | 0.998 |
| 128 | Sumita | K-SKLD120 | 1.6040 | 1.5924 | 2.64 | 0.998 |
| 129 | NHG | D-ZK3L | 1.6059 | 1.5947 | 2.79 | 0.998 |
| 130 | Sumita | K-SKLD120 | 1.6040 | 1.5924 | 2.64 | 0.998 |
| 131 | Sumita | K-SKLD120 | 1.6040 | 1.5924 | 2.64 | 0.998 |
| 132 | NHG | D-ZK3L | 1.6059 | 1.5947 | 2.79 | 0.998 |
| 133 | NHG | D-ZK3L | 1.6059 | 1.5947 | 2.79 | 0.998 |
| 134 | Sumita | K-CSK120 | 1.6044 | 1.5927 | 3.00 | 0.998 |
| 135 | NHG | H-ZK3A | 1.6060 | 1.5947 | 3.31 | 0.998 |
| 136 | Sumita | K-SKLD120 | 1.6040 | 1.5924 | 2.64 | 0.998 |
| 137 | NHG | D-ZK2N | 1.6043 | 1.5927 | 2.98 | 0.998 |

| | | | Glass for G-position | | | |
|---|---|---|---|---|---|---|
| Ex | glass company: | glass name: | From n(500 nm) | to n(570 nm) | density [g/cm³] | Ti integral (500-570 nm) |
| 101 | Schott | N-PSK3 | 1.5573 | 1.5531 | 2.91 | 0.997 |
| 102 | Schott | N-PSK3 | 1.5573 | 1.5531 | 2.91 | 0.997 |
| 103 | Schott | N-SK11 | 1.5692 | 1.5647 | 3.08 | 0.999 |
| 104 | Schott | N-SK11 | 1.5692 | 1.5647 | 3.08 | 0.999 |
| 105 | Schott | N-PSK3 | 1.5573 | 1.5531 | 2.91 | 0.997 |
| 106 | Schott | N-PSK3 | 1.5573 | 1.5531 | 2.91 | 0.997 |
| 107 | Schott | N-SK11 | 1.5692 | 1.5647 | 3.08 | 0.999 |
| 108 | Schott | N-BALF4 | 1.5858 | 1.5806 | 3.11 | 0.998 |
| 109 | Schott | N-BAK4HT | 1.5747 | 1.5698 | 3.05 | 0.998 |
| 110 | Schott | N-SK11 | 1.5692 | 1.5647 | 3.08 | 0.999 |
| 111 | Schott | N-SK11 | 1.5692 | 1.5647 | 3.08 | 0.999 |

TABLE 1a-continued

| | | | | | | |
|---|---|---|---|---|---|---|
| 112 | Schott | N-BAK1 | 1.5782 | 1.5734 | 3.19 | 0.998 |
| 113 | Schott | N-BALF4 | 1.5858 | 1.5806 | 3.11 | 0.998 |
| 114 | Schott | N-BAK4HT | 1.5747 | 1.5698 | 3.05 | 0.998 |
| 115 | Schott | N-SK11 | 1.5692 | 1.5647 | 3.08 | 0.999 |
| 116 | Schott | LF5HTi | 1.5897 | 1.5828 | 3.22 | 0.999 |
| 117 | Schott | N-SK11 | 1.5692 | 1.5647 | 3.08 | 0.999 |
| 118 | Schott | LF5HTi | 1.5897 | 1.5828 | 3.22 | 0.999 |
| 119 | Schott | N-BAK1 | 1.5782 | 1.5734 | 3.19 | 0.998 |
| 120 | Schott | LF5 | 1.5897 | 1.5828 | 3.22 | 0.999 |
| 121 | Schott | N-BALF4 | 1.5858 | 1.5806 | 3.11 | 0.998 |
| 122 | Schott | LF5 | 1.5897 | 1.5828 | 3.22 | 0.999 |
| 123 | Schott | LF5HTi | 1.5897 | 1.5828 | 3.22 | 0.999 |
| 124 | Schott | N-BAK4 | 1.5747 | 1.5698 | 3.05 | 0.998 |
| 125 | Schott | LF5HTi | 1.5897 | 1.5828 | 3.22 | 0.999 |
| 126 | Schott | LF5 | 1.5897 | 1.5828 | 3.22 | 0.999 |
| 127 | Ohara | S-TIM 8 | 1.6043 | 1.5969 | 2.63 | 0.996 |
| 128 | Ohara | S-TIM 8 | 1.6043 | 1.5969 | 2.63 | 0.996 |
| 129 | Ohara | S-TIM 8 | 1.6043 | 1.5969 | 2.63 | 0.996 |
| 130 | Ohara | S-FTM16 | 1.6025 | 1.5943 | 2.64 | 0.996 |
| 131 | NHG | H-QF14 | 1.6043 | 1.5969 | 2.71 | 0.998 |
| 132 | NHG | D-ZK3L | 1.5947 | 1.5900 | 2.79 | 0.998 |
| 133 | NHG | H-QF14 | 1.6043 | 1.5969 | 2.71 | 0.998 |
| 134 | NHG | D-ZK3L | 1.5947 | 1.5900 | 2.79 | 0.998 |
| 135 | Ohara | S-FTM16 | 1.6025 | 1.5943 | 2.64 | 0.996 |
| 136 | Ohara | S-TIM 8 | 1.6043 | 1.5969 | 2.63 | 0.996 |
| 137 | NHG | D-ZK3L | 1.5947 | 1.5900 | 2.79 | 0.998 |

TABLE 1b

| | | Glass for R position | | | | | Totals | | |
|---|---|---|---|---|---|---|---|---|---|
| Ex | glass company: | glass name: | From n(610 nm) | To n(760 nm) | density [g/cm$^3$] | Ti integral (610-760 nm) | average density | $T = (T_{red} \cdot T_{blue} \cdot T_{green})^{1/3}$ | FoM $(T_{red} \cdot T_{blue} \cdot T_{green})^{1/3}$/ average density |
| 101 | Schott | N-BAF4 | 1.6042 | 1.5973 | 2.89 | 0.997 | 2.80 | 0.996 | 0.355 |
| 102 | Schott | N-BAK4 | 1.5677 | 1.5625 | 3.05 | 0.998 | 2.86 | 0.996 | 0.349 |
| 103 | Schott | N-BAK4 | 1.5677 | 1.5625 | 3.05 | 0.998 | 2.91 | 0.997 | 0.342 |
| 104 | Schott | N-BALF4 | 1.5784 | 1.5729 | 3.11 | 0.998 | 2.94 | 0.997 | 0.340 |
| 105 | Schott | N-BAK4HT | 1.5677 | 1.5625 | 3.05 | 0.998 | 2.97 | 0.998 | 0.337 |
| 106 | Schott | N-BALF4 | 1.5784 | 1.5729 | 3.11 | 0.998 | 2.99 | 0.998 | 0.334 |
| 107 | Schott | N-BAK4 | 1.5677 | 1.5625 | 3.05 | 0.998 | 3.02 | 0.998 | 0.330 |
| 108 | Schott | N-BAK4 | 1.5677 | 1.5625 | 3.05 | 0.998 | 3.02 | 0.997 | 0.330 |
| 109 | Schott | N-SK11 | 1.5628 | 1.5580 | 3.08 | 0.998 | 3.06 | 0.998 | 0.326 |
| 110 | Schott | N-BAK4 | 1.5677 | 1.5625 | 3.05 | 0.998 | 3.06 | 0.997 | 0.326 |
| 111 | Schott | N-BALF4 | 1.5784 | 1.5729 | 3.11 | 0.998 | 3.09 | 0.997 | 0.323 |
| 112 | Schott | N-BAK4 | 1.5677 | 1.5625 | 3.05 | 0.998 | 3.09 | 0.998 | 0.322 |
| 113 | Schott | N-BALF4 | 1.5784 | 1.5729 | 3.11 | 0.998 | 3.10 | 0.997 | 0.322 |
| 114 | Schott | LF5HTi | 1.5799 | 1.5729 | 3.22 | 0.999 | 3.10 | 0.997 | 0.321 |
| 115 | Schott | LF5HTi | 1.5799 | 1.5729 | 3.22 | 0.999 | 3.12 | 0.998 | 0.320 |
| 116 | Schott | N-SK11 | 1.5628 | 1.5580 | 3.08 | 0.998 | 3.12 | 0.997 | 0.320 |
| 117 | Schott | N-SK11 | 1.5628 | 1.5580 | 3.08 | 0.998 | 3.12 | 0.998 | 0.320 |
| 118 | Schott | LF5 | 1.5799 | 1.5729 | 3.22 | 0.999 | 3.13 | 0.999 | 0.320 |
| 119 | Schott | N-BAK1 | 1.5714 | 1.5663 | 3.19 | 0.998 | 3.14 | 0.998 | 0.317 |
| 120 | Schott | N-BAK1 | 1.5714 | 1.5663 | 3.19 | 0.998 | 3.15 | 0.998 | 0.317 |
| 121 | Schott | N-BAK1 | 1.5714 | 1.5663 | 3.19 | 0.998 | 3.16 | 0.997 | 0.315 |
| 122 | Schott | LF5HTi | 1.5799 | 1.5729 | 3.22 | 0.999 | 3.21 | 0.998 | 0.311 |
| 123 | Schott | LF5HTi | 1.5799 | 1.5729 | 3.22 | 0.999 | 3.22 | 0.999 | 0.310 |
| 124 | Schott | F5 | 1.6017 | 1.5939 | 3.47 | 0.999 | 3.25 | 0.999 | 0.308 |
| 125 | Schott | F5 | 1.6017 | 1.5939 | 3.47 | 0.999 | 3.30 | 0.999 | 0.302 |
| 126 | Schott | F5 | 1.6017 | 1.5939 | 3.47 | 0.999 | 3.30 | 0.998 | 0.302 |
| 127 | Ohara | S-TIM 5 | 1.6017 | 1.5939 | 2.63 | 0.997 | 2.63 | 0.997 | 0.379 |
| 128 | NHG | H-F1 | 1.6017 | 1.5939 | 2.63 | 0.998 | 2.63 | 0.997 | 0.379 |
| 129 | NHG | H-F1 | 1.6017 | 1.5939 | 2.63 | 0.998 | 2.68 | 0.997 | 0.372 |
| 130 | Ohara | S-BAM 4 | 1.6041 | 1.5972 | 2.91 | 0.997 | 2.73 | 0.997 | 0.365 |
| 131 | Schott | N-BAF4 | 1.6042 | 1.5973 | 2.89 | 0.997 | 2.75 | 0.998 | 0.363 |
| 132 | Sumita | K-BaSF5 | 1.6017 | 1.5946 | 2.71 | 0.998 | 2.76 | 0.998 | 0.361 |
| 133 | Schott | N-BAF4 | 1.6042 | 1.5973 | 2.89 | 0.997 | 2.80 | 0.998 | 0.357 |
| 134 | Hoya | E-F3 | 1.5926 | 1.5926 | 2.64 | 0.998 | 2.81 | 0.998 | 0.355 |
| 135 | Ohara | S-TIM 5 | 1.6017 | 1.5939 | 2.63 | 0.997 | 2.86 | 0.997 | 0.349 |
| 136 | Hoya | BACD2 | 1.5935 | 1.5935 | 3.53 | 0.998 | 2.93 | 0.997 | 0.340 |
| 137 | Hoya | BACD4 | 1.5995 | 1.5995 | 3.58 | 0.999 | 3.12 | 0.998 | 0.320 |

TABLE 2a

| | | Glass for B position | | | | |
|---|---|---|---|---|---|---|
| Ex | glass company: | glass name: | From n(400 nm) | To n(500 nm) | density [g/cm³] | Ti integral (400-500 nm) |
| 138 | Schott | LF5HTi | 1.6079 | 1.5897 | 3.22 | 0.999 |
| 139 | Schott | LF5HTi | 1.6079 | 1.5897 | 3.22 | 0.999 |
| 140 | Schott | LF5HTi | 1.6079 | 1.5897 | 3.22 | 0.999 |
| 141 | Schott | F2HT | 1.6522 | 1.6299 | 3.60 | 0.998 |
| 142 | Schott | F2HT | 1.6522 | 1.6299 | 3.60 | 0.998 |
| 143 | Schott | F2HT | 1.6522 | 1.6299 | 3.60 | 0.998 |
| 144 | Schott | LF5 | 1.6079 | 1.5897 | 3.22 | 0.998 |
| 145 | Schott | LF5 | 1.6079 | 1.5897 | 3.22 | 0.998 |
| 146 | Schott | F2 | 1.6522 | 1.6299 | 3.60 | 0.997 |
| 147 | Schott | N-SK2HT | 1.6265 | 1.6136 | 3.55 | 0.997 |
| 148 | Schott | N-SK2HT | 1.6265 | 1.6136 | 3.55 | 0.997 |
| 149 | Schott | N-SK2HT | 1.6265 | 1.6136 | 3.55 | 0.997 |
| 150 | Schott | N-SK2HT | 1.6265 | 1.6136 | 3.55 | 0.997 |
| 151 | Schott | N-SK2HT | 1.6265 | 1.6136 | 3.55 | 0.997 |
| 152 | Schott | N-SK2HT | 1.6265 | 1.6136 | 3.55 | 0.997 |
| 153 | Schott | N-SK2HT | 1.6265 | 1.6136 | 3.55 | 0.997 |
| 154 | Schott | N-SK2HT | 1.6265 | 1.6136 | 3.55 | 0.997 |
| 155 | Schott | N-SK2HT | 1.6265 | 1.6136 | 3.55 | 0.997 |
| 156 | Schott | N-SK2HT | 1.6265 | 1.6136 | 3.55 | 0.997 |
| 157 | Schott | N-SK2HT | 1.6265 | 1.6136 | 3.55 | 0.997 |
| 158 | Schott | N-SK2HT | 1.6265 | 1.6136 | 3.55 | 0.997 |
| 159 | Schott | N-SK2HT | 1.6265 | 1.6136 | 3.55 | 0.997 |
| 160 | Schott | N-SK2HT | 1.6265 | 1.6136 | 3.55 | 0.997 |
| 161 | Schott | N-SK2HT | 1.6265 | 1.6136 | 3.55 | 0.997 |
| 162 | Schott | N-SK2HT | 1.6265 | 1.6136 | 3.55 | 0.997 |
| 163 | Schott | N-SK2HT | 1.6265 | 1.6136 | 3.55 | 0.997 |
| 164 | Schott | N-SK2HT | 1.6265 | 1.6136 | 3.55 | 0.997 |
| 165 | Schott | N-SK2HT | 1.6265 | 1.6136 | 3.55 | 0.997 |
| 166 | Schott | N-SK2HT | 1.6265 | 1.6136 | 3.55 | 0.997 |
| 167 | Schott | N-SK2HT | 1.6265 | 1.6136 | 3.55 | 0.997 |
| 168 | Schott | N-SK2HT | 1.6265 | 1.6136 | 3.55 | 0.997 |
| 169 | Schott | N-SK2HT | 1.6265 | 1.6136 | 3.55 | 0.997 |
| 170 | Schott | N-SK2HT | 1.6265 | 1.6136 | 3.55 | 0.997 |
| 171 | Schott | N-SK2HT | 1.6265 | 1.6136 | 3.55 | 0.997 |
| 172 | Schott | N-SK2HT | 1.6265 | 1.6136 | 3.55 | 0.997 |
| 173 | Schott | F5 | 1.6332 | 1.6126 | 3.47 | 0.996 |
| 174 | Schott | F5 | 1.6332 | 1.6126 | 3.47 | 0.996 |
| 175 | Schott | F5 | 1.6332 | 1.6126 | 3.47 | 0.996 |
| 176 | Schott | F5 | 1.6332 | 1.6126 | 3.47 | 0.996 |
| 177 | Schott | F5 | 1.6332 | 1.6126 | 3.47 | 0.996 |
| 178 | Schott | N-SK2 | 1.6265 | 1.6136 | 3.55 | 0.994 |
| 179 | Schott | N-SK2 | 1.6265 | 1.6136 | 3.55 | 0.994 |
| 180 | Schott | N-SK2 | 1.6265 | 1.6136 | 3.55 | 0.994 |
| 181 | Schott | N-SSK2 | 1.6433 | 1.6290 | 3.53 | 0.992 |
| 182 | Schott | N-SSK2 | 1.6433 | 1.6290 | 3.53 | 0.992 |
| 183 | Schott | N-SSK2 | 1.6433 | 1.6290 | 3.53 | 0.992 |
| 184 | Schott | N-KZFS4HT | 1.6384 | 1.6213 | 3.00 | 0.991 |
| 185 | Schott | N-KZFS4HT | 1.6384 | 1.6213 | 3.00 | 0.991 |
| 186 | Schott | N-F2 | 1.6524 | 1.6299 | 2.65 | 0.984 |
| 187 | Schott | N-BAF4 | 1.6314 | 1.6137 | 2.89 | 0.982 |
| 188 | Schott | N-BAF52 | 1.6327 | 1.6162 | 3.05 | 0.981 |
| 189 | Schott | N-BAF52 | 1.6327 | 1.6162 | 3.05 | 0.981 |
| 190 | Schott | N-BAF52 | 1.6327 | 1.6162 | 3.05 | 0.981 |
| 191 | Schott | N-BAF52 | 1.6327 | 1.6162 | 3.05 | 0.981 |
| 192 | Schott | N-BAF52 | 1.6327 | 1.6162 | 3.05 | 0.981 |
| 193 | Hoya | E-F1 | 1.6041 | 1.6041 | 2.70 | 0.981 |
| 194 | Hoya | E-FD5 | 1.6473 | 1.6473 | 2.90 | 0.971 |
| 195 | Hoya | E-FD5 | 1.6473 | 1.6473 | 2.90 | 0.971 |
| 196 | NHG | H-LaK4L | 1.6586 | 1.6461 | 2.98 | 0.991 |
| 197 | Hoya | E-FD5 | 1.6473 | 1.6473 | 2.90 | 0.971 |
| 198 | NHG | H-LaK4L | 1.6586 | 1.6461 | 2.98 | 0.991 |
| 199 | Hoya | E-F1 | 1.6041 | 1.6041 | 2.70 | 0.981 |
| 200 | NHG | H-LaK4L | 1.6586 | 1.6461 | 2.98 | 0.991 |
| 201 | Hoya | E-FD5 | 1.6473 | 1.6473 | 2.90 | 0.971 |
| 202 | NHG | H-LaK4L | 1.6586 | 1.6461 | 2.98 | 0.991 |
| 203 | Hoya | E-FD5 | 1.6473 | 1.6473 | 2.90 | 0.971 |
| 204 | Sumita | K-SK18RH | 1.6591 | 1.6452 | 3.35 | 0.990 |
| 205 | Hoya | MP-BACD15 | 1.6096 | 1.6096 | 3.02 | 0.993 |
| 206 | NHG | H-LaK4L | 1.6586 | 1.6461 | 2.98 | 0.991 |
| 207 | NHG | H-ZK11 | 1.6591 | 1.6452 | 3.66 | 0.990 |
| 208 | Hoya | E-BACD10 | 1.6095 | 1.6095 | 3.66 | 0.998 |
| 209 | NHG | H-LaK4L | 1.6586 | 1.6461 | 2.98 | 0.991 |
| 210 | NHG | H-LaK4L | 1.6586 | 1.6461 | 2.98 | 0.991 |
| 211 | Hoya | BACD16 | 1.6081 | 1.6081 | 3.52 | 0.995 |
| 212 | NHG | H-LaK4L | 1.6586 | 1.6461 | 2.98 | 0.991 |

TABLE 2a-continued

| | | | | | | |
|---|---|---|---|---|---|---|
| 213 | NHG | H-LaK4L | 1.6586 | 1.6461 | 2.98 | 0.991 |
| 214 | Sumita | K-SK18RH | 1.6591 | 1.6452 | 3.35 | 0.990 |
| 215 | Hoya | E-BACD10 | 1.6095 | 1.6095 | 3.66 | 0.998 |
| 216 | Hoya | E-BACD10 | 1.6095 | 1.6095 | 3.66 | 0.998 |
| 217 | Hoya | E-BACD10 | 1.6095 | 1.6095 | 3.66 | 0.998 |
| 218 | Hoya | PCD4 | 1.6065 | 1.6065 | 3.52 | 0.997 |
| 219 | NHG | H-ZK11 | 1.6591 | 1.6452 | 3.66 | 0.990 |

| | | | Glass for G position | | | |
|---|---|---|---|---|---|---|
| Ex | glass company: | glass name: | From n(500 nm) | To n(570 nm) | density [g/cm$^3$] | Ti integral (500-570 nm) |
| 138 | Schott | N-F2 | 1.6299 | 1.6216 | 2.65 | 0.996 |
| 139 | Schott | N-F2 | 1.6299 | 1.6216 | 2.65 | 0.996 |
| 140 | Schott | N-BAF4 | 1.6137 | 1.6070 | 2.89 | 0.996 |
| 141 | Schott | F2 | 1.6299 | 1.6216 | 3.60 | 0.999 |
| 142 | Schott | F2 | 1.6299 | 1.6216 | 3.60 | 0.999 |
| 143 | Schott | SF2 | 1.6588 | 1.6495 | 3.86 | 0.998 |
| 144 | Schott | N-SSK2 | 1.6290 | 1.6234 | 3.53 | 0.998 |
| 145 | Schott | N-SK2HT | 1.6136 | 1.6084 | 3.55 | 0.999 |
| 146 | Schott | SF2 | 1.6588 | 1.6495 | 3.86 | 0.998 |
| 147 | Schott | N-F2 | 1.6299 | 1.6216 | 2.65 | 0.996 |
| 148 | Schott | N-BAF4 | 1.6137 | 1.6070 | 2.89 | 0.996 |
| 149 | Schott | N-F2 | 1.6299 | 1.6216 | 2.65 | 0.996 |
| 150 | Schott | N-BAF52 | 1.6162 | 1.6099 | 3.05 | 0.994 |
| 151 | Schott | N-BAF52 | 1.6162 | 1.6099 | 3.05 | 0.994 |
| 152 | Schott | N-F2 | 1.6299 | 1.6216 | 2.65 | 0.996 |
| 153 | Schott | N-SSK8 | 1.6249 | 1.6189 | 3.27 | 0.996 |
| 154 | Schott | N-BAF4 | 1.6137 | 1.6070 | 2.89 | 0.996 |
| 155 | Schott | N-BAF4 | 1.6137 | 1.6070 | 2.89 | 0.996 |
| 156 | Schott | N-SK2HT | 1.6136 | 1.6084 | 3.55 | 0.999 |
| 157 | Schott | N-SK2HT | 1.6136 | 1.6084 | 3.55 | 0.999 |
| 158 | Schott | N-BAF4 | 1.6137 | 1.6070 | 2.89 | 0.996 |
| 159 | Schott | N-BAF4 | 1.6137 | 1.6070 | 2.89 | 0.996 |
| 160 | Schott | N-SK2HT | 1.6136 | 1.6084 | 3.55 | 0.999 |
| 161 | Schott | N-SK2HT | 1.6136 | 1.6084 | 3.55 | 0.999 |
| 162 | Schott | N-SSK2 | 1.6290 | 1.6234 | 3.53 | 0.998 |
| 163 | Schott | N-SK2HT | 1.6136 | 1.6084 | 3.55 | 0.999 |
| 164 | Schott | N-SSK2 | 1.6290 | 1.6234 | 3.53 | 0.998 |
| 165 | Schott | N-SSK2 | 1.6290 | 1.6234 | 3.53 | 0.998 |
| 166 | Schott | N-SK2HT | 1.6136 | 1.6084 | 3.55 | 0.999 |
| 167 | Schott | N-SK2HT | 1.6136 | 1.6084 | 3.55 | 0.999 |
| 168 | Schott | F2 | 1.6299 | 1.6216 | 3.60 | 0.999 |
| 169 | Schott | F2HT | 1.6299 | 1.6216 | 3.60 | 0.999 |
| 170 | Schott | N-SK2HT | 1.6136 | 1.6084 | 3.55 | 0.999 |
| 171 | Schott | N-SK2HT | 1.6136 | 1.6084 | 3.55 | 0.999 |
| 172 | Schott | F2 | 1.6299 | 1.6216 | 3.60 | 0.999 |
| 173 | Schott | N-BAF52 | 1.6162 | 1.6099 | 3.05 | 0.994 |
| 174 | Schott | N-F2 | 1.6299 | 1.6216 | 2.65 | 0.996 |
| 175 | Schott | N-BAF52 | 1.6162 | 1.6099 | 3.05 | 0.994 |
| 176 | Schott | N-BAF52 | 1.6162 | 1.6099 | 3.05 | 0.994 |
| 177 | Schott | F2 | 1.6299 | 1.6216 | 3.60 | 0.999 |
| 178 | Schott | N-BAF52 | 1.6162 | 1.6099 | 3.05 | 0.994 |
| 179 | Schott | N-SK2HT | 1.6136 | 1.6084 | 3.55 | 0.999 |
| 180 | Schott | F2HT | 1.6299 | 1.6216 | 3.60 | 0.999 |
| 181 | Schott | N-BAF4 | 1.6137 | 1.6070 | 2.89 | 0.996 |
| 182 | Schott | N-SSK2 | 1.6290 | 1.6234 | 3.53 | 0.998 |
| 183 | Schott | N-BAF4 | 1.6137 | 1.6070 | 2.89 | 0.996 |
| 184 | Schott | N-F2 | 1.6299 | 1.6216 | 2.65 | 0.996 |
| 185 | Schott | N-KZFS4 | 1.6213 | 1.6147 | 3.00 | 0.996 |
| 186 | Schott | N-F2 | 1.6299 | 1.6216 | 2.65 | 0.996 |
| 187 | Schott | N-F2 | 1.6299 | 1.6216 | 2.65 | 0.996 |
| 188 | Schott | N-F2 | 1.6299 | 1.6216 | 2.65 | 0.996 |
| 189 | Schott | N-SF2 | 1.6588 | 1.6495 | 2.72 | 0.993 |
| 190 | Schott | N-BAF52 | 1.6162 | 1.6099 | 3.05 | 0.994 |
| 191 | Schott | N-SSK2 | 1.6290 | 1.6234 | 3.53 | 0.998 |
| 192 | Schott | F2 | 1.6299 | 1.6216 | 3.60 | 0.999 |
| 193 | Hikari | J-F16 | 1.6025 | 1.5943 | 2.64 | 0.989 |
| 194 | Hikari | J-SF2 | 1.6589 | 1.6495 | 2.72 | 0.994 |
| 195 | Sumita | K-SFLD2 | 1.6588 | 1.6495 | 2.78 | 0.998 |
| 196 | Schott | N-SF2 | 1.6588 | 1.6495 | 2.72 | 0.993 |
| 197 | Schott | N-SF2 | 1.6588 | 1.6495 | 2.72 | 0.993 |
| 198 | Schott | N-SF2 | 1.6588 | 1.6495 | 2.72 | 0.993 |
| 199 | Hikari | J-F16 | 1.6025 | 1.5943 | 2.64 | 0.989 |
| 200 | NHG | H-LaK4L | 1.6461 | 1.6410 | 2.98 | 0.998 |
| 201 | NHG | H-ZF1 | 1.6588 | 1.6495 | 2.72 | 0.991 |
| 202 | NHG | H-ZF1 | 1.6588 | 1.6495 | 2.72 | 0.991 |
| 203 | NHG | H-ZF1 | 1.6588 | 1.6495 | 2.72 | 0.991 |
| 204 | Sumita | K-SFLD2 | 1.6588 | 1.6495 | 2.78 | 0.998 |

TABLE 2a-continued

|     |         |         |        |        |      |       |
|-----|---------|---------|--------|--------|------|-------|
| 205 | NHG     | D-ZK3L  | 1.5947 | 1.5900 | 2.79 | 0.998 |
| 206 | Hoya    | E-FD5   | 1.6473 | 1.6473 | 2.90 | 0.992 |
| 207 | Sumita  | K-SFLD2 | 1.6588 | 1.6495 | 2.78 | 0.998 |
| 208 | NHG     | D-ZK3L  | 1.5947 | 1.5900 | 2.79 | 0.998 |
| 209 | Hoya    | BACED5  | 1.6412 | 1.6412 | 3.64 | 0.998 |
| 210 | Hoya    | BACED5  | 1.6412 | 1.6412 | 3.64 | 0.998 |
| 211 | NHG     | D-ZK3L  | 1.5947 | 1.5900 | 2.79 | 0.998 |
| 212 | Schott  | SF2     | 1.6588 | 1.6495 | 3.86 | 0.998 |
| 213 | Schott  | SF2     | 1.6588 | 1.6495 | 3.86 | 0.998 |
| 214 | Hikari  | J-BAF12 | 1.6475 | 1.6406 | 3.23 | 0.995 |
| 215 | NHG     | D-ZK3L  | 1.5947 | 1.5900 | 2.79 | 0.998 |
| 216 | NHG     | D-ZK3L  | 1.5947 | 1.5900 | 2.79 | 0.998 |
| 217 | NHG     | H-ZK3A  | 1.5947 | 1.5900 | 3.31 | 0.998 |
| 218 | Sumita  | K-SK5   | 1.5947 | 1.5900 | 3.32 | 0.995 |
| 219 | NHG     | ZF1     | 1.6588 | 1.6495 | 3.85 | 0.998 |

TABLE 2b

| | Glass for R position | | | | | | totals | | |
|---|---|---|---|---|---|---|---|---|---|
| | | | | | | | | T = | FoM |
| Ex | glass company: | glass name: | From n(610 nm) | To n(760 nm) | density [g/cm$^3$] | Ti integral (610-760 nm) | average density | $(T_{red} \cdot T_{blue} \cdot T_{green})^{1/3}$ | $(T_{red} \cdot T_{blue} \cdot T_{green})^{1/3}$ / average density |
| 138 | Schott | N-F2     | 1.6182 | 1.6099 | 2.65 | 0.997 | 2.84 | 0.997 | 0.351 |
| 139 | Schott | N-SF2    | 1.6456 | 1.6364 | 2.72 | 0.995 | 2.86 | 0.996 | 0.348 |
| 140 | Schott | N-BAF4   | 1.6042 | 1.5973 | 2.89 | 0.997 | 3.00 | 0.997 | 0.332 |
| 141 | Schott | N-KZFS4  | 1.6119 | 1.6048 | 3.00 | 0.998 | 3.40 | 0.998 | 0.294 |
| 142 | Schott | F2       | 1.6182 | 1.6099 | 3.60 | 0.999 | 3.60 | 0.999 | 0.277 |
| 143 | Schott | SF2      | 1.6456 | 1.6364 | 3.86 | 0.998 | 3.77 | 0.998 | 0.264 |
| 144 | Schott | N-SK2HT  | 1.6062 | 1.6007 | 3.55 | 0.999 | 3.43 | 0.998 | 0.291 |
| 145 | Schott | F2       | 1.6182 | 1.6099 | 3.60 | 0.999 | 3.46 | 0.998 | 0.289 |
| 146 | Schott | SF2      | 1.6456 | 1.6364 | 3.86 | 0.998 | 3.77 | 0.998 | 0.264 |
| 147 | Schott | N-SF2    | 1.6456 | 1.6364 | 2.72 | 0.995 | 2.97 | 0.996 | 0.335 |
| 148 | Schott | N-F2     | 1.6182 | 1.6099 | 2.65 | 0.997 | 3.03 | 0.996 | 0.329 |
| 149 | Schott | N-BAF52  | 1.6072 | 1.6006 | 3.05 | 0.997 | 3.08 | 0.996 | 0.323 |
| 150 | Schott | N-F2     | 1.6182 | 1.6099 | 2.65 | 0.997 | 3.08 | 0.996 | 0.323 |
| 151 | Schott | N-SF2    | 1.6456 | 1.6364 | 2.72 | 0.995 | 3.10 | 0.995 | 0.321 |
| 152 | Schott | N-SSK8   | 1.6164 | 1.6101 | 3.27 | 0.997 | 3.16 | 0.997 | 0.316 |
| 153 | Schott | N-F2     | 1.6182 | 1.6099 | 2.65 | 0.997 | 3.16 | 0.996 | 0.316 |
| 154 | Schott | N-BAF52  | 1.6072 | 1.6006 | 3.05 | 0.997 | 3.16 | 0.996 | 0.315 |
| 155 | Schott | N-SSK8   | 1.6164 | 1.6101 | 3.27 | 0.997 | 3.24 | 0.997 | 0.308 |
| 156 | Schott | N-F2     | 1.6182 | 1.6099 | 2.65 | 0.997 | 3.25 | 0.997 | 0.307 |
| 157 | Schott | N-BAF4   | 1.6042 | 1.5973 | 2.89 | 0.997 | 3.33 | 0.998 | 0.300 |
| 158 | Schott | N-SK2    | 1.6062 | 1.6007 | 3.55 | 0.998 | 3.33 | 0.997 | 0.299 |
| 159 | Schott | F2       | 1.6182 | 1.6099 | 3.60 | 0.999 | 3.35 | 0.997 | 0.298 |
| 160 | Schott | N-BAF52  | 1.6072 | 1.6006 | 3.05 | 0.997 | 3.38 | 0.997 | 0.295 |
| 161 | Schott | N-SSK8   | 1.6164 | 1.6101 | 3.27 | 0.997 | 3.46 | 0.997 | 0.289 |
| 162 | Schott | N-SSK2   | 1.6210 | 1.6150 | 3.53 | 0.998 | 3.53 | 0.997 | 0.282 |
| 163 | Schott | N-SSK2   | 1.6210 | 1.6150 | 3.53 | 0.998 | 3.54 | 0.998 | 0.282 |
| 164 | Schott | N-SK2HT  | 1.6062 | 1.6007 | 3.55 | 0.999 | 3.54 | 0.998 | 0.282 |
| 165 | Schott | N-SK2    | 1.6062 | 1.6007 | 3.55 | 0.998 | 3.54 | 0.997 | 0.282 |
| 166 | Schott | N-SK2HT  | 1.6062 | 1.6007 | 3.55 | 0.999 | 3.55 | 0.998 | 0.281 |
| 167 | Schott | N-SK2    | 1.6062 | 1.6007 | 3.55 | 0.998 | 3.55 | 0.998 | 0.281 |
| 168 | Schott | F2       | 1.6182 | 1.6099 | 3.60 | 0.999 | 3.58 | 0.998 | 0.279 |
| 169 | Schott | F2       | 1.6182 | 1.6099 | 3.60 | 0.999 | 3.58 | 0.998 | 0.279 |
| 170 | Schott | SF2      | 1.6456 | 1.6364 | 3.86 | 0.998 | 3.65 | 0.998 | 0.273 |
| 171 | Schott | SF2      | 1.6456 | 1.6364 | 3.86 | 0.998 | 3.65 | 0.998 | 0.273 |
| 172 | Schott | SF2      | 1.6456 | 1.6364 | 3.86 | 0.998 | 3.67 | 0.998 | 0.272 |
| 173 | Schott | N-F2     | 1.6182 | 1.6099 | 2.65 | 0.997 | 3.06 | 0.996 | 0.326 |
| 174 | Schott | N-SSK8   | 1.6164 | 1.6101 | 3.27 | 0.997 | 3.13 | 0.996 | 0.318 |
| 175 | Schott | N-SSK2   | 1.6210 | 1.6150 | 3.53 | 0.998 | 3.35 | 0.996 | 0.298 |
| 176 | Schott | N-SK2    | 1.6062 | 1.6007 | 3.55 | 0.998 | 3.36 | 0.996 | 0.297 |
| 177 | Schott | N-BAF52  | 1.6072 | 1.6006 | 3.05 | 0.997 | 3.37 | 0.997 | 0.296 |
| 178 | Schott | N-SF2    | 1.6456 | 1.6364 | 2.72 | 0.995 | 3.10 | 0.994 | 0.320 |
| 179 | Schott | N-BAF4   | 1.6042 | 1.5973 | 2.89 | 0.997 | 3.33 | 0.997 | 0.299 |
| 180 | Schott | SF2      | 1.6456 | 1.6364 | 3.86 | 0.998 | 3.67 | 0.997 | 0.272 |
| 181 | Schott | N-BAF52  | 1.6072 | 1.6006 | 3.05 | 0.997 | 3.15 | 0.995 | 0.316 |
| 182 | Schott | N-BAF4   | 1.6042 | 1.5973 | 2.89 | 0.997 | 3.31 | 0.996 | 0.301 |
| 183 | Schott | N-SK2HT  | 1.6062 | 1.6007 | 3.55 | 0.999 | 3.32 | 0.996 | 0.300 |
| 184 | Schott | N-SF2    | 1.6456 | 1.6364 | 2.72 | 0.995 | 2.79 | 0.994 | 0.356 |
| 185 | Schott | N-F2     | 1.6182 | 1.6099 | 2.65 | 0.997 | 2.89 | 0.995 | 0.345 |
| 186 | Schott | N-F2     | 1.6182 | 1.6099 | 2.65 | 0.997 | 2.65 | 0.992 | 0.374 |
| 187 | Schott | N-F2     | 1.6182 | 1.6099 | 2.65 | 0.997 | 2.73 | 0.992 | 0.363 |
| 188 | Schott | N-SF2    | 1.6456 | 1.6364 | 2.72 | 0.995 | 2.80 | 0.990 | 0.353 |
| 189 | Schott | N-SF2    | 1.6456 | 1.6364 | 2.72 | 0.995 | 2.83 | 0.990 | 0.350 |

TABLE 2b-continued

| | | Glass for R position | | | | | totals | | |
|---|---|---|---|---|---|---|---|---|---|
| | | | | | | | | T = | FoM |
| Ex | glass company: | glass name: | From n(610 nm) | To n(760 nm) | density [g/cm$^3$] | Ti integral (610-760 nm) | average density | $(T_{red} \cdot T_{blue} \cdot T_{green})^{1/3}$ | $(T_{red} \cdot T_{blue} \cdot T_{green})^{1/3}$/ average density |
| 190 | Schott | N-SF2 | 1.6456 | 1.6364 | 2.72 | 0.995 | 2.94 | 0.990 | 0.337 |
| 191 | Schott | N-SF2 | 1.6456 | 1.6364 | 2.72 | 0.995 | 3.10 | 0.991 | 0.320 |
| 192 | Schott | N-SF2 | 1.6456 | 1.6364 | 2.72 | 0.995 | 3.12 | 0.992 | 0.318 |
| 193 | Hoya | E-F1 | 1.6041 | 1.6041 | 2.70 | 0.997 | 2.68 | 0.989 | 0.369 |
| 194 | Hoya | E-FD5 | 1.6473 | 1.6473 | 2.90 | 0.995 | 2.84 | 0.987 | 0.347 |
| 195 | Hoya | E-FD5 | 1.6473 | 1.6473 | 2.90 | 0.995 | 2.86 | 0.988 | 0.345 |
| 196 | Sumita | K-BaSF4 | 1.6495 | 1.6411 | 2.96 | 0.998 | 2.89 | 0.994 | 0.344 |
| 197 | Schott | N-KZFS5 | 1.6523 | 1.6441 | 3.04 | 0.998 | 2.89 | 0.987 | 0.342 |
| 198 | Schott | N-KZFS5 | 1.6523 | 1.6441 | 3.04 | 0.998 | 2.91 | 0.994 | 0.341 |
| 199 | Hikari | J-SK2 | 1.6062 | 1.6007 | 3.53 | 0.994 | 2.96 | 0.988 | 0.334 |
| 200 | NHG | H-ZBaF65 | 1.6523 | 1.6441 | 3.01 | 0.998 | 2.99 | 0.996 | 0.333 |
| 201 | Hikari | J-LAK7 | 1.6504 | 1.6445 | 3.30 | 0.993 | 2.97 | 0.985 | 0.331 |
| 202 | Hikari | J-LAK7 | 1.6504 | 1.6445 | 3.30 | 0.993 | 3.00 | 0.992 | 0.331 |
| 203 | Hikari | J-LAK7R | 1.6504 | 1.6445 | 3.34 | 0.992 | 2.99 | 0.985 | 0.330 |
| 204 | Ohara | S-NBH 5 | 1.6523 | 1.6441 | 3.02 | 0.998 | 3.05 | 0.995 | 0.326 |
| 205 | Hoya | BACD15 | 1.6083 | 1.6083 | 3.55 | 0.997 | 3.12 | 0.996 | 0.319 |
| 206 | NHG | H-LaK50 | 1.6504 | 1.6446 | 3.54 | 0.998 | 3.14 | 0.994 | 0.316 |
| 207 | NHG | H-ZBaF65 | 1.6523 | 1.6441 | 3.01 | 0.998 | 3.15 | 0.995 | 0.316 |
| 208 | Schott | N-BAF52 | 1.6072 | 1.6006 | 3.05 | 0.997 | 3.17 | 0.998 | 0.315 |
| 209 | Sumita | K-BaSF4 | 1.6495 | 1.6411 | 2.96 | 0.998 | 3.19 | 0.996 | 0.312 |
| 210 | Schott | N-KZFS5 | 1.6523 | 1.6441 | 3.04 | 0.998 | 3.22 | 0.996 | 0.309 |
| 211 | NHG | H-ZK50 | 1.6062 | 1.6007 | 3.47 | 0.998 | 3.26 | 0.997 | 0.306 |
| 212 | Sumita | K-BaSF4 | 1.6495 | 1.6411 | 2.96 | 0.998 | 3.27 | 0.996 | 0.305 |
| 213 | Schott | N-KZFS5 | 1.6523 | 1.6441 | 3.04 | 0.998 | 3.29 | 0.996 | 0.302 |
| 214 | Hikari | J-LAK7R | 1.6504 | 1.6445 | 3.34 | 0.992 | 3.31 | 0.992 | 0.300 |
| 215 | Hoya | BACD16 | 1.6081 | 1.6081 | 3.52 | 0.999 | 3.32 | 0.998 | 0.300 |
| 216 | Schott | N-SK2HT | 1.6062 | 1.6007 | 3.55 | 0.999 | 3.33 | 0.998 | 0.299 |
| 217 | Hoya | E-BAF8 | 1.6063 | 1.6063 | 3.32 | 0.998 | 3.43 | 0.998 | 0.291 |
| 218 | Hoya | M-PCD4 | 1.6070 | 1.6070 | 3.57 | 0.997 | 3.47 | 0.996 | 0.287 |
| 219 | Sumita | K-PG395 | 1.6561 | 1.6474 | 3.50 | 0.998 | 3.67 | 0.995 | 0.271 |

TABLE 3a

| | | Glass for B position | | | | |
|---|---|---|---|---|---|---|
| Ex | glass company: | glass name: | From n(400 nm) | To n(500 nm) | density [g/cm$^3$] | Ti integral (400-500 nm) |
| 220 | Schott | N-F2 | 1.6524 | 1.6299 | 2.65 | 0.984 |
| 221 | Schott | N-F2 | 1.6524 | 1.6299 | 2.65 | 0.984 |
| 222 | Schott | N-SF2 | 1.6845 | 1.6588 | 2.72 | 0.977 |
| 223 | Schott | N-F2 | 1.6524 | 1.6299 | 2.65 | 0.984 |
| 224 | Schott | N-F2 | 1.6524 | 1.6299 | 2.65 | 0.984 |
| 225 | Schott | N-SF2 | 1.6845 | 1.6588 | 2.72 | 0.977 |
| 226 | Schott | N-SF2 | 1.6845 | 1.6588 | 2.72 | 0.977 |
| 227 | Schott | N-SF2 | 1.6845 | 1.6588 | 2.72 | 0.977 |
| 228 | Schott | N-F2 | 1.6524 | 1.6299 | 2.65 | 0.984 |
| 229 | Schott | N-SF2 | 1.6845 | 1.6588 | 2.72 | 0.977 |
| 230 | Schott | N-SF2 | 1.6845 | 1.6588 | 2.72 | 0.977 |
| 231 | Schott | N-KZFS5 | 1.6846 | 1.6637 | 3.04 | 0.987 |
| 232 | Schott | N-F2 | 1.6524 | 1.6299 | 2.65 | 0.984 |
| 233 | Schott | N-KZFS5 | 1.6846 | 1.6637 | 3.04 | 0.987 |
| 234 | Schott | N-SF5 | 1.7130 | 1.6848 | 2.86 | 0.972 |
| 235 | Schott | N-KZFS5 | 1.6846 | 1.6637 | 3.04 | 0.987 |
| 236 | Schott | F2HT | 1.6522 | 1.6299 | 3.60 | 0.998 |
| 237 | Schott | F2 | 1.6522 | 1.6299 | 3.60 | 0.997 |
| 238 | Schott | N-BASF2 | 1.6996 | 1.6752 | 3.15 | 0.967 |
| 239 | Schott | F2HT | 1.6522 | 1.6299 | 3.60 | 0.998 |
| 240 | Schott | N-BASF2 | 1.6996 | 1.6752 | 3.15 | 0.967 |
| 241 | Schott | F2HT | 1.6522 | 1.6299 | 3.60 | 0.998 |
| 242 | Schott | F2 | 1.6522 | 1.6299 | 3.60 | 0.997 |
| 243 | Schott | N-BASF2 | 1.6996 | 1.6752 | 3.15 | 0.967 |
| 244 | Schott | F2 | 1.6522 | 1.6299 | 3.60 | 0.997 |
| 245 | Schott | N-SF2 | 1.6845 | 1.6588 | 2.72 | 0.977 |
| 246 | Schott | SF2 | 1.6841 | 1.6588 | 3.86 | 0.993 |
| 247 | Schott | N-KZFS11 | 1.6651 | 1.6464 | 3.20 | 0.992 |
| 248 | Schott | SF2 | 1.6841 | 1.6588 | 3.86 | 0.993 |
| 249 | Schott | N-BASF2 | 1.6996 | 1.6752 | 3.15 | 0.967 |
| 250 | Schott | F2 | 1.6522 | 1.6299 | 3.60 | 0.997 |
| 251 | Schott | SF2 | 1.6841 | 1.6588 | 3.86 | 0.993 |

TABLE 3a-continued

| | | | | | | |
|---|---|---|---|---|---|---|
| 252 | Schott | SF2 | 1.6841 | 1.6588 | 3.86 | 0.993 |
| 253 | Schott | SF5 | 1.7126 | 1.6848 | 4.07 | 0.993 |
| 254 | Hoya | E-FD10 | 1.6975 | 1.6975 | 3.07 | 0.955 |
| 255 | Hoya | E-FD10 | 1.6975 | 1.6975 | 3.07 | 0.955 |
| 256 | Hoya | E-FD10 | 1.6975 | 1.6975 | 3.07 | 0.955 |
| 257 | Hoya | BAFD8 | 1.6989 | 1.6989 | 3.62 | 0.963 |
| 258 | Hoya | BAF11 | 1.6515 | 1.6515 | 3.63 | 0.983 |
| 259 | Hoya | BAF10 | 1.6530 | 1.6530 | 3.61 | 0.976 |
| 260 | Hoya | BAF11 | 1.6515 | 1.6515 | 3.63 | 0.983 |
| 261 | Hoya | LAC8 | 1.6964 | 1.6964 | 3.81 | 0.993 |
| 262 | Hoya | LAC8 | 1.6964 | 1.6964 | 3.81 | 0.993 |
| 263 | Hoya | BAF10 | 1.6530 | 1.6530 | 3.61 | 0.976 |
| 264 | Hoya | BAF11 | 1.6515 | 1.6515 | 3.63 | 0.983 |
| 265 | Hoya | LAF3 | 1.6968 | 1.6968 | 4.20 | 0.989 |
| 266 | Hoya | BAF11 | 1.6515 | 1.6515 | 3.63 | 0.983 |
| 267 | Hoya | BAF11 | 1.6515 | 1.6515 | 3.63 | 0.983 |
| 268 | Hoya | LAC8 | 1.6964 | 1.6964 | 3.81 | 0.993 |
| 269 | Hoya | LAC8 | 1.6964 | 1.6964 | 3.81 | 0.993 |
| 270 | Hoya | LAC8 | 1.6964 | 1.6964 | 3.81 | 0.993 |
| 271 | Hoya | LAC8 | 1.6964 | 1.6964 | 3.81 | 0.993 |
| 272 | Hoya | BAFD8 | 1.6989 | 1.6989 | 3.62 | 0.963 |
| 273 | Hoya | LAF3 | 1.6968 | 1.6968 | 4.20 | 0.989 |

| | | Glass for G position | | | | |
|---|---|---|---|---|---|---|
| Ex | glass company: | glass name: | From n(500 nm) | To n(570 nm) | density [g/cm$^3$] | Ti integral (500-570 nm) |
| 220 | Schott | N-SF2 | 1.6588 | 1.6495 | 2.72 | 0.993 |
| 221 | Schott | N-SF2 | 1.6588 | 1.6495 | 2.72 | 0.993 |
| 222 | Schott | N-SF2 | 1.6588 | 1.6495 | 2.72 | 0.993 |
| 223 | Schott | N-SF5 | 1.6848 | 1.6746 | 2.86 | 0.993 |
| 224 | Schott | N-SF5 | 1.6848 | 1.6746 | 2.86 | 0.993 |
| 225 | Schott | N-SF5 | 1.6848 | 1.6746 | 2.86 | 0.993 |
| 226 | Schott | N-SF5 | 1.6848 | 1.6746 | 2.86 | 0.993 |
| 227 | Schott | N-KZFS5 | 1.6637 | 1.6557 | 3.04 | 0.996 |
| 228 | Schott | N-KZFS5 | 1.6637 | 1.6557 | 3.04 | 0.996 |
| 229 | Schott | N-BASF2 | 1.6752 | 1.6662 | 3.15 | 0.992 |
| 230 | Schott | N-BASF2 | 1.6752 | 1.6662 | 3.15 | 0.992 |
| 231 | Schott | N-KZFS5 | 1.6637 | 1.6557 | 3.04 | 0.996 |
| 232 | Schott | N-BASF2 | 1.6752 | 1.6662 | 3.15 | 0.992 |
| 233 | Schott | N-KZFS5 | 1.6637 | 1.6557 | 3.04 | 0.996 |
| 234 | Schott | P-SF8 | 1.7018 | 1.6910 | 2.90 | 0.992 |
| 235 | Schott | N-KZFS5 | 1.6637 | 1.6557 | 3.04 | 0.996 |
| 236 | Schott | N-SF2 | 1.6588 | 1.6495 | 2.72 | 0.993 |
| 237 | Schott | N-SF2 | 1.6588 | 1.6495 | 2.72 | 0.993 |
| 238 | Schott | N-KZFS5 | 1.6637 | 1.6557 | 3.04 | 0.996 |
| 239 | Schott | N-SF5 | 1.6848 | 1.6746 | 2.86 | 0.993 |
| 240 | Schott | N-SF8 | 1.7017 | 1.6910 | 2.90 | 0.990 |
| 241 | Schott | N-KZFS5 | 1.6637 | 1.6557 | 3.04 | 0.996 |
| 242 | Schott | N-SF5 | 1.6848 | 1.6746 | 2.86 | 0.993 |
| 243 | Schott | N-BASF2 | 1.6752 | 1.6662 | 3.15 | 0.992 |
| 244 | Schott | N-KZFS5 | 1.6637 | 1.6557 | 3.04 | 0.996 |
| 245 | Schott | SF5 | 1.6848 | 1.6746 | 4.07 | 0.998 |
| 246 | Schott | N-SF5 | 1.6848 | 1.6746 | 2.86 | 0.993 |
| 247 | Schott | SF2 | 1.6588 | 1.6495 | 3.86 | 0.998 |
| 248 | Schott | N-BASF2 | 1.6752 | 1.6662 | 3.15 | 0.992 |
| 249 | Schott | SF5 | 1.6848 | 1.6746 | 4.07 | 0.998 |
| 250 | Schott | SF2 | 1.6588 | 1.6495 | 3.86 | 0.998 |
| 251 | Schott | SF5 | 1.6848 | 1.6746 | 4.07 | 0.998 |
| 252 | Schott | SF5 | 1.6848 | 1.6746 | 4.07 | 0.998 |
| 253 | Schott | SF5 | 1.6848 | 1.6746 | 4.07 | 0.998 |
| 254 | NHG | D-ZF10 | 1.7018 | 1.6910 | 2.86 | 0.997 |
| 255 | Schott | N-SF8 | 1.7017 | 1.6910 | 2.90 | 0.990 |
| 256 | Sumita | K-SFLD8 | 1.7018 | 1.6910 | 2.94 | 0.980 |
| 257 | NHG | D-ZF10 | 1.7018 | 1.6910 | 2.86 | 0.997 |
| 258 | Hikari | J-LAK04 | 1.6577 | 1.6521 | 3.27 | 0.999 |
| 259 | Hikari | J-LAK7 | 1.6580 | 1.6527 | 3.30 | 0.996 |
| 260 | Ohara | S-LAL54Q | 1.6577 | 1.6521 | 3.36 | 0.998 |
| 261 | NHG | D-ZF10 | 1.7018 | 1.6910 | 2.86 | 0.997 |
| 262 | Sumita | K-VC80 | 1.7014 | 1.6951 | 3.81 | 0.998 |
| 263 | Hikari | J-LAK7 | 1.6580 | 1.6527 | 3.30 | 0.996 |
| 264 | NHG | H-LaK10 | 1.6578 | 1.6522 | 3.72 | 0.998 |
| 265 | Schott | N-SF8 | 1.7017 | 1.6910 | 2.90 | 0.990 |
| 266 | Sumita | K-LaK7 | 1.6580 | 1.6527 | 3.76 | 0.994 |
| 267 | Hoya | BAF11 | 1.6515 | 1.6515 | 3.63 | 0.998 |
| 268 | NHG | H-LaK2H | 1.6994 | 1.6933 | 3.53 | 0.998 |
| 269 | Hoya | LAC8 | 1.6964 | 1.6964 | 3.81 | 0.998 |
| 270 | Sumita | K-VC80 | 1.7014 | 1.6951 | 3.81 | 0.998 |
| 271 | NHG | H-LaK2 | 1.6983 | 1.6922 | 3.63 | 0.998 |

TABLE 3a-continued

| | | | | | | |
|---|---|---|---|---|---|---|
| 272 | Sumita | K-LaK13 | 1.7010 | 1.6947 | 4.11 | 0.991 |
| 273 | Sumita | K-LaFK58 | 1.7024 | 1.6967 | 4.56 | 0.998 |

TABLE 3b

| | Glass for R position | | | | | totals | | |
|---|---|---|---|---|---|---|---|---|
| EX | glass company: | glass name: | From n(610 nm) | To n(760 nm) | density [g/cm³] | Ti integral (610-760 nm) | average density | $T = (T_{red} \cdot T_{blue} \cdot T_{green})^{1/3}$ | FoM $(T_{red} \cdot T_{blue} \cdot T_{green})^{1/3}$ / average density |
| 220 | Schott | N-SF5 | 1.6705 | 1.6604 | 2.86 | 0.996 | 2.74 | 0.991 | 0.361 |
| 221 | Schott | P-SF8 | 1.6866 | 1.6760 | 2.90 | 0.995 | 2.76 | 0.990 | 0.359 |
| 222 | Schott | N-SF5 | 1.6705 | 1.6604 | 2.86 | 0.996 | 2.76 | 0.988 | 0.357 |
| 223 | Schott | N-SF5 | 1.6705 | 1.6604 | 2.86 | 0.996 | 2.79 | 0.991 | 0.355 |
| 224 | Schott | P-SF8 | 1.6866 | 1.6760 | 2.90 | 0.995 | 2.80 | 0.991 | 0.353 |
| 225 | Schott | N-SF5 | 1.6705 | 1.6604 | 2.86 | 0.996 | 2.81 | 0.989 | 0.352 |
| 226 | Schott | N-SF8 | 1.6866 | 1.6760 | 2.90 | 0.994 | 2.83 | 0.988 | 0.350 |
| 227 | Schott | N-SF5 | 1.6705 | 1.6604 | 2.86 | 0.996 | 2.87 | 0.989 | 0.344 |
| 228 | Schott | N-KZFS5 | 1.6523 | 1.6441 | 3.04 | 0.998 | 2.91 | 0.992 | 0.341 |
| 229 | Schott | N-SF8 | 1.6866 | 1.6760 | 2.90 | 0.994 | 2.92 | 0.988 | 0.338 |
| 230 | Schott | N-SF15 | 1.6965 | 1.6854 | 2.92 | 0.994 | 2.93 | 0.988 | 0.337 |
| 231 | Schott | N-SF5 | 1.6705 | 1.6604 | 2.86 | 0.996 | 2.98 | 0.993 | 0.333 |
| 232 | Schott | N-BASF2 | 1.6625 | 1.6535 | 3.15 | 0.995 | 2.98 | 0.990 | 0.332 |
| 233 | Schott | N-SF8 | 1.6866 | 1.6760 | 2.90 | 0.994 | 3.00 | 0.993 | 0.331 |
| 234 | Schott | N-BASF64 | 1.7021 | 1.6932 | 3.20 | 0.985 | 2.99 | 0.983 | 0.329 |
| 235 | Schott | N-KZFS5 | 1.6523 | 1.6441 | 3.04 | 0.998 | 3.04 | 0.994 | 0.327 |
| 236 | Schott | N-SF5 | 1.6705 | 1.6604 | 2.86 | 0.996 | 3.06 | 0.995 | 0.325 |
| 237 | Schott | N-SF5 | 1.6705 | 1.6604 | 2.86 | 0.996 | 3.06 | 0.995 | 0.325 |
| 238 | Schott | P-SF8 | 1.6866 | 1.6760 | 2.90 | 0.995 | 3.03 | 0.986 | 0.325 |
| 239 | Schott | N-SF5 | 1.6705 | 1.6604 | 2.86 | 0.996 | 3.11 | 0.996 | 0.321 |
| 240 | Schott | N-BASF64 | 1.7021 | 1.6932 | 3.20 | 0.985 | 3.09 | 0.981 | 0.318 |
| 241 | Schott | N-SF5 | 1.6705 | 1.6604 | 2.86 | 0.996 | 3.17 | 0.997 | 0.315 |
| 242 | Schott | N-KZFS5 | 1.6523 | 1.6441 | 3.04 | 0.998 | 3.17 | 0.996 | 0.315 |
| 243 | Schott | N-BASF2 | 1.6625 | 1.6535 | 3.15 | 0.995 | 3.15 | 0.985 | 0.313 |
| 244 | Schott | N-KZFS5 | 1.6523 | 1.6441 | 3.04 | 0.998 | 3.23 | 0.997 | 0.309 |
| 245 | Schott | N-SF15 | 1.6965 | 1.6854 | 2.92 | 0.994 | 3.24 | 0.990 | 0.306 |
| 246 | Schott | N-BASF2 | 1.6625 | 1.6535 | 3.15 | 0.995 | 3.29 | 0.994 | 0.302 |
| 247 | Schott | N-SF5 | 1.6705 | 1.6604 | 2.86 | 0.996 | 3.30 | 0.995 | 0.301 |
| 248 | Schott | N-SF8 | 1.6866 | 1.6760 | 2.90 | 0.994 | 3.31 | 0.993 | 0.300 |
| 249 | Schott | N-SF5 | 1.6705 | 1.6604 | 2.86 | 0.996 | 3.36 | 0.987 | 0.294 |
| 250 | Schott | N-SF8 | 1.6866 | 1.6760 | 2.90 | 0.994 | 3.45 | 0.996 | 0.288 |
| 251 | Schott | N-BASF2 | 1.6625 | 1.6535 | 3.15 | 0.995 | 3.69 | 0.995 | 0.269 |
| 252 | Schott | SF5 | 1.6705 | 1.6604 | 4.07 | 0.998 | 4.00 | 0.996 | 0.249 |
| 253 | Schott | SF5 | 1.6705 | 1.6604 | 4.07 | 0.998 | 4.07 | 0.996 | 0.245 |
| 254 | Hoya | E-FD10 | 1.6975 | 1.6975 | 3.07 | 0.995 | 3.00 | 0.982 | 0.327 |
| 255 | Hoya | E-FD10 | 1.6975 | 1.6975 | 3.07 | 0.995 | 3.01 | 0.980 | 0.325 |
| 256 | Schott | N-BASF64 | 1.7021 | 1.6932 | 3.20 | 0.985 | 3.07 | 0.973 | 0.317 |
| 257 | NHG | H-ZBaF20 | 1.6997 | 1.6913 | 3.64 | 0.998 | 3.37 | 0.986 | 0.292 |
| 258 | NHG | H-LaK1 | 1.6582 | 1.6523 | 3.64 | 0.998 | 3.51 | 0.993 | 0.283 |
| 259 | Hoya | BAF11 | 1.6515 | 1.6515 | 3.63 | 0.999 | 3.51 | 0.990 | 0.282 |
| 260 | Hoya | BAF11 | 1.6515 | 1.6515 | 3.63 | 0.999 | 3.54 | 0.993 | 0.281 |
| 261 | NHG | H-LaF51 | 1.6984 | 1.6911 | 4.01 | 0.998 | 3.56 | 0.996 | 0.280 |
| 262 | Hoya | E-FD10 | 1.6975 | 1.6975 | 3.07 | 0.995 | 3.56 | 0.996 | 0.279 |
| 263 | Hikari | J-SSK5 | 1.6570 | 1.6505 | 3.75 | 0.995 | 3.55 | 0.989 | 0.278 |
| 264 | NHG | H-LaK1 | 1.6582 | 1.6523 | 3.64 | 0.998 | 3.66 | 0.993 | 0.271 |
| 265 | Hoya | MP-LAC8-30 | 1.6979 | 1.6979 | 3.90 | 0.998 | 3.67 | 0.992 | 0.271 |
| 266 | Hoya | BAF11 | 1.6515 | 1.6515 | 3.63 | 0.999 | 3.67 | 0.992 | 0.270 |
| 267 | Sumita | K-LaK11 | 1.6570 | 1.6511 | 3.85 | 0.996 | 3.70 | 0.992 | 0.268 |
| 268 | Ohara | S-LAL21 | 1.7015 | 1.6947 | 3.85 | 0.996 | 3.73 | 0.996 | 0.267 |
| 269 | Hoya | BAFD8 | 1.6989 | 1.6989 | 3.62 | 0.999 | 3.75 | 0.997 | 0.266 |
| 270 | Hoya | BAFD8 | 1.6989 | 1.6989 | 3.62 | 0.999 | 3.75 | 0.997 | 0.266 |
| 271 | Hoya | LAC8 | 1.6964 | 1.6964 | 3.81 | 0.998 | 3.75 | 0.996 | 0.266 |
| 272 | Hoya | LAF3 | 1.6968 | 1.6968 | 4.20 | 0.998 | 3.98 | 0.984 | 0.247 |
| 273 | Hoya | LAF3 | 1.6968 | 1.6968 | 4.20 | 0.998 | 4.32 | 0.995 | 0.230 |

TABLE 4a

| | Glass for B position | | | | | |
|---|---|---|---|---|---|---|
| Ex | glass company: | glass name: | From n(400 nm) | To n(500 nm) | density [g/cm³] | Ti integral (400-500 nm) |
| 274 | Schott | N-SF5 | 1.7130 | 1.6848 | 2.86 | 0.972 |
| 275 | Schott | P-SF8 | 1.7316 | 1.7018 | 2.90 | 0.971 |

TABLE 4a-continued

| | | | | | |
|---|---|---|---|---|---|
| 276 | Schott | P-SF8 | 1.7316 | 1.7018 | 2.90 | 0.971 |
| 277 | Schott | P-SF8 | 1.7316 | 1.7018 | 2.90 | 0.971 |
| 278 | Schott | P-SF8 | 1.7316 | 1.7018 | 2.90 | 0.971 |
| 279 | Schott | N-SF8 | 1.7316 | 1.7017 | 2.90 | 0.964 |
| 280 | Schott | P-SF8 | 1.7316 | 1.7018 | 2.90 | 0.971 |
| 281 | Schott | N-SF8 | 1.7316 | 1.7017 | 2.90 | 0.964 |
| 282 | Schott | N-SF15 | 1.7440 | 1.7124 | 2.92 | 0.959 |
| 283 | Schott | N-SF15 | 1.7440 | 1.7124 | 2.92 | 0.959 |
| 284 | Schott | P-SF8 | 1.7316 | 1.7018 | 2.90 | 0.971 |
| 285 | Schott | N-BASF64 | 1.7374 | 1.7144 | 3.20 | 0.960 |
| 286 | Schott | N-SF15 | 1.7440 | 1.7124 | 2.92 | 0.959 |
| 287 | Schott | N-SF15 | 1.7440 | 1.7124 | 2.92 | 0.959 |
| 288 | Schott | N-BASF64 | 1.7374 | 1.7144 | 3.20 | 0.960 |
| 289 | Schott | N-BASF64 | 1.7374 | 1.7144 | 3.20 | 0.960 |
| 290 | Schott | N-SF8 | 1.7316 | 1.7017 | 2.90 | 0.964 |
| 291 | Schott | N-BASF64 | 1.7374 | 1.7144 | 3.20 | 0.960 |
| 292 | Schott | N-SF15 | 1.7440 | 1.7124 | 2.92 | 0.959 |
| 293 | Schott | N-SF10 | 1.7783 | 1.7432 | 3.05 | 0.944 |
| 294 | Schott | N-BASF64 | 1.7374 | 1.7144 | 3.20 | 0.960 |
| 295 | Schott | N-BASF64 | 1.7374 | 1.7144 | 3.20 | 0.960 |
| 296 | Schott | SF5 | 1.7126 | 1.6848 | 4.07 | 0.993 |
| 297 | Schott | SF5 | 1.7126 | 1.6848 | 4.07 | 0.993 |
| 298 | Schott | P-SF8 | 1.7316 | 1.7018 | 2.90 | 0.971 |
| 299 | Schott | P-SF8 | 1.7316 | 1.7018 | 2.90 | 0.971 |
| 300 | Schott | N-BASF64 | 1.7374 | 1.7144 | 3.20 | 0.960 |
| 301 | Schott | N-SF8 | 1.7316 | 1.7017 | 2.90 | 0.964 |
| 302 | Schott | P-SF8 | 1.7316 | 1.7018 | 2.90 | 0.971 |
| 303 | Schott | P-SF8 | 1.7316 | 1.7018 | 2.90 | 0.971 |
| 304 | Schott | N-BASF64 | 1.7374 | 1.7144 | 3.20 | 0.960 |
| 305 | Schott | SF1 | 1.7643 | 1.7315 | 4.46 | 0.989 |
| 306 | Hoya | FD110 | 1.7474 | 1.7474 | 3.22 | 0.939 |
| 307 | Hoya | FD110 | 1.7474 | 1.7474 | 3.22 | 0.939 |
| 308 | Hoya | FD110 | 1.7474 | 1.7474 | 3.22 | 0.939 |
| 309 | Hoya | E-FD13 | 1.7090 | 1.7090 | 3.11 | 0.953 |
| 310 | Sumita | K-LaKn12 | 1.7591 | 1.7418 | 3.92 | 0.988 |
| 311 | Hikari | J-LAK09 | 1.7594 | 1.7422 | 4.00 | 0.992 |
| 312 | Hoya | M-LAF81 | 1.7079 | 1.7079 | 3.22 | 0.968 |
| 313 | Sumita | K-LaKn12 | 1.7591 | 1.7418 | 3.92 | 0.988 |
| 314 | NHG | H-LaK54 | 1.7595 | 1.7423 | 4.07 | 0.994 |
| 315 | Hikari | J-LAK09 | 1.7594 | 1.7422 | 4.00 | 0.992 |
| 316 | Hikari | J-LAK09 | 1.7594 | 1.7422 | 4.00 | 0.992 |
| 317 | Hoya | E-FD13 | 1.7090 | 1.7090 | 3.11 | 0.953 |
| 318 | NHG | H-LaK54 | 1.7595 | 1.7423 | 4.07 | 0.994 |
| 319 | Hoya | M-LAF81 | 1.7079 | 1.7079 | 3.22 | 0.968 |
| 320 | Hoya | M-TAF101 | 1.7482 | 1.7482 | 4.56 | 0.991 |
| 321 | Hoya | M-TAF101 | 1.7482 | 1.7482 | 4.56 | 0.991 |
| 322 | Hoya | LAC10 | 1.7015 | 1.7015 | 3.87 | 0.993 |
| 323 | Hoya | LAC10 | 1.7015 | 1.7015 | 3.87 | 0.993 |
| 324 | Hoya | MP-LAF81 | 1.7079 | 1.7079 | 3.22 | 0.968 |
| 325 | Hikari | J-LAK09 | 1.7594 | 1.7422 | 4.00 | 0.992 |
| 326 | Hikari | J-LAK09 | 1.7594 | 1.7422 | 4.00 | 0.992 |
| 327 | NHG | H-LaK54 | 1.7595 | 1.7423 | 4.07 | 0.994 |
| 328 | NHG | H-LaK54 | 1.7595 | 1.7423 | 4.07 | 0.994 |
| 329 | Hoya | LAC10 | 1.7015 | 1.7015 | 3.87 | 0.993 |
| 330 | Hoya | MP-TAF101-100 | 1.7490 | 1.7490 | 4.56 | 0.991 |
| 331 | Hoya | MC-TAF101-100 | 1.7490 | 1.7490 | 4.56 | 0.992 |
| 332 | Hoya | MC-TAF101-100 | 1.7490 | 1.7490 | 4.56 | 0.992 |
| 333 | NHG | H-LaK54 | 1.7595 | 1.7423 | 4.07 | 0.994 |
| 334 | NHG | H-LaK54 | 1.7595 | 1.7423 | 4.07 | 0.994 |
| 335 | NHG | H-LaK54 | 1.7595 | 1.7423 | 4.07 | 0.994 |
| 336 | NHG | H-LaK54 | 1.7595 | 1.7423 | 4.07 | 0.994 |
| 337 | NHG | H-LaK54 | 1.7595 | 1.7423 | 4.07 | 0.994 |
| 338 | Hikari | J-LAK09 | 1.7594 | 1.7422 | 4.00 | 0.992 |
| 339 | Hoya | MC-TAF101-100 | 1.7490 | 1.7490 | 4.56 | 0.992 |
| 340 | NHG | H-LaK54 | 1.7595 | 1.7423 | 4.07 | 0.994 |

Glass for G position

| Ex | glass company: | glass name: | From n(500 nm) | To n(570 nm) | density [g/cm$^3$] | Ti integral (500-570 nm) |
|---|---|---|---|---|---|---|
| 274 | Schott | P-SF8 | 1.7018 | 1.6910 | 2.90 | 0.992 |
| 275 | Schott | P-SF8 | 1.7018 | 1.6910 | 2.90 | 0.992 |
| 276 | Schott | N-SF15 | 1.7124 | 1.7011 | 2.92 | 0.992 |
| 277 | Schott | N-SF15 | 1.7124 | 1.7011 | 2.92 | 0.992 |
| 278 | Schott | N-SF15 | 1.7124 | 1.7011 | 2.92 | 0.992 |
| 279 | Schott | N-SF1 | 1.7315 | 1.7196 | 3.03 | 0.992 |
| 280 | Schott | N-SF8 | 1.7017 | 1.6910 | 2.90 | 0.990 |
| 281 | Schott | N-SF10 | 1.7432 | 1.7306 | 3.05 | 0.986 |
| 282 | Schott | N-SF10 | 1.7432 | 1.7306 | 3.05 | 0.986 |

TABLE 4a-continued

| | | | | | | |
|---|---|---|---|---|---|---|
| 283 | Schott | N-SF10 | 1.7432 | 1.7306 | 3.05 | 0.986 |
| 284 | Schott | N-KZFS8 | 1.7325 | 1.7224 | 3.20 | 0.996 |
| 285 | Schott | N-SF8 | 1.7017 | 1.6910 | 2.90 | 0.990 |
| 286 | Schott | N-SF10 | 1.7432 | 1.7306 | 3.05 | 0.986 |
| 287 | Schott | N-BASF64 | 1.7144 | 1.7057 | 3.20 | 0.978 |
| 288 | Schott | N-SF1 | 1.7315 | 1.7196 | 3.03 | 0.992 |
| 289 | Schott | N-SF1 | 1.7315 | 1.7196 | 3.03 | 0.992 |
| 290 | Schott | N-BASF64 | 1.7144 | 1.7057 | 3.20 | 0.978 |
| 291 | Schott | N-SF15 | 1.7124 | 1.7011 | 2.92 | 0.992 |
| 292 | Schott | N-BASF64 | 1.7144 | 1.7057 | 3.20 | 0.978 |
| 293 | Schott | N-BASF64 | 1.7144 | 1.7057 | 3.20 | 0.978 |
| 294 | Schott | N-BASF64 | 1.7144 | 1.7057 | 3.20 | 0.978 |
| 295 | Schott | N-BASF64 | 1.7144 | 1.7057 | 3.20 | 0.978 |
| 296 | Schott | N-SF15 | 1.7124 | 1.7011 | 2.92 | 0.992 |
| 297 | Schott | N-SF10 | 1.7432 | 1.7306 | 3.05 | 0.986 |
| 298 | Schott | N-SF1 | 1.7315 | 1.7196 | 3.03 | 0.992 |
| 299 | Schott | SF1 | 1.7315 | 1.7196 | 4.46 | 0.998 |
| 300 | Schott | SF10 | 1.7432 | 1.7306 | 4.28 | 0.997 |
| 301 | Schott | SF10 | 1.7432 | 1.7306 | 4.28 | 0.997 |
| 302 | Schott | SF10 | 1.7432 | 1.7306 | 4.28 | 0.997 |
| 303 | Schott | SF1 | 1.7315 | 1.7196 | 4.46 | 0.998 |
| 304 | Schott | SF1 | 1.7315 | 1.7196 | 4.46 | 0.998 |
| 305 | Schott | SF1 | 1.7315 | 1.7196 | 4.46 | 0.998 |
| 306 | NHG | H-ZF50 | 1.7563 | 1.7432 | 3.05 | 0.995 |
| 307 | Hikari | J-SF13 | 1.7563 | 1.7432 | 3.10 | 0.983 |
| 308 | Hoya | FD110 | 1.7474 | 1.7474 | 3.22 | 0.989 |
| 309 | Hikari | J-LAF01 | 1.7084 | 1.7014 | 3.68 | 0.994 |
| 310 | NHG | H-ZF50 | 1.7563 | 1.7432 | 3.05 | 0.995 |
| 311 | NHG | H-ZF50 | 1.7563 | 1.7432 | 3.05 | 0.995 |
| 312 | Hikari | J-LAF01 | 1.7084 | 1.7014 | 3.68 | 0.994 |
| 313 | Hikari | J-SF13 | 1.7563 | 1.7432 | 3.10 | 0.983 |
| 314 | NHG | H-ZF50 | 1.7563 | 1.7432 | 3.05 | 0.995 |
| 315 | Ohara | S-TIH 3 | 1.7552 | 1.7424 | 3.11 | 0.991 |
| 316 | Ohara | S-NBH53V | 1.7513 | 1.7401 | 3.19 | 0.996 |
| 317 | NHG | H-LaF51 | 1.7084 | 1.7014 | 4.01 | 0.998 |
| 318 | Ohara | S-NBH53V | 1.7513 | 1.7401 | 3.19 | 0.996 |
| 319 | Sumita | K-LaFn3 | 1.7084 | 1.7014 | 4.02 | 0.992 |
| 320 | NHG | H-ZF50 | 1.7563 | 1.7432 | 3.05 | 0.995 |
| 321 | Ohara | S-NBH53V | 1.7513 | 1.7401 | 3.19 | 0.996 |
| 322 | NHG | H-LaF51 | 1.7084 | 1.7014 | 4.01 | 0.998 |
| 323 | NHG | H-LaF51 | 1.7084 | 1.7014 | 4.01 | 0.998 |
| 324 | Sumita | K-LaFn3 | 1.7084 | 1.7014 | 4.02 | 0.992 |
| 325 | NHG | H-LaK3 | 1.7554 | 1.7483 | 4.10 | 0.998 |
| 326 | NHG | H-LaF53 | 1.7520 | 1.7447 | 4.15 | 0.998 |
| 327 | NHG | H-ZF50 | 1.7563 | 1.7432 | 3.05 | 0.995 |
| 328 | NHG | H-ZF50 | 1.7563 | 1.7432 | 3.05 | 0.995 |
| 329 | Sumita | K-LaFn3 | 1.7084 | 1.7014 | 4.02 | 0.992 |
| 330 | NHG | H-LaK61 | 1.7491 | 1.7423 | 4.10 | 0.998 |
| 331 | Hikari | J-LAK011 | 1.7491 | 1.7423 | 4.19 | 0.993 |
| 332 | Hikari | J-LAF2 | 1.7536 | 1.7456 | 4.16 | 0.997 |
| 333 | Sumita | K-LaFn5 | 1.7517 | 1.7444 | 4.05 | 0.997 |
| 334 | Sumita | K-LaF2 | 1.7536 | 1.7456 | 4.01 | 0.988 |
| 335 | NHG | H-LaF53 | 1.7520 | 1.7447 | 4.15 | 0.998 |
| 336 | Hoya | M-TAF101 | 1.7482 | 1.7482 | 4.56 | 0.999 |
| 337 | Sumita | K-LaKn14 | 1.7491 | 1.7423 | 4.31 | 0.998 |
| 338 | Hoya | MC-TAF101-100 | 1.7490 | 1.7490 | 4.56 | 0.998 |
| 339 | Sumita | K-LaKn14 | 1.7491 | 1.7423 | 4.31 | 0.998 |
| 340 | Hikari | J-LAK011 | 1.7491 | 1.7423 | 4.19 | 0.993 |

TABLE 4b

| | Glass for R position | | | | | totals | | |
|---|---|---|---|---|---|---|---|---|
| Ex | glass company: | glass name: | From n(610 nm) | To n(760 nm) | density [g/cm$^3$] | Ti integral (610-760 nm) | average density | T = ($T_{red}$ · $T_{blue}$ · $T_{green}$) | FoM ($T_{red}$ · $T_{blue}$ · $T_{green}$)$^{1/3}$/ average density |
| 274 | Schott | N-SF1 | 1.7148 | 1.7032 | 3.03 | 0.995 | 2.93 | 0.986 | 0.337 |
| 275 | Schott | N-SF1 | 1.7148 | 1.7032 | 3.03 | 0.995 | 2.94 | 0.986 | 0.335 |
| 276 | Schott | N-SF1 | 1.7148 | 1.7032 | 3.03 | 0.995 | 2.95 | 0.986 | 0.334 |
| 277 | Schott | N-SF1 | 1.7148 | 1.7032 | 3.03 | 0.995 | 2.95 | 0.986 | 0.334 |
| 278 | Schott | N-SF10 | 1.7256 | 1.7134 | 3.05 | 0.992 | 2.96 | 0.985 | 0.333 |
| 279 | Schott | N-SF1 | 1.7148 | 1.7032 | 3.03 | 0.995 | 2.98 | 0.984 | 0.330 |
| 280 | Schott | N-KZFS8 | 1.7182 | 1.7081 | 3.20 | 0.998 | 3.00 | 0.986 | 0.329 |
| 281 | Schott | N-SF1 | 1.7148 | 1.7032 | 3.03 | 0.995 | 2.99 | 0.982 | 0.328 |
| 282 | Schott | N-SF1 | 1.7148 | 1.7032 | 3.03 | 0.995 | 3.00 | 0.980 | 0.327 |
| 283 | Schott | N-SF10 | 1.7256 | 1.7134 | 3.05 | 0.992 | 3.01 | 0.979 | 0.325 |

TABLE 4b-continued

| | | Glass for R position | | | | totals | | |
|---|---|---|---|---|---|---|---|---|
| Ex | glass company: | glass name: | From n(610 nm) | To n(760 nm) | density [g/cm³] | Ti integral (610-760 nm) | average density | T = ($T_{red}$ · $T_{blue}$ · $T_{green}$) | FoM ($T_{red}$ · $T_{blue}$ · $T_{green}$)$^{1/3}$/ average density |
|---|---|---|---|---|---|---|---|---|---|
| 284 | Schott | N-SF10 | 1.7256 | 1.7134 | 3.05 | 0.992 | 3.05 | 0.986 | 0.323 |
| 285 | Schott | N-SF1 | 1.7148 | 1.7032 | 3.03 | 0.995 | 3.04 | 0.982 | 0.323 |
| 286 | Schott | N-BASF64 | 1.7021 | 1.6932 | 3.20 | 0.985 | 3.06 | 0.976 | 0.319 |
| 287 | Schott | N-SF10 | 1.7256 | 1.7134 | 3.05 | 0.992 | 3.06 | 0.976 | 0.319 |
| 288 | Schott | N-SF1 | 1.7148 | 1.7032 | 3.03 | 0.995 | 3.08 | 0.982 | 0.319 |
| 289 | Schott | N-SF10 | 1.7256 | 1.7134 | 3.05 | 0.992 | 3.09 | 0.981 | 0.317 |
| 290 | Schott | N-KZFS8 | 1.7182 | 1.7081 | 3.20 | 0.998 | 3.10 | 0.980 | 0.316 |
| 291 | Schott | N-BASF64 | 1.7021 | 1.6932 | 3.20 | 0.985 | 3.11 | 0.979 | 0.315 |
| 292 | Schott | N-BASF64 | 1.7021 | 1.6932 | 3.20 | 0.985 | 3.11 | 0.974 | 0.313 |
| 293 | Schott | N-SF10 | 1.7256 | 1.7134 | 3.05 | 0.992 | 3.10 | 0.971 | 0.313 |
| 294 | Schott | N-SF1 | 1.7148 | 1.7032 | 3.03 | 0.995 | 3.14 | 0.978 | 0.311 |
| 295 | Schott | N-BASF64 | 1.7021 | 1.6932 | 3.20 | 0.985 | 3.20 | 0.974 | 0.304 |
| 296 | Schott | N-SF1 | 1.7148 | 1.7032 | 3.03 | 0.995 | 3.34 | 0.993 | 0.298 |
| 297 | Schott | N-SF10 | 1.7256 | 1.7134 | 3.05 | 0.992 | 3.39 | 0.990 | 0.292 |
| 298 | Schott | SF10 | 1.7255 | 1.7134 | 4.28 | 0.998 | 3.40 | 0.987 | 0.290 |
| 299 | Schott | N-KZFS8 | 1.7182 | 1.7081 | 3.20 | 0.998 | 3.52 | 0.989 | 0.281 |
| 300 | Schott | N-KZFS8 | 1.7182 | 1.7081 | 3.20 | 0.998 | 3.56 | 0.985 | 0.277 |
| 301 | Schott | SF10 | 1.7255 | 1.7134 | 4.28 | 0.998 | 3.82 | 0.986 | 0.258 |
| 302 | Schott | SF1 | 1.7148 | 1.7032 | 4.46 | 0.998 | 3.88 | 0.989 | 0.255 |
| 303 | Schott | SF1 | 1.7148 | 1.7032 | 4.46 | 0.998 | 3.94 | 0.989 | 0.251 |
| 304 | Schott | SF1 | 1.7148 | 1.7032 | 4.46 | 0.998 | 4.04 | 0.985 | 0.244 |
| 305 | Schott | SF1 | 1.7148 | 1.7032 | 4.46 | 0.998 | 4.46 | 0.995 | 0.223 |
| 306 | Schott | N-SF14 | 1.7588 | 1.7453 | 3.12 | 0.993 | 3.13 | 0.976 | 0.312 |
| 307 | Sumita | K-SFLD14 | 1.7588 | 1.7452 | 3.15 | 0.990 | 3.16 | 0.970 | 0.307 |
| 308 | NHG | H-ZF12 | 1.7588 | 1.7453 | 3.16 | 0.996 | 3.20 | 0.975 | 0.305 |
| 309 | Hoya | E-FD13 | 1.7090 | 1.7090 | 3.11 | 0.994 | 3.30 | 0.980 | 0.297 |
| 310 | Schott | N-SF14 | 1.7588 | 1.7453 | 3.12 | 0.993 | 3.36 | 0.992 | 0.295 |
| 311 | Schott | N-SF14 | 1.7588 | 1.7453 | 3.12 | 0.993 | 3.39 | 0.993 | 0.293 |
| 312 | Hoya | M-LAF81 | 1.7079 | 1.7079 | 3.22 | 0.999 | 3.37 | 0.987 | 0.293 |
| 313 | Sumita | K-SFLD14 | 1.7588 | 1.7452 | 3.15 | 0.990 | 3.39 | 0.987 | 0.291 |
| 314 | Ohara | S-TIH14 | 1.7588 | 1.7453 | 3.17 | 0.992 | 3.43 | 0.994 | 0.290 |
| 315 | Hikari | J-SF14 | 1.7588 | 1.7453 | 3.17 | 0.992 | 3.43 | 0.992 | 0.289 |
| 316 | NHG | H-ZF12 | 1.7588 | 1.7453 | 3.16 | 0.996 | 3.45 | 0.995 | 0.288 |
| 317 | Hoya | E-FD13 | 1.7090 | 1.7090 | 3.11 | 0.994 | 3.41 | 0.982 | 0.288 |
| 318 | Schott | N-SF14 | 1.7588 | 1.7453 | 3.12 | 0.993 | 3.46 | 0.994 | 0.287 |
| 319 | Hoya | M-LAF81 | 1.7079 | 1.7079 | 3.22 | 0.999 | 3.49 | 0.986 | 0.283 |
| 320 | NHG | H-ZF12 | 1.7588 | 1.7453 | 3.16 | 0.996 | 3.59 | 0.994 | 0.277 |
| 321 | NHG | H-ZF12 | 1.7588 | 1.7453 | 3.16 | 0.996 | 3.64 | 0.994 | 0.273 |
| 322 | Hoya | E-FD13 | 1.7090 | 1.7090 | 3.11 | 0.994 | 3.66 | 0.995 | 0.272 |
| 323 | Hoya | M-LAF81 | 1.7079 | 1.7079 | 3.22 | 0.999 | 3.70 | 0.997 | 0.269 |
| 324 | Hoya | LAC10 | 1.7015 | 1.7015 | 3.87 | 0.996 | 3.70 | 0.986 | 0.266 |
| 325 | Sumita | K-SFLD14 | 1.7588 | 1.7452 | 3.15 | 0.990 | 3.75 | 0.993 | 0.265 |
| 326 | Schott | N-SF14 | 1.7588 | 1.7453 | 3.12 | 0.993 | 3.76 | 0.994 | 0.265 |
| 327 | NHG | H-LaK53A | 1.7534 | 1.7460 | 4.24 | 0.998 | 3.79 | 0.996 | 0.263 |
| 328 | Hoya | MP-TAF101-100 | 1.7490 | 1.7490 | 4.56 | 0.998 | 3.89 | 0.995 | 0.256 |
| 329 | Hoya | LAC10 | 1.7015 | 1.7015 | 3.87 | 0.996 | 3.92 | 0.994 | 0.254 |
| 330 | NHG | H-ZF12 | 1.7588 | 1.7453 | 3.16 | 0.996 | 3.94 | 0.995 | 0.253 |
| 331 | NHG | H-ZF12 | 1.7588 | 1.7453 | 3.16 | 0.996 | 3.97 | 0.994 | 0.250 |
| 332 | Hoya | FD110 | 1.7474 | 1.7474 | 3.22 | 0.992 | 3.98 | 0.994 | 0.250 |
| 333 | NHG | H-LaF6LB | 1.7553 | 1.7472 | 4.25 | 0.998 | 4.12 | 0.996 | 0.242 |
| 334 | Sumita | K-LaSKn1 | 1.7534 | 1.7460 | 4.51 | 0.998 | 4.20 | 0.993 | 0.237 |
| 335 | Hoya | MP-TAF101-100 | 1.7490 | 1.7490 | 4.56 | 0.998 | 4.26 | 0.996 | 0.234 |
| 336 | NHG | H-LaK53A | 1.7534 | 1.7460 | 4.24 | 0.998 | 4.29 | 0.997 | 0.232 |
| 337 | Sumita | K-LaSKn1 | 1.7534 | 1.7460 | 4.51 | 0.998 | 4.30 | 0.996 | 0.232 |
| 338 | Sumita | K-LaSKn1 | 1.7534 | 1.7460 | 4.51 | 0.998 | 4.36 | 0.996 | 0.229 |
| 339 | Hoya | MP-TAF101-100 | 1.7490 | 1.7490 | 4.56 | 0.998 | 4.48 | 0.996 | 0.222 |
| 340 | Sumita | K-GIR140 | 1.7492 | 1.7406 | 5.24 | 0.998 | 4.50 | 0.995 | 0.221 |

TABLE 5a

| | | Glass for B position | | | |
|---|---|---|---|---|---|
| Ex | glass company: | glass name: | From n(400 nm) | To n(500 nm) | density [g/cm³] | Ti integral (400-500 nm) |
|---|---|---|---|---|---|---|
| 341 | Schott | P-SF8 | 1.7316 | 1.7018 | 2.90 | 0.971 |
| 342 | Schott | N-SF1 | 1.7646 | 1.7315 | 3.03 | 0.960 |
| 343 | Schott | N-SF1 | 1.7646 | 1.7315 | 3.03 | 0.960 |

TABLE 5a-continued

| | | | | | |
|---|---|---|---|---|---|
| 344 | Schott | N-SF1 | 1.7646 | 1.7315 | 3.03 | 0.960 |
| 345 | Schott | SF1 | 1.7643 | 1.7315 | 4.46 | 0.989 |
| 346 | Schott | SF1 | 1.7643 | 1.7315 | 4.46 | 0.989 |
| 347 | Schott | N-KZFS8 | 1.7596 | 1.7325 | 3.20 | 0.983 |
| 348 | Schott | N-KZFS8 | 1.7596 | 1.7325 | 3.20 | 0.983 |
| 349 | Schott | N-KZFS8 | 1.7596 | 1.7325 | 3.20 | 0.983 |
| 350 | Schott | N-KZFS8 | 1.7596 | 1.7325 | 3.20 | 0.983 |
| 351 | Schott | N-SF10 | 1.7783 | 1.7432 | 3.05 | 0.944 |
| 352 | Schott | N-SF10 | 1.7783 | 1.7432 | 3.05 | 0.944 |
| 353 | Schott | N-SF10 | 1.7783 | 1.7432 | 3.05 | 0.944 |
| 354 | Schott | N-SF4 | 1.8094 | 1.7712 | 3.15 | 0.941 |
| 355 | Schott | N-SF4 | 1.8094 | 1.7712 | 3.15 | 0.941 |
| 356 | Schott | N-SF4 | 1.8094 | 1.7712 | 3.15 | 0.941 |
| 357 | Schott | N-SF4 | 1.8094 | 1.7712 | 3.15 | 0.941 |
| 358 | Schott | N-SF4 | 1.8094 | 1.7712 | 3.15 | 0.941 |
| 359 | Schott | N-SF4 | 1.8094 | 1.7712 | 3.15 | 0.941 |
| 360 | Schott | N-SF4 | 1.8094 | 1.7712 | 3.15 | 0.941 |
| 361 | Schott | N-SF4 | 1.8094 | 1.7712 | 3.15 | 0.941 |
| 362 | Schott | N-SF4 | 1.8094 | 1.7712 | 3.15 | 0.941 |
| 363 | Schott | N-SF14 | 1.8185 | 1.7786 | 3.12 | 0.960 |
| 364 | Schott | N-SF14 | 1.8185 | 1.7786 | 3.12 | 0.960 |
| 365 | Schott | N-SF14 | 1.8185 | 1.7786 | 3.12 | 0.960 |
| 366 | Schott | N-SF14 | 1.8185 | 1.7786 | 3.12 | 0.960 |
| 367 | Schott | N-SF14 | 1.8185 | 1.7786 | 3.12 | 0.960 |
| 368 | Schott | N-SF14 | 1.8185 | 1.7786 | 3.12 | 0.960 |
| 369 | Schott | N-SF14 | 1.8185 | 1.7786 | 3.12 | 0.960 |
| 370 | Schott | N-SF14 | 1.8185 | 1.7786 | 3.12 | 0.960 |
| 371 | Schott | N-SF14 | 1.8185 | 1.7786 | 3.12 | 0.960 |
| 372 | Schott | N-SF14 | 1.8185 | 1.7786 | 3.12 | 0.960 |
| 373 | Schott | N-SF14 | 1.8185 | 1.7786 | 3.12 | 0.960 |
| 374 | Schott | N-SF14 | 1.8185 | 1.7786 | 3.12 | 0.960 |
| 375 | Schott | N-SF14 | 1.8185 | 1.7786 | 3.12 | 0.960 |
| 376 | Schott | N-SF14 | 1.8185 | 1.7786 | 3.12 | 0.960 |
| 377 | Schott | N-SF14 | 1.8185 | 1.7786 | 3.12 | 0.960 |
| 378 | Schott | N-SF14 | 1.8185 | 1.7786 | 3.12 | 0.960 |
| 379 | Hoya | MC-TAFD51-50 | 1.7969 | 1.7969 | 5.01 | 0.985 |
| 380 | Hoya | TAF1 | 1.7532 | 1.7532 | 4.28 | 0.994 |
| 381 | Hoya | TAF5 | 1.7942 | 1.7942 | 5.06 | 0.990 |
| 382 | Hoya | MC-TAFD51-50 | 1.7969 | 1.7969 | 5.01 | 0.985 |
| 383 | Hoya | MC-TAF105 | 1.7523 | 1.7523 | 4.62 | 0.994 |
| 384 | Hoya | MC-TAFD51-50 | 1.7969 | 1.7969 | 5.01 | 0.985 |
| 385 | Hoya | TAF5 | 1.7942 | 1.7942 | 5.06 | 0.990 |
| 386 | Hoya | MP-TAF401 | 1.7529 | 1.7529 | 4.62 | 0.985 |
| 387 | Hoya | MC-TAF105 | 1.7523 | 1.7523 | 4.62 | 0.994 |
| 388 | Hoya | M-TAF1 | 1.7524 | 1.7524 | 4.83 | 0.993 |
| 389 | Hoya | TAF5 | 1.7942 | 1.7942 | 5.06 | 0.990 |
| 390 | Hoya | MP-TAFD51-50 | 1.7969 | 1.7969 | 5.01 | 0.974 |
| 391 | Hoya | MC-TAFD51-50 | 1.7969 | 1.7969 | 5.01 | 0.985 |
| 392 | Hoya | TAF5 | 1.7942 | 1.7942 | 5.06 | 0.990 |
| 393 | Hoya | MP-TAFD51-50 | 1.7969 | 1.7969 | 5.01 | 0.974 |

| | | Glass for G position | | | | |
|---|---|---|---|---|---|---|
| Ex | glass company: | glass name: | From n(500 nm) | To n(570 nm) | density [g/cm³] | Ti integral (500-570 nm) |
| 341 | Schott | N-SF14 | 1.7786 | 1.7645 | 3.12 | 0.990 |
| 342 | Schott | N-SF14 | 1.7786 | 1.7645 | 3.12 | 0.990 |
| 343 | Schott | N-SF14 | 1.7786 | 1.7645 | 3.12 | 0.990 |
| 344 | Schott | N-SF4 | 1.7712 | 1.7577 | 3.15 | 0.987 |
| 345 | Schott | N-SF14 | 1.7786 | 1.7645 | 3.12 | 0.990 |
| 346 | Schott | N-SF4 | 1.7712 | 1.7577 | 3.15 | 0.987 |
| 347 | Schott | N-SF4 | 1.7712 | 1.7577 | 3.15 | 0.987 |
| 348 | Schott | N-SF14 | 1.7786 | 1.7645 | 3.12 | 0.990 |
| 349 | Schott | N-SF4 | 1.7712 | 1.7577 | 3.15 | 0.987 |
| 350 | Schott | N-SF14 | 1.7786 | 1.7645 | 3.12 | 0.990 |
| 351 | Schott | N-SF4 | 1.7712 | 1.7577 | 3.15 | 0.987 |
| 352 | Schott | N-SF14 | 1.7786 | 1.7645 | 3.12 | 0.990 |
| 353 | Schott | N-SF4 | 1.7712 | 1.7577 | 3.15 | 0.987 |
| 354 | Schott | N-SF14 | 1.7786 | 1.7645 | 3.12 | 0.990 |
| 355 | Schott | N-SF14 | 1.7786 | 1.7645 | 3.12 | 0.990 |
| 356 | Schott | N-SF4 | 1.7712 | 1.7577 | 3.15 | 0.987 |
| 357 | Schott | N-SF4 | 1.7712 | 1.7577 | 3.15 | 0.987 |
| 358 | Schott | SF56A | 1.8023 | 1.7875 | 4.92 | 0.997 |
| 359 | Schott | N-SF6 | 1.8237 | 1.8081 | 3.37 | 0.985 |
| 360 | Schott | N-SF11 | 1.8026 | 1.7875 | 3.22 | 0.988 |
| 361 | Schott | N-LASF44 | 1.8142 | 1.8058 | 4.44 | 0.997 |
| 362 | Schott | N-LASF41 | 1.8462 | 1.8368 | 4.85 | 0.996 |
| 363 | Schott | N-SF14 | 1.7786 | 1.7645 | 3.12 | 0.990 |
| 364 | Schott | N-SF14 | 1.7786 | 1.7645 | 3.12 | 0.990 |

TABLE 5a-continued

| | | | | | | |
|---|---|---|---|---|---|---|
| 365 | Schott | N-SF4 | 1.7712 | 1.7577 | 3.15 | 0.987 |
| 366 | Schott | N-SF14 | 1.7786 | 1.7645 | 3.12 | 0.990 |
| 367 | Schott | N-SF4 | 1.7712 | 1.7577 | 3.15 | 0.987 |
| 368 | Schott | N-SF14 | 1.7786 | 1.7645 | 3.12 | 0.990 |
| 369 | Schott | N-SF4 | 1.7712 | 1.7577 | 3.15 | 0.987 |
| 370 | Schott | N-SF14 | 1.7786 | 1.7645 | 3.12 | 0.990 |
| 371 | Schott | SF56A | 1.8023 | 1.7875 | 4.92 | 0.997 |
| 372 | Schott | N-SF6HT | 1.8237 | 1.8081 | 3.37 | 0.987 |
| 373 | Schott | N-SF11 | 1.8026 | 1.7875 | 3.22 | 0.988 |
| 374 | Schott | N-SF6HT | 1.8237 | 1.8081 | 3.37 | 0.987 |
| 375 | Schott | N-LASF45 | 1.8144 | 1.8032 | 3.63 | 0.990 |
| 376 | Schott | N-SF11 | 1.8026 | 1.7875 | 3.22 | 0.988 |
| 377 | Schott | N-LASF45 | 1.8144 | 1.8032 | 3.63 | 0.990 |
| 378 | Schott | SF11 | 1.8025 | 1.7875 | 4.74 | 0.994 |
| 379 | Ohara | S-NBH58 | 1.8050 | 1.7914 | 3.33 | 0.995 |
| 380 | Hoya | TAF1 | 1.7532 | 1.7532 | 4.28 | 0.999 |
| 381 | Ohara | S-NBH58 | 1.8050 | 1.7914 | 3.33 | 0.995 |
| 382 | Ohara | S-NBH58 | 1.8050 | 1.7914 | 3.33 | 0.995 |
| 383 | Hoya | TAF1 | 1.7532 | 1.7532 | 4.28 | 0.999 |
| 384 | Ohara | S-NBH58 | 1.8050 | 1.7914 | 3.33 | 0.995 |
| 385 | Ohara | S-NBH58 | 1.8050 | 1.7914 | 3.33 | 0.995 |
| 386 | Hoya | MC-TAF401 | 1.7529 | 1.7529 | 4.62 | 0.991 |
| 387 | Hoya | TAF1 | 1.7532 | 1.7532 | 4.28 | 0.999 |
| 388 | Hoya | M-TAF1 | 1.7524 | 1.7524 | 4.83 | 0.998 |
| 389 | Hikari | J-LASF017 | 1.8051 | 1.7967 | 4.34 | 0.994 |
| 390 | Hikari | J-LASF017 | 1.8051 | 1.7967 | 4.34 | 0.994 |
| 391 | Hoya | MC-TAFD51-50 | 1.7969 | 1.7969 | 5.01 | 0.996 |
| 392 | Hoya | MC-TAFD51-50 | 1.7969 | 1.7969 | 5.01 | 0.996 |
| 393 | Hoya | TAF5 | 1.7942 | 1.7942 | 5.06 | 0.996 |

TABLE 5b

| | Glass for R position | | | | | totals | | |
|---|---|---|---|---|---|---|---|---|
| Ex | glass company: | glass name: | From n(610 nm) | To n(760 nm) | density [g/cm$^3$] | Ti integral (610-760 nm) | average density | $T = (T_{red} \cdot T_{blue} \cdot T_{green})^{1/3}$ | FoM $(T_{red} \cdot T_{blue} \cdot T_{green})^{1/3}$/ average density |
| 341 | Schott | N-SF11 | 1.7815 | 1.7671 | 3.22 | 0.993 | 3.08 | 0.985 | 0.320 |
| 342 | Schott | N-SF14 | 1.7588 | 1.7453 | 3.12 | 0.993 | 3.09 | 0.981 | 0.318 |
| 343 | Schott | N-SF11 | 1.7815 | 1.7671 | 3.22 | 0.993 | 3.12 | 0.981 | 0.314 |
| 344 | Schott | N-LASF45 | 1.7986 | 1.7875 | 3.63 | 0.995 | 3.27 | 0.981 | 0.300 |
| 345 | Schott | SF56A | 1.7815 | 1.7674 | 4.92 | 0.998 | 4.17 | 0.992 | 0.238 |
| 346 | Schott | SF56A | 1.7815 | 1.7674 | 4.92 | 0.998 | 4.18 | 0.991 | 0.237 |
| 347 | Schott | N-SF4 | 1.7522 | 1.7392 | 3.15 | 0.993 | 3.16 | 0.988 | 0.312 |
| 348 | Schott | N-SF11 | 1.7815 | 1.7671 | 3.22 | 0.993 | 3.18 | 0.989 | 0.311 |
| 349 | Schott | N-LASF45HT | 1.7986 | 1.7875 | 3.63 | 0.995 | 3.33 | 0.989 | 0.297 |
| 350 | Schott | SF56A | 1.7815 | 1.7674 | 4.92 | 0.998 | 3.75 | 0.990 | 0.264 |
| 351 | Schott | N-SF14 | 1.7588 | 1.7453 | 3.12 | 0.993 | 3.10 | 0.974 | 0.314 |
| 352 | Schott | N-SF11 | 1.7815 | 1.7671 | 3.22 | 0.993 | 3.13 | 0.975 | 0.312 |
| 353 | Schott | N-SF11 | 1.7815 | 1.7671 | 3.22 | 0.993 | 3.14 | 0.975 | 0.310 |
| 354 | Schott | N-SF6HT | 1.8018 | 1.7869 | 3.37 | 0.993 | 3.21 | 0.974 | 0.303 |
| 355 | Schott | N-SF6 | 1.8018 | 1.7869 | 3.37 | 0.992 | 3.21 | 0.974 | 0.303 |
| 356 | Schott | N-SF6 | 1.8018 | 1.7869 | 3.37 | 0.992 | 3.22 | 0.973 | 0.302 |
| 357 | Schott | N-LASF45 | 1.7986 | 1.7875 | 3.63 | 0.995 | 3.31 | 0.974 | 0.295 |
| 358 | Schott | SF56A | 1.7815 | 1.7674 | 4.92 | 0.998 | 4.33 | 0.978 | 0.226 |
| 359 | Schott | N-SF6 | 1.8018 | 1.7869 | 3.37 | 0.992 | 3.29 | 0.972 | 0.295 |
| 360 | Schott | N-SF6 | 1.8018 | 1.7869 | 3.37 | 0.992 | 3.25 | 0.973 | 0.300 |
| 361 | Schott | N-SF57HT | 1.8429 | 1.8263 | 3.53 | 0.990 | 3.71 | 0.976 | 0.263 |
| 362 | Schott | N-LASF9HT | 1.8474 | 1.8347 | 4.41 | 0.993 | 4.13 | 0.976 | 0.236 |
| 363 | Schott | N-SF11 | 1.7815 | 1.7671 | 3.22 | 0.993 | 3.15 | 0.981 | 0.311 |
| 364 | Schott | N-SF6HT | 1.8018 | 1.7869 | 3.37 | 0.993 | 3.20 | 0.981 | 0.306 |
| 365 | Schott | N-SF6 | 1.8018 | 1.7869 | 3.37 | 0.992 | 3.21 | 0.980 | 0.305 |
| 366 | Schott | N-LASF45 | 1.7986 | 1.7875 | 3.63 | 0.995 | 3.29 | 0.982 | 0.299 |
| 367 | Schott | N-LASF45 | 1.7986 | 1.7875 | 3.63 | 0.995 | 3.30 | 0.981 | 0.298 |
| 368 | Schott | N-LASF44 | 1.8023 | 1.7935 | 4.44 | 0.998 | 3.56 | 0.982 | 0.276 |
| 369 | Schott | N-LASF44 | 1.8023 | 1.7935 | 4.44 | 0.998 | 3.57 | 0.982 | 0.275 |
| 370 | Schott | SF11 | 1.7815 | 1.7672 | 4.74 | 0.997 | 3.66 | 0.982 | 0.268 |
| 371 | Schott | N-LASF44 | 1.8023 | 1.7935 | 4.44 | 0.998 | 4.16 | 0.985 | 0.237 |
| 372 | Schott | N-SF6 | 1.8018 | 1.7869 | 3.37 | 0.992 | 3.29 | 0.980 | 0.298 |
| 373 | Schott | N-SF57HT | 1.8429 | 1.8263 | 3.53 | 0.990 | 3.29 | 0.979 | 0.298 |
| 374 | Schott | N-SF57HT | 1.8429 | 1.8263 | 3.53 | 0.990 | 3.34 | 0.979 | 0.293 |
| 375 | Schott | N-SF6 | 1.8018 | 1.7869 | 3.37 | 0.992 | 3.37 | 0.981 | 0.291 |
| 376 | Schott | N-SF6HT | 1.8018 | 1.7869 | 3.37 | 0.993 | 3.24 | 0.980 | 0.303 |
| 377 | Schott | N-LASF44 | 1.8023 | 1.7935 | 4.44 | 0.998 | 3.73 | 0.982 | 0.264 |
| 378 | Schott | N-LASF44 | 1.8023 | 1.7935 | 4.44 | 0.998 | 4.10 | 0.984 | 0.240 |
| 379 | NHG | H-ZLaF56 | 1.8035 | 1.7918 | 3.56 | 0.996 | 3.97 | 0.992 | 0.250 |

TABLE 5b-continued

| | | Glass for R position | | | | | totals | | |
|---|---|---|---|---|---|---|---|---|---|
| Ex | glass company: | glass name: | From n(610 nm) | To n(760 nm) | density [g/cm³] | Ti integral (610-760 nm) | average density | $T = (T_{red} \cdot T_{blue} \cdot T_{green})^{1/3}$ | FoM $(T_{red} \cdot T_{blue} \cdot T_{green})^{1/3}$ / average density |
| 380 | Hikari | J-LAF05 | 1.7600 | 1.7506 | 3.94 | 0.992 | 4.17 | 0.995 | 0.239 |
| 381 | Sumita | K-LaSFn2 | 1.8028 | 1.7927 | 4.13 | 0.998 | 4.17 | 0.994 | 0.238 |
| 382 | NHG | D-ZLaF52 | 1.8040 | 1.7941 | 4.47 | 0.997 | 4.27 | 0.992 | 0.232 |
| 383 | NHG | H-LaF76 | 1.7600 | 1.7505 | 3.97 | 0.996 | 4.29 | 0.996 | 0.232 |
| 384 | Hikari | J-LASF015 | 1.8021 | 1.7934 | 4.57 | 0.991 | 4.30 | 0.990 | 0.230 |
| 385 | Sumita | K-VC89 | 1.8078 | 1.7980 | 4.75 | 0.997 | 4.38 | 0.994 | 0.227 |
| 386 | Hikari | J-LAF05 | 1.7600 | 1.7506 | 3.94 | 0.992 | 4.39 | 0.989 | 0.225 |
| 387 | Hoya | MC-TAF105 | 1.7523 | 1.7523 | 4.62 | 0.999 | 4.51 | 0.997 | 0.221 |
| 388 | Hikari | J-LAF05 | 1.7600 | 1.7506 | 3.94 | 0.992 | 4.53 | 0.994 | 0.219 |
| 389 | NHG | H-ZLaF50 | 1.8021 | 1.7934 | 4.47 | 0.998 | 4.62 | 0.994 | 0.215 |
| 390 | Hikari | J-LASF015 | 1.8021 | 1.7934 | 4.57 | 0.991 | 4.64 | 0.986 | 0.213 |
| 391 | NHG | H-ZLaF51 | 1.8023 | 1.7922 | 4.26 | 0.996 | 4.76 | 0.992 | 0.208 |
| 392 | Ohara | S-LAH65VS | 1.8021 | 1.7934 | 4.46 | 0.999 | 4.84 | 0.995 | 0.205 |
| 393 | Sumita | K-VC89 | 1.8078 | 1.7980 | 4.75 | 0.997 | 4.94 | 0.989 | 0.200 |

TABLE 6a

| | | Glass for B position | | | | |
|---|---|---|---|---|---|---|
| Ex | glass company: | glass name: | From n(400 nm) | To n(500 nm) | density [g/cm³] | Ti integral (400-500 nm) |
| 394 | Schott | N-SF14 | 1.8185 | 1.7786 | 3.12 | 0.960 |
| 395 | Schott | N-SF4 | 1.8094 | 1.7712 | 3.15 | 0.941 |
| 396 | Schott | N-SF14 | 1.8185 | 1.7786 | 3.12 | 0.960 |
| 397 | Schott | N-SF14 | 1.8185 | 1.7786 | 3.12 | 0.960 |
| 398 | Schott | N-SF4 | 1.8094 | 1.7712 | 3.15 | 0.941 |
| 399 | Schott | N-SF14 | 1.8185 | 1.7786 | 3.12 | 0.960 |
| 400 | Schott | N-SF11 | 1.8454 | 1.8026 | 3.22 | 0.943 |
| 401 | Schott | N-SF14 | 1.8185 | 1.7786 | 3.12 | 0.960 |
| 402 | Schott | N-SF6HT | 1.8682 | 1.8237 | 3.37 | 0.953 |
| 403 | Schott | N-SF11 | 1.8454 | 1.8026 | 3.22 | 0.943 |
| 404 | Schott | N-SF6 | 1.8682 | 1.8237 | 3.37 | 0.941 |
| 405 | Schott | N-SF11 | 1.8454 | 1.8026 | 3.22 | 0.943 |
| 406 | Schott | N-SF11 | 1.8454 | 1.8026 | 3.22 | 0.943 |
| 407 | Schott | N-SF11 | 1.8454 | 1.8026 | 3.22 | 0.943 |
| 408 | Schott | N-SF11 | 1.8454 | 1.8026 | 3.22 | 0.943 |
| 409 | Schott | N-LASF45HT | 1.8444 | 1.8144 | 3.63 | 0.958 |
| 410 | Schott | N-LASF45HT | 1.8444 | 1.8144 | 3.63 | 0.958 |
| 411 | Schott | N-LASF45HT | 1.8444 | 1.8144 | 3.63 | 0.958 |
| 412 | Schott | N-LASF44 | 1.8355 | 1.8142 | 4.44 | 0.986 |
| 413 | Schott | N-SF11 | 1.8454 | 1.8026 | 3.22 | 0.943 |
| 414 | Schott | N-SF14 | 1.8185 | 1.7786 | 3.12 | 0.960 |
| 415 | Schott | N-SF4 | 1.8094 | 1.7712 | 3.15 | 0.941 |
| 416 | Schott | N-LASF44 | 1.8355 | 1.8142 | 4.44 | 0.986 |
| 417 | Schott | N-LASF45 | 1.8444 | 1.8144 | 3.63 | 0.947 |
| 418 | Schott | N-LASF44 | 1.8355 | 1.8142 | 4.44 | 0.986 |
| 419 | Schott | SF11 | 1.8451 | 1.8025 | 4.74 | 0.911 |
| 420 | Schott | SF11 | 1.8451 | 1.8025 | 4.74 | 0.911 |
| 421 | Schott | SF11 | 1.8451 | 1.8025 | 4.74 | 0.911 |
| 422 | Schott | N-LASF44 | 1.8355 | 1.8142 | 4.44 | 0.986 |
| 423 | Schott | SF11 | 1.8451 | 1.8025 | 4.74 | 0.911 |
| 424 | Schott | N-LASF45HT | 1.8444 | 1.8144 | 3.63 | 0.958 |
| 425 | Schott | N-LASF44 | 1.8355 | 1.8142 | 4.44 | 0.986 |
| 426 | Schott | N-LASF45 | 1.8444 | 1.8144 | 3.63 | 0.947 |
| 427 | Schott | N-LASF44 | 1.8355 | 1.8142 | 4.44 | 0.986 |
| 428 | Schott | N-SF14 | 1.8185 | 1.7786 | 3.12 | 0.960 |
| 429 | Schott | N-LASF44 | 1.8355 | 1.8142 | 4.44 | 0.986 |
| 430 | Schott | N-LASF44 | 1.8355 | 1.8142 | 4.44 | 0.986 |
| 431 | Schott | N-SF4 | 1.8094 | 1.7712 | 3.15 | 0.941 |
| 432 | Schott | N-SF11 | 1.8454 | 1.8026 | 3.22 | 0.943 |
| 433 | Schott | N-LASF44 | 1.8355 | 1.8142 | 4.44 | 0.986 |
| 434 | Schott | N-LASF44 | 1.8355 | 1.8142 | 4.44 | 0.986 |
| 435 | Schott | N-LASF44 | 1.8355 | 1.8142 | 4.44 | 0.986 |
| 436 | Schott | SF56A | 1.8439 | 1.8023 | 4.92 | 0.971 |
| 437 | Schott | N-LASF45 | 1.8444 | 1.8144 | 3.63 | 0.947 |
| 438 | Schott | N-LASF45 | 1.8444 | 1.8144 | 3.63 | 0.947 |
| 439 | Schott | SF11 | 1.8451 | 1.8025 | 4.74 | 0.911 |
| 440 | Schott | N-LASF45 | 1.8444 | 1.8144 | 3.63 | 0.947 |
| 441 | Schott | N-LASF44 | 1.8355 | 1.8142 | 4.44 | 0.986 |
| 442 | Schott | N-LASF44 | 1.8355 | 1.8142 | 4.44 | 0.986 |

TABLE 6a-continued

| | | | | | | |
|---|---|---|---|---|---|---|
| 443 | Schott | N-LASF44 | 1.8355 | 1.8142 | 4.44 | 0.986 |
| 444 | Schott | N-LASF44 | 1.8355 | 1.8142 | 4.44 | 0.986 |
| 445 | Schott | SF56A | 1.8439 | 1.8023 | 4.92 | 0.971 |
| 446 | Schott | SF56A | 1.8439 | 1.8023 | 4.92 | 0.971 |
| 447 | Schott | SF56A | 1.8439 | 1.8023 | 4.92 | 0.971 |
| 448 | Schott | SF11 | 1.8451 | 1.8025 | 4.74 | 0.911 |
| 449 | NHG | D-ZLaF814 | 1.8561 | 1.8275 | 4.22 | 0.979 |
| 450 | NHG | D-ZLaF814 | 1.8561 | 1.8275 | 4.22 | 0.979 |
| 451 | Ohara | S-LAH55VS | 1.8705 | 1.8461 | 4.58 | 0.988 |
| 452 | Schott | N-LASF41 | 1.8703 | 1.8462 | 4.85 | 0.978 |
| 453 | Sumita | K-LaSFn10 | 1.8488 | 1.8261 | 4.80 | 0.971 |
| 454 | Hikari | J-LASF05HS | 1.8705 | 1.8461 | 4.79 | 0.982 |
| 455 | Schott | N-LASF41 | 1.8703 | 1.8462 | 4.85 | 0.978 |
| 456 | Sumita | K-LaSFn8 | 1.8707 | 1.8463 | 4.90 | 0.983 |
| 457 | Sumita | K-LaSFn9 | 1.8476 | 1.8261 | 4.96 | 0.975 |
| 458 | Schott | N-LASF41 | 1.8703 | 1.8462 | 4.85 | 0.978 |
| 459 | Schott | N-LASF41 | 1.8703 | 1.8462 | 4.85 | 0.978 |
| 460 | NHG | H-ZLaF54 | 1.8476 | 1.8261 | 5.04 | 0.994 |
| 461 | Ohara | S-LAH59 | 1.8476 | 1.8261 | 5.07 | 0.980 |

| | | Glass for G position | | | | |
|---|---|---|---|---|---|---|
| Ex | glass company: | glass name: | From n(500 nm) | To n(570 nm) | density [g/cm$^3$] | Ti integral (500-570 nm) |
| 394 | Schott | N-SF11 | 1.8026 | 1.7875 | 3.22 | 0.988 |
| 395 | Schott | N-SF11 | 1.8026 | 1.7875 | 3.22 | 0.988 |
| 396 | Schott | N-SF6HT | 1.8237 | 1.8081 | 3.37 | 0.987 |
| 397 | Schott | N-SF11 | 1.8026 | 1.7875 | 3.22 | 0.988 |
| 398 | Schott | N-SF6 | 1.8237 | 1.8081 | 3.37 | 0.985 |
| 399 | Schott | N-SF6HT | 1.8237 | 1.8081 | 3.37 | 0.987 |
| 400 | Schott | N-SF6 | 1.8237 | 1.8081 | 3.37 | 0.985 |
| 401 | Schott | N-LASF45 | 1.8144 | 1.8032 | 3.63 | 0.990 |
| 402 | Schott | N-SF6HT | 1.8237 | 1.8081 | 3.37 | 0.987 |
| 403 | Schott | N-SF6HTultra | 1.8237 | 1.8081 | 3.37 | 0.990 |
| 404 | Schott | N-SF6 | 1.8237 | 1.8081 | 3.37 | 0.985 |
| 405 | Schott | N-SF6HT | 1.8237 | 1.8081 | 3.37 | 0.987 |
| 406 | Schott | N-SF6 | 1.8237 | 1.8081 | 3.37 | 0.985 |
| 407 | Schott | N-SF57 | 1.8675 | 1.8499 | 3.53 | 0.982 |
| 408 | Schott | N-LASF45HT | 1.8144 | 1.8032 | 3.63 | 0.990 |
| 409 | Schott | N-SF6HT | 1.8237 | 1.8081 | 3.37 | 0.987 |
| 410 | Schott | N-SF6 | 1.8237 | 1.8081 | 3.37 | 0.985 |
| 411 | Schott | N-SF57 | 1.8675 | 1.8499 | 3.53 | 0.982 |
| 412 | Schott | N-SF11 | 1.8026 | 1.7875 | 3.22 | 0.988 |
| 413 | Schott | N-SF6 | 1.8237 | 1.8081 | 3.37 | 0.985 |
| 414 | Schott | N-LASF45 | 1.8144 | 1.8032 | 3.63 | 0.990 |
| 415 | Schott | N-LASF44 | 1.8142 | 1.8058 | 4.44 | 0.997 |
| 416 | Schott | N-SF6HT | 1.8237 | 1.8081 | 3.37 | 0.987 |
| 417 | Schott | N-SF6HT | 1.8237 | 1.8081 | 3.37 | 0.987 |
| 418 | Schott | N-LASF45HT | 1.8144 | 1.8032 | 3.63 | 0.990 |
| 419 | Schott | N-SF6HTultra | 1.8237 | 1.8081 | 3.37 | 0.990 |
| 420 | Schott | N-SF6 | 1.8237 | 1.8081 | 3.37 | 0.985 |
| 421 | Schott | N-LASF45HT | 1.8144 | 1.8032 | 3.63 | 0.990 |
| 422 | Schott | N-SF11 | 1.8026 | 1.7875 | 3.22 | 0.988 |
| 423 | Schott | N-SF57 | 1.8675 | 1.8499 | 3.53 | 0.982 |
| 424 | Schott | N-LASF45 | 1.8144 | 1.8032 | 3.63 | 0.990 |
| 425 | Schott | N-SF6 | 1.8237 | 1.8081 | 3.37 | 0.985 |
| 426 | Schott | N-LASF45 | 1.8144 | 1.8032 | 3.63 | 0.990 |
| 427 | Schott | N-SF6 | 1.8237 | 1.8081 | 3.37 | 0.985 |
| 428 | Schott | SF11 | 1.8025 | 1.7875 | 4.74 | 0.994 |
| 429 | Schott | N-LASF44 | 1.8142 | 1.8058 | 4.44 | 0.997 |
| 430 | Schott | N-SF57HT | 1.8675 | 1.8499 | 3.53 | 0.982 |
| 431 | Schott | N-LASF41 | 1.8462 | 1.8368 | 4.85 | 0.996 |
| 432 | Schott | N-LASF44 | 1.8142 | 1.8058 | 4.44 | 0.997 |
| 433 | Schott | N-SF6HT | 1.8237 | 1.8081 | 3.37 | 0.987 |
| 434 | Schott | SF11 | 1.8025 | 1.7875 | 4.74 | 0.994 |
| 435 | Schott | N-LASF41 | 1.8462 | 1.8368 | 4.85 | 0.996 |
| 436 | Schott | N-LASF45HT | 1.8144 | 1.8032 | 3.63 | 0.990 |
| 437 | Schott | N-LASF44 | 1.8142 | 1.8058 | 4.44 | 0.997 |
| 438 | Schott | N-LASF41 | 1.8462 | 1.8368 | 4.85 | 0.996 |
| 439 | Schott | N-SF57 | 1.8675 | 1.8499 | 3.53 | 0.982 |
| 440 | Schott | SF56A | 1.8023 | 1.7875 | 4.92 | 0.997 |
| 441 | Schott | N-LASF41 | 1.8462 | 1.8368 | 4.85 | 0.996 |
| 442 | Schott | N-LASF44 | 1.8142 | 1.8058 | 4.44 | 0.997 |
| 443 | Schott | N-LASF41 | 1.8462 | 1.8368 | 4.85 | 0.996 |
| 444 | Schott | N-LASF41 | 1.8462 | 1.8368 | 4.85 | 0.996 |
| 445 | Schott | N-LASF44 | 1.8142 | 1.8058 | 4.44 | 0.997 |
| 446 | Schott | N-LASF41 | 1.8462 | 1.8368 | 4.85 | 0.996 |

TABLE 6a-continued

| | | | | | | |
|---|---|---|---|---|---|---|
| 447 | Schott | SF56A | 1.8023 | 1.7875 | 4.92 | 0.997 |
| 448 | Schott | N-LASF41 | 1.8462 | 1.8368 | 4.85 | 0.996 |
| 449 | Sumita | K-LaSFn14 | 1.8469 | 1.8361 | 4.18 | 0.990 |
| 450 | Sumita | K-LaSFn14 | 1.8469 | 1.8361 | 4.18 | 0.990 |
| 451 | Sumita | K-LaSFn14 | 1.8469 | 1.8361 | 4.18 | 0.990 |
| 452 | Sumita | K-LaSFn14 | 1.8469 | 1.8361 | 4.18 | 0.990 |
| 453 | Sumita | K-LaSFn14 | 1.8469 | 1.8361 | 4.18 | 0.990 |
| 454 | Sumita | K-LaSFn14 | 1.8469 | 1.8361 | 4.18 | 0.990 |
| 455 | Schott | N-LASF41 | 1.8462 | 1.8368 | 4.85 | 0.996 |
| 456 | NHG | D-ZLaF53 | 1.8474 | 1.8365 | 4.46 | 0.996 |
| 457 | Schott | N-LASF41 | 1.8462 | 1.8368 | 4.85 | 0.996 |
| 458 | NHG | H-ZLaF55F | 1.8461 | 1.8366 | 4.66 | 0.998 |
| 459 | Schott | N-LASF41 | 1.8462 | 1.8368 | 4.85 | 0.996 |
| 460 | NHG | H-ZLaF55F | 1.8461 | 1.8366 | 4.66 | 0.998 |
| 461 | Sumita | K-LaSFn8 | 1.8463 | 1.8368 | 4.90 | 0.997 |

TABLE 6b

| | Glass for R position | | | | | totals | | |
|---|---|---|---|---|---|---|---|---|
| Ex | glass company: | glass name: | From n(610 nm) | To n(760 nm) | density [g/cm$^3$] | Ti integral (610-760 nm) | average density | T = (T$_{red}$ · T$_{blue}$ · T$_{green}$)$^{1/3}$ | FoM (T$_{red}$ · T$_{blue}$ · T$_{green}$)$^{1/3}$/ average density |
| 394 | Schott | N-SF6HT | 1.8018 | 1.7869 | 3.37 | 0.993 | 3.24 | 0.980 | 0.303 |
| 395 | Schott | N-SF6 | 1.8018 | 1.7869 | 3.37 | 0.992 | 3.25 | 0.973 | 0.300 |
| 396 | Schott | N-SF6 | 1.8018 | 1.7869 | 3.37 | 0.992 | 3.29 | 0.980 | 0.298 |
| 397 | Schott | N-SF57HT | 1.8429 | 1.8263 | 3.53 | 0.990 | 3.29 | 0.979 | 0.298 |
| 398 | Schott | N-SF6 | 1.8018 | 1.7869 | 3.37 | 0.992 | 3.29 | 0.972 | 0.295 |
| 399 | Schott | N-SF57HT | 1.8429 | 1.8263 | 3.53 | 0.990 | 3.34 | 0.979 | 0.293 |
| 400 | Schott | N-SF6 | 1.8018 | 1.7869 | 3.37 | 0.992 | 3.32 | 0.973 | 0.293 |
| 401 | Schott | N-SF6 | 1.8018 | 1.7869 | 3.37 | 0.992 | 3.37 | 0.981 | 0.291 |
| 402 | Schott | N-SF6HT | 1.8018 | 1.7869 | 3.37 | 0.993 | 3.37 | 0.977 | 0.290 |
| 403 | Schott | N-SF57HTultra | 1.8429 | 1.8263 | 3.53 | 0.995 | 3.38 | 0.975 | 0.289 |
| 404 | Schott | N-SF6 | 1.8018 | 1.7869 | 3.37 | 0.992 | 3.37 | 0.972 | 0.289 |
| 405 | Schott | N-SF57HT | 1.8429 | 1.8263 | 3.53 | 0.990 | 3.38 | 0.973 | 0.288 |
| 406 | Schott | N-SF57 | 1.8429 | 1.8263 | 3.53 | 0.990 | 3.38 | 0.972 | 0.288 |
| 407 | Schott | N-SF57HT | 1.8429 | 1.8263 | 3.53 | 0.990 | 3.43 | 0.971 | 0.283 |
| 408 | Schott | N-SF57 | 1.8429 | 1.8263 | 3.53 | 0.990 | 3.46 | 0.974 | 0.281 |
| 409 | Schott | N-SF57 | 1.8429 | 1.8263 | 3.53 | 0.990 | 3.51 | 0.978 | 0.279 |
| 410 | Schott | N-SF57 | 1.8429 | 1.8263 | 3.53 | 0.990 | 3.51 | 0.978 | 0.279 |
| 411 | Schott | N-SF57 | 1.8429 | 1.8263 | 3.53 | 0.990 | 3.56 | 0.976 | 0.274 |
| 412 | Schott | N-SF6 | 1.8018 | 1.7869 | 3.37 | 0.992 | 3.68 | 0.989 | 0.269 |
| 413 | Schott | N-LASF9 | 1.8474 | 1.8347 | 4.41 | 0.993 | 3.67 | 0.973 | 0.265 |
| 414 | Schott | N-LASF44 | 1.8023 | 1.7935 | 4.44 | 0.998 | 3.73 | 0.982 | 0.264 |
| 415 | Schott | N-SF57HT | 1.8429 | 1.8263 | 3.53 | 0.990 | 3.71 | 0.976 | 0.263 |
| 416 | Schott | N-SF57HT | 1.8429 | 1.8263 | 3.53 | 0.990 | 3.78 | 0.988 | 0.261 |
| 417 | Schott | N-LASF9 | 1.8474 | 1.8347 | 4.41 | 0.993 | 3.80 | 0.975 | 0.257 |
| 418 | Schott | N-SF57HT | 1.8429 | 1.8263 | 3.53 | 0.990 | 3.87 | 0.989 | 0.256 |
| 419 | Schott | N-SF57HT | 1.8429 | 1.8263 | 3.53 | 0.990 | 3.88 | 0.963 | 0.248 |
| 420 | Schott | N-SF57 | 1.8429 | 1.8263 | 3.53 | 0.990 | 3.88 | 0.961 | 0.248 |
| 421 | Schott | N-SF6HT | 1.8018 | 1.7869 | 3.37 | 0.993 | 3.91 | 0.964 | 0.246 |
| 422 | Schott | N-LASF44 | 1.8023 | 1.7935 | 4.44 | 0.998 | 4.03 | 0.991 | 0.246 |
| 423 | Schott | N-SF57 | 1.8429 | 1.8263 | 3.53 | 0.990 | 3.94 | 0.960 | 0.244 |
| 424 | Schott | N-LASF41 | 1.8329 | 1.8232 | 4.85 | 0.998 | 4.03 | 0.982 | 0.243 |
| 425 | Schott | N-LASF9HT | 1.8474 | 1.8347 | 4.41 | 0.993 | 4.07 | 0.988 | 0.243 |
| 426 | Schott | N-LASF41 | 1.8329 | 1.8232 | 4.85 | 0.998 | 4.03 | 0.978 | 0.243 |
| 427 | Schott | N-LASF44 | 1.8023 | 1.7935 | 4.44 | 0.998 | 4.08 | 0.990 | 0.242 |
| 428 | Schott | N-LASF44 | 1.8023 | 1.7935 | 4.44 | 0.998 | 4.10 | 0.984 | 0.240 |
| 429 | Schott | N-SF57HT | 1.8429 | 1.8263 | 3.53 | 0.990 | 4.14 | 0.991 | 0.240 |
| 430 | Schott | N-LASF9HT | 1.8474 | 1.8347 | 4.41 | 0.993 | 4.13 | 0.987 | 0.239 |
| 431 | Schott | N-LASF9HT | 1.8474 | 1.8347 | 4.41 | 0.993 | 4.13 | 0.976 | 0.236 |
| 432 | Schott | N-LASF41 | 1.8329 | 1.8232 | 4.85 | 0.998 | 4.17 | 0.979 | 0.235 |
| 433 | Schott | N-LASF41 | 1.8329 | 1.8232 | 4.85 | 0.998 | 4.22 | 0.990 | 0.235 |
| 434 | Schott | N-SF57HT | 1.8429 | 1.8263 | 3.53 | 0.990 | 4.24 | 0.990 | 0.234 |
| 435 | Schott | N-SF57 | 1.8429 | 1.8263 | 3.53 | 0.990 | 4.27 | 0.991 | 0.232 |
| 436 | Schott | N-LASF9 | 1.8474 | 1.8347 | 4.41 | 0.993 | 4.32 | 0.985 | 0.228 |
| 437 | Schott | N-LASF41 | 1.8329 | 1.8232 | 4.85 | 0.998 | 4.30 | 0.980 | 0.228 |
| 438 | Schott | N-LASF41 | 1.8329 | 1.8232 | 4.85 | 0.998 | 4.44 | 0.980 | 0.221 |
| 439 | Schott | N-LASF41 | 1.8329 | 1.8232 | 4.85 | 0.998 | 4.37 | 0.963 | 0.220 |
| 440 | Schott | N-LASF41 | 1.8329 | 1.8232 | 4.85 | 0.998 | 4.46 | 0.980 | 0.220 |
| 441 | Schott | N-LASF9 | 1.8474 | 1.8347 | 4.41 | 0.993 | 4.57 | 0.992 | 0.217 |
| 442 | Schott | N-LASF41 | 1.8329 | 1.8232 | 4.85 | 0.998 | 4.58 | 0.994 | 0.217 |
| 443 | Schott | N-LASF41 | 1.8329 | 1.8232 | 4.85 | 0.998 | 4.71 | 0.993 | 0.211 |
| 444 | Schott | N-LASF41 | 1.8329 | 1.8232 | 4.85 | 0.998 | 4.71 | 0.993 | 0.211 |
| 445 | Schott | N-LASF41 | 1.8329 | 1.8232 | 4.85 | 0.998 | 4.74 | 0.989 | 0.209 |

TABLE 6b-continued

| | Glass for R position | | | | | totals | | |
|---|---|---|---|---|---|---|---|---|
| Ex | glass company: | glass name: | From n(610 nm) | To n(760 nm) | density [g/cm³] | Ti integral (610-760 nm) | average density | T = (T$_{red}$ · T$_{blue}$ · T$_{green}$)$^{1/3}$ | FoM (T$_{red}$ · T$_{blue}$ · T$_{green}$)$^{1/3}$/ average density |
| 446 | Schott | N-LASF41 | 1.8329 | 1.8232 | 4.85 | 0.998 | 4.87 | 0.988 | 0.203 |
| 447 | Schott | N-LASF41 | 1.8329 | 1.8232 | 4.85 | 0.998 | 4.90 | 0.989 | 0.202 |
| 448 | Schott | N-LASF41 | 1.8329 | 1.8232 | 4.85 | 0.998 | 4.81 | 0.967 | 0.201 |
| 449 | Ohara | S-NBH56 | 1.8511 | 1.8349 | 3.49 | 0.997 | 3.96 | 0.989 | 0.249 |
| 450 | Hoya | FDS24 | 1.8742 | 1.8742 | 3.84 | 0.991 | 4.08 | 0.987 | 0.242 |
| 451 | Ohara | S-NBH56 | 1.8511 | 1.8349 | 3.49 | 0.997 | 4.08 | 0.992 | 0.243 |
| 452 | Ohara | S-NBH56 | 1.8511 | 1.8349 | 3.49 | 0.997 | 4.17 | 0.988 | 0.237 |
| 453 | Hikari | J-SFH2 | 1.8568 | 1.8395 | 3.82 | 0.989 | 4.27 | 0.983 | 0.230 |
| 454 | Hoya | E-FDS1-W | 1.8720 | 1.8720 | 3.94 | 0.998 | 4.30 | 0.990 | 0.230 |
| 455 | Ohara | S-NBH56 | 1.8511 | 1.8349 | 3.49 | 0.997 | 4.39 | 0.990 | 0.225 |
| 456 | Hoya | FDS24 | 1.8742 | 1.8742 | 3.84 | 0.991 | 4.40 | 0.990 | 0.225 |
| 457 | Ohara | S-NPH 5 | 1.8550 | 1.8375 | 3.71 | 0.996 | 4.51 | 0.989 | 0.220 |
| 458 | Hoya | M-TAFD307 | 1.8517 | 1.8517 | 5.49 | 0.999 | 5.00 | 0.992 | 0.198 |
| 459 | Hoya | M-TAFD307 | 1.8517 | 1.8517 | 5.49 | 0.999 | 5.06 | 0.991 | 0.196 |
| 460 | Hoya | M-TAFD307 | 1.8517 | 1.8517 | 5.49 | 0.999 | 5.06 | 0.997 | 0.197 |
| 461 | Hoya | MC-TAFD307 | 1.8517 | 1.8517 | 5.49 | 0.995 | 5.15 | 0.991 | 0.192 |

TABLE 7a

| | Glass for B position | | | | | |
|---|---|---|---|---|---|---|
| Ex | glass company: | glass name: | From n(400 nm) | To n(500 nm) | density [g/cm³] | Ti integral (400-500 nm) |
| 462 | Schott | N-SF57HTultra | 1.9181 | 1.8675 | 3.53 | 0.941 |
| 463 | Schott | N-SF57 | 1.9181 | 1.8675 | 3.53 | 0.913 |
| 464 | Schott | N-SF57 | 1.9181 | 1.8675 | 3.53 | 0.913 |
| 465 | Schott | N-SF57HTultra | 1.9181 | 1.8675 | 3.53 | 0.941 |
| 466 | Schott | N-SF57HTultra | 1.9181 | 1.8675 | 3.53 | 0.941 |
| 467 | Schott | N-SF57 | 1.9181 | 1.8675 | 3.53 | 0.913 |
| 468 | Schott | N-SF57 | 1.9181 | 1.8675 | 3.53 | 0.913 |
| 469 | Schott | N-LASF9HT | 1.9009 | 1.8656 | 4.41 | 0.940 |
| 470 | Schott | N-LASF9 | 1.9009 | 1.8656 | 4.41 | 0.931 |
| 471 | Schott | N-SF11 | 1.8454 | 1.8026 | 3.22 | 0.943 |
| 472 | Schott | N-LASF9HT | 1.9009 | 1.8656 | 4.41 | 0.940 |
| 473 | Schott | N-SF57HTultra | 1.9181 | 1.8675 | 3.53 | 0.941 |
| 474 | Schott | N-SF57HTultra | 1.9181 | 1.8675 | 3.53 | 0.941 |
| 475 | Schott | N-LASF45HT | 1.8444 | 1.8144 | 3.63 | 0.958 |
| 476 | Schott | N-SF57HTultra | 1.9181 | 1.8675 | 3.53 | 0.941 |
| 477 | Schott | N-SF57HT | 1.9181 | 1.8675 | 3.53 | 0.926 |
| 478 | Schott | N-SF57 | 1.9181 | 1.8675 | 3.53 | 0.913 |
| 479 | Schott | N-SF57 | 1.9181 | 1.8675 | 3.53 | 0.913 |
| 480 | Schott | N-LASF31A | 1.9227 | 1.8955 | 5.51 | 0.972 |
| 481 | Schott | N-LASF44 | 1.8355 | 1.8142 | 4.44 | 0.986 |
| 482 | Schott | N-LASF31A | 1.9227 | 1.8955 | 5.51 | 0.972 |
| 483 | Schott | N-LASF31A | 1.9227 | 1.8955 | 5.51 | 0.972 |
| 484 | Schott | N-LASF31A | 1.9227 | 1.8955 | 5.51 | 0.972 |
| 485 | Schott | N-LASF9 | 1.9009 | 1.8656 | 4.41 | 0.931 |
| 486 | Schott | N-SF57 | 1.9181 | 1.8675 | 3.53 | 0.913 |
| 487 | Schott | SF56A | 1.8439 | 1.8023 | 4.92 | 0.971 |
| 488 | Schott | SF11 | 1.8451 | 1.8025 | 4.74 | 0.911 |
| 489 | Schott | N-LASF31A | 1.9227 | 1.8955 | 5.51 | 0.972 |
| 490 | Schott | N-LASF44 | 1.8355 | 1.8142 | 4.44 | 0.986 |
| 491 | Schott | N-LASF31A | 1.9227 | 1.8955 | 5.51 | 0.972 |
| 492 | Schott | N-LASF9 | 1.9009 | 1.8656 | 4.41 | 0.931 |
| 493 | Schott | SF56A | 1.8439 | 1.8023 | 4.92 | 0.971 |
| 494 | Schott | SF11 | 1.8451 | 1.8025 | 4.74 | 0.911 |
| 495 | Schott | N-LASF31A | 1.9227 | 1.8955 | 5.51 | 0.972 |
| 496 | Hoya | FDS18-W | 1.8878 | 1.8878 | 3.51 | 0.883 |
| 497 | Hoya | FDS18-W | 1.8878 | 1.8878 | 3.51 | 0.883 |
| 498 | Hoya | E-FDS1-W | 1.8720 | 1.8720 | 3.94 | 0.940 |
| 499 | Hoya | FDS18-W | 1.8878 | 1.8878 | 3.51 | 0.883 |
| 500 | NHG | H-ZLaF68L | 1.9247 | 1.8960 | 5.04 | 0.952 |
| 501 | NHG | H-ZLaF67 | 1.9215 | 1.8937 | 5.20 | 0.954 |
| 502 | Hikari | J-LASF08A | 1.9228 | 1.8956 | 5.41 | 0.971 |

TABLE 7a-continued

| | | | | | | |
|---|---|---|---|---|---|---|
| 503 | NHG | H-ZLaF68L | 1.9247 | 1.8960 | 5.04 | 0.952 |
| 504 | Hoya | TAFD30 | 1.8552 | 1.8552 | 5.42 | 0.981 |
| 505 | Hoya | TAFD32 | 1.8429 | 1.8429 | 4.84 | 0.971 |
| 506 | Hoya | FDS18-W | 1.8878 | 1.8878 | 3.51 | 0.883 |
| 507 | Hoya | MP-FDS1 | 1.8704 | 1.8704 | 4.42 | 0.775 |
| 508 | Hoya | TAFD32 | 1.8429 | 1.8429 | 4.84 | 0.971 |
| 509 | Hoya | MP-FDS1 | 1.8704 | 1.8704 | 4.42 | 0.775 |
| 510 | Hoya | TAFD32 | 1.8429 | 1.8429 | 4.84 | 0.971 |
| 511 | NHG | H-ZLaF68L | 1.9247 | 1.8960 | 5.04 | 0.952 |
| 512 | Hoya | FDS18 | 1.8878 | 1.8878 | 3.51 | 0.694 |
| 513 | Hoya | TAFD32 | 1.8429 | 1.8429 | 4.84 | 0.971 |
| 514 | Hoya | M-FDS1 | 1.8704 | 1.8704 | 4.42 | 0.775 |
| 515 | Hoya | MC-TAFD307 | 1.8517 | 1.8517 | 5.49 | 0.962 |
| 516 | Hoya | M-TAFD307 | 1.8517 | 1.8517 | 5.49 | 0.955 |
| 517 | Hoya | TAFD32 | 1.8429 | 1.8429 | 4.84 | 0.971 |
| 518 | NHG | H-ZLaF68A | 1.9228 | 1.8955 | 5.47 | 0.976 |
| 519 | Hoya | FDS18 | 1.8878 | 1.8878 | 3.51 | 0.694 |
| 520 | Schott | N-LASF31A | 1.9227 | 1.8955 | 5.51 | 0.972 |
| 521 | Ohara | S-LAH58 | 1.9227 | 1.8955 | 5.52 | 0.966 |
| 522 | Ohara | S-LAH58 | 1.9227 | 1.8955 | 5.52 | 0.966 |
| 523 | NHG | H-ZLaF68A | 1.9228 | 1.8955 | 5.47 | 0.976 |
| 524 | Hoya | TAFD30 | 1.8552 | 1.8552 | 5.42 | 0.981 |
| 525 | Hikari | J-LASF08A | 1.9228 | 1.8956 | 5.41 | 0.971 |
| 526 | Hoya | TAFD30 | 1.8552 | 1.8552 | 5.42 | 0.981 |
| 527 | Hoya | TAFD30 | 1.8552 | 1.8552 | 5.42 | 0.981 |
| 528 | Hoya | TAFD30 | 1.8552 | 1.8552 | 5.42 | 0.981 |
| 529 | Hoya | TAFD30 | 1.8552 | 1.8552 | 5.42 | 0.981 |
| 530 | Hoya | TAFD33 | 1.8525 | 1.8525 | 5.40 | 0.960 |
| 531 | Ohara | S-LAH58 | 1.9227 | 1.8955 | 5.52 | 0.966 |
| 532 | Hoya | MP-TAFD307 | 1.8517 | 1.8517 | 5.49 | 0.955 |
| 533 | Hoya | M-TAFD307 | 1.8517 | 1.8517 | 5.49 | 0.955 |

| | Glass for G position | | | | | |
|---|---|---|---|---|---|---|
| Ex | glass company: | glass name: | From n(500 nm) | To n(570 nm) | density [g/cm$^3$] | Ti integral (500-570 nm) |
| 462 | Schott | N-LASF9 | 1.8656 | 1.8527 | 4.41 | 0.986 |
| 463 | Schott | N-LASF9 | 1.8656 | 1.8527 | 4.41 | 0.986 |
| 464 | Schott | N-LASF9HT | 1.8656 | 1.8527 | 4.41 | 0.986 |
| 465 | Schott | N-LASF9HT | 1.8656 | 1.8527 | 4.41 | 0.986 |
| 466 | Schott | N-LASF9 | 1.8656 | 1.8527 | 4.41 | 0.986 |
| 467 | Schott | N-LASF9 | 1.8656 | 1.8527 | 4.41 | 0.986 |
| 468 | Schott | N-LASF9HT | 1.8656 | 1.8527 | 4.41 | 0.986 |
| 469 | Schott | N-LASF9 | 1.8656 | 1.8527 | 4.41 | 0.986 |
| 470 | Schott | N-LASF9 | 1.8656 | 1.8527 | 4.41 | 0.986 |
| 471 | Schott | N-LASF9 | 1.8656 | 1.8527 | 4.41 | 0.986 |
| 472 | Schott | N-LASF9 | 1.8656 | 1.8527 | 4.41 | 0.986 |
| 473 | Schott | N-LASF9 | 1.8656 | 1.8527 | 4.41 | 0.986 |
| 474 | Schott | N-LASF31A | 1.8955 | 1.8850 | 5.51 | 0.994 |
| 475 | Schott | N-LASF9 | 1.8656 | 1.8527 | 4.41 | 0.986 |
| 476 | Schott | N-LASF31A | 1.8955 | 1.8850 | 5.51 | 0.994 |
| 477 | Schott | N-LASF31A | 1.8955 | 1.8850 | 5.51 | 0.994 |
| 478 | Schott | N-LASF9HT | 1.8656 | 1.8527 | 4.41 | 0.986 |
| 479 | Schott | N-LASF31A | 1.8955 | 1.8850 | 5.51 | 0.994 |
| 480 | Schott | N-LASF9 | 1.8656 | 1.8527 | 4.41 | 0.986 |
| 481 | Schott | N-LASF9 | 1.8656 | 1.8527 | 4.41 | 0.986 |
| 482 | Schott | N-LASF9 | 1.8656 | 1.8527 | 4.41 | 0.986 |
| 483 | Schott | N-LASF9 | 1.8656 | 1.8527 | 4.41 | 0.986 |
| 484 | Schott | N-LASF9 | 1.8656 | 1.8527 | 4.41 | 0.986 |
| 485 | Schott | N-LASF9HT | 1.8656 | 1.8527 | 4.41 | 0.986 |
| 486 | Schott | N-LASF31A | 1.8955 | 1.8850 | 5.51 | 0.994 |
| 487 | Schott | N-LASF9HT | 1.8656 | 1.8527 | 4.41 | 0.986 |
| 488 | Schott | N-LASF9HT | 1.8656 | 1.8527 | 4.41 | 0.986 |
| 489 | Schott | N-LASF31A | 1.8955 | 1.8850 | 5.51 | 0.994 |
| 490 | Schott | N-LASF31A | 1.8955 | 1.8850 | 5.51 | 0.994 |
| 491 | Schott | N-LASF31A | 1.8955 | 1.8850 | 5.51 | 0.994 |
| 492 | Schott | N-LASF31A | 1.8955 | 1.8850 | 5.51 | 0.994 |
| 493 | Schott | N-LASF31A | 1.8955 | 1.8850 | 5.51 | 0.994 |
| 494 | Schott | N-LASF31A | 1.8955 | 1.8850 | 5.51 | 0.994 |
| 495 | Schott | N-LASF31A | 1.8955 | 1.8850 | 5.51 | 0.994 |
| 496 | Ohara | S-NPH 4 | 1.9185 | 1.8969 | 3.61 | 0.989 |
| 497 | Ohara | S-NPH 4 | 1.9185 | 1.8969 | 3.61 | 0.989 |
| 498 | Ohara | S-NBH56 | 1.8749 | 1.8580 | 3.49 | 0.990 |
| 499 | Hoya | FDS18-W | 1.8878 | 1.8878 | 3.51 | 0.987 |
| 500 | Ohara | S-NPH 4 | 1.9185 | 1.8969 | 3.61 | 0.989 |
| 501 | Ohara | S-NPH 4 | 1.9185 | 1.8969 | 3.61 | 0.989 |
| 502 | Ohara | S-NPH 4 | 1.9185 | 1.8969 | 3.61 | 0.989 |
| 503 | Hoya | FDS18-W | 1.8878 | 1.8878 | 3.51 | 0.987 |
| 504 | Ohara | S-NBH56 | 1.8749 | 1.8580 | 3.49 | 0.990 |

TABLE 7a-continued

| | | | | | | |
|---|---|---|---|---|---|---|
| 505 | Sumita | K-PSFn3 | 1.8597 | 1.8424 | 3.90 | 0.973 |
| 506 | Schott | N-LASF31A | 1.8955 | 1.8850 | 5.51 | 0.994 |
| 507 | Schott | N-LASF9HT | 1.8656 | 1.8527 | 4.41 | 0.986 |
| 508 | Sumita | K-PSFn3 | 1.8597 | 1.8424 | 3.90 | 0.973 |
| 509 | Hoya | MP-FDS1 | 1.8704 | 1.8704 | 4.42 | 0.973 |
| 510 | Sumita | K-PSFn3 | 1.8597 | 1.8424 | 3.90 | 0.973 |
| 511 | Schott | N-LASF31A | 1.8955 | 1.8850 | 5.51 | 0.994 |
| 512 | NHG | H-ZLaF65 | 1.8907 | 1.8768 | 4.55 | 0.979 |
| 513 | Hoya | TAFD32 | 1.8429 | 1.8429 | 4.84 | 0.994 |
| 514 | Sumita | K-GIR79 | 1.8710 | 1.8583 | 5.14 | 0.992 |
| 515 | Schott | N-LASF9 | 1.8656 | 1.8527 | 4.41 | 0.986 |
| 516 | Schott | N-LASF9 | 1.8656 | 1.8527 | 4.41 | 0.986 |
| 517 | Hoya | TAFD32 | 1.8429 | 1.8429 | 4.84 | 0.994 |
| 518 | Sumita | K-VC91 | 1.9013 | 1.8890 | 4.87 | 0.996 |
| 519 | Schott | N-LASF31A | 1.8955 | 1.8850 | 5.51 | 0.994 |
| 520 | Sumita | K-VC91 | 1.9013 | 1.8890 | 4.87 | 0.996 |
| 521 | Sumita | K-VC91 | 1.9013 | 1.8890 | 4.87 | 0.996 |
| 522 | Schott | N-LASF31A | 1.8955 | 1.8850 | 5.51 | 0.994 |
| 523 | Sumita | K-VC91 | 1.9013 | 1.8890 | 4.87 | 0.996 |
| 524 | Schott | N-LASF9 | 1.8656 | 1.8527 | 4.41 | 0.986 |
| 525 | Sumita | K-LaSFn17 | 1.8955 | 1.8850 | 5.54 | 0.991 |
| 526 | Hikari | J-LASFH22 | 1.8597 | 1.8503 | 5.08 | 0.986 |
| 527 | Hikari | J-LASFH22 | 1.8597 | 1.8503 | 5.08 | 0.986 |
| 528 | Hikari | J-LASFH22 | 1.8597 | 1.8503 | 5.08 | 0.986 |
| 529 | Sumita | K-VC99 | 1.8624 | 1.8525 | 5.15 | 0.998 |
| 530 | Hikari | J-LASFH22 | 1.8597 | 1.8503 | 5.08 | 0.986 |
| 531 | Sumita | K-LaSFn17 | 1.8955 | 1.8850 | 5.54 | 0.991 |
| 532 | Hikari | J-LASFH22 | 1.8597 | 1.8503 | 5.08 | 0.986 |
| 533 | Hoya | MC-TAFD307 | 1.8517 | 1.8517 | 5.49 | 0.991 |

TABLE 7b

| | Glass for R position | | | | | | totals | | |
|---|---|---|---|---|---|---|---|---|---|
| Ex | glass company: | glass name: | From n(610 nm) | To n(760 nm) | density [g/cm³] | Ti integral (610-760 nm) | average density | T = $(T_{red} \cdot T_{blue} \cdot T_{green})^{1/3}$ | FoM $(T_{red} \cdot T_{blue} \cdot T_{green})^{1/3}$/ average density |
| 462 | Schott | N-SF66 | 1.9183 | 1.8980 | 4.00 | 0.988 | 3.98 | 0.972 | 0.244 |
| 463 | Schott | N-SF66 | 1.9183 | 1.8980 | 4.00 | 0.988 | 3.98 | 0.962 | 0.242 |
| 464 | Schott | N-SF66 | 1.9183 | 1.8980 | 4.00 | 0.988 | 3.98 | 0.962 | 0.242 |
| 465 | Schott | N-LASF46A | 1.9006 | 1.8867 | 4.45 | 0.995 | 4.13 | 0.974 | 0.236 |
| 466 | Schott | N-LASF46B | 1.9006 | 1.8867 | 4.51 | 0.994 | 4.15 | 0.974 | 0.235 |
| 467 | Schott | N-LASF46A | 1.9006 | 1.8867 | 4.45 | 0.995 | 4.13 | 0.964 | 0.233 |
| 468 | Schott | N-LASF46B | 1.9006 | 1.8867 | 4.51 | 0.994 | 4.15 | 0.964 | 0.232 |
| 469 | Schott | N-SF66 | 1.9183 | 1.8980 | 4.00 | 0.988 | 4.27 | 0.971 | 0.227 |
| 470 | Schott | N-SF66 | 1.9183 | 1.8980 | 4.00 | 0.988 | 4.27 | 0.968 | 0.227 |
| 471 | Schott | N-LASF31A | 1.8807 | 1.8699 | 5.51 | 0.997 | 4.38 | 0.975 | 0.222 |
| 472 | Schott | N-LASF46B | 1.9006 | 1.8867 | 4.51 | 0.994 | 4.44 | 0.973 | 0.219 |
| 473 | Schott | N-LASF31A | 1.8807 | 1.8699 | 5.51 | 0.997 | 4.48 | 0.974 | 0.217 |
| 474 | Schott | N-LASF46A | 1.9006 | 1.8867 | 4.45 | 0.995 | 4.50 | 0.977 | 0.217 |
| 475 | Schott | N-LASF31A | 1.8807 | 1.8699 | 5.51 | 0.997 | 4.52 | 0.980 | 0.217 |
| 476 | Schott | N-LASF46B | 1.9006 | 1.8867 | 4.51 | 0.994 | 4.52 | 0.976 | 0.216 |
| 477 | Schott | N-LASF46A | 1.9006 | 1.8867 | 4.45 | 0.995 | 4.50 | 0.971 | 0.216 |
| 478 | Schott | N-LASF31A | 1.8807 | 1.8699 | 5.51 | 0.997 | 4.48 | 0.964 | 0.215 |
| 479 | Schott | N-LASF46A | 1.9006 | 1.8867 | 4.45 | 0.995 | 4.50 | 0.967 | 0.215 |
| 480 | Schott | N-SF66 | 1.9183 | 1.8980 | 4.00 | 0.988 | 4.64 | 0.982 | 0.212 |
| 481 | Schott | N-LASF31A | 1.8807 | 1.8699 | 5.51 | 0.997 | 4.79 | 0.989 | 0.207 |
| 482 | Schott | N-LASF46A | 1.9006 | 1.8867 | 4.45 | 0.995 | 4.79 | 0.984 | 0.205 |
| 483 | Schott | N-LASF46A | 1.9006 | 1.8867 | 4.45 | 0.995 | 4.79 | 0.984 | 0.205 |
| 484 | Schott | N-LASF46B | 1.9006 | 1.8867 | 4.51 | 0.994 | 4.81 | 0.984 | 0.205 |
| 485 | Schott | N-LASF31A | 1.8807 | 1.8699 | 5.51 | 0.997 | 4.78 | 0.971 | 0.203 |
| 486 | Schott | N-LASF31A | 1.8807 | 1.8699 | 5.51 | 0.997 | 4.85 | 0.967 | 0.199 |
| 487 | Schott | N-LASF31A | 1.8807 | 1.8699 | 5.51 | 0.997 | 4.95 | 0.984 | 0.199 |
| 488 | Schott | N-LASF31A | 1.8807 | 1.8699 | 5.51 | 0.997 | 4.89 | 0.964 | 0.197 |
| 489 | Schott | N-SF66 | 1.9183 | 1.8980 | 4.00 | 0.988 | 5.01 | 0.985 | 0.197 |
| 490 | Schott | N-LASF31A | 1.8807 | 1.8699 | 5.51 | 0.997 | 5.15 | 0.992 | 0.193 |
| 491 | Schott | N-LASF46A | 1.9006 | 1.8867 | 4.45 | 0.995 | 5.16 | 0.987 | 0.191 |
| 492 | Schott | N-LASF31A | 1.8807 | 1.8699 | 5.51 | 0.997 | 5.14 | 0.974 | 0.189 |
| 493 | Schott | N-LASF31A | 1.8807 | 1.8699 | 5.51 | 0.997 | 5.31 | 0.987 | 0.186 |
| 494 | Schott | N-LASF31A | 1.8807 | 1.8699 | 5.51 | 0.997 | 5.25 | 0.966 | 0.184 |
| 495 | Schott | N-LASF31A | 1.8807 | 1.8699 | 5.51 | 0.997 | 5.51 | 0.988 | 0.179 |
| 496 | Hoya | FDS18-W | 1.8878 | 1.8878 | 3.51 | 0.997 | 3.54 | 0.956 | 0.270 |
| 497 | NHG | H-ZF72B | 1.9178 | 1.8956 | 3.57 | 0.994 | 3.56 | 0.955 | 0.268 |
| 498 | Hoya | FDS24 | 1.8742 | 1.8742 | 3.84 | 0.991 | 3.76 | 0.974 | 0.259 |
| 499 | Schott | N-LASF46A | 1.9006 | 1.8867 | 4.45 | 0.995 | 3.82 | 0.955 | 0.250 |

TABLE 7b-continued

| | | Glass for R position | | | | totals | | |
| | | | | | | | T = | FoM |
| Ex | glass company: | glass name: | From n(610 nm) | To n(760 nm) | density [g/cm³] | Ti integral (610-760 nm) | average density | $(T_{red} \cdot T_{blue} \cdot T_{green})^{1/3}$ | $(T_{red} \cdot T_{blue} \cdot T_{green})^{1/3}$/ average density |
|---|---|---|---|---|---|---|---|---|---|
| 500 | Ohara | S-NPH 2 | 1.9178 | 1.8956 | 3.58 | 0.992 | 4.08 | 0.978 | 0.240 |
| 501 | NHG | H-ZF72B | 1.9178 | 1.8956 | 3.57 | 0.994 | 4.13 | 0.979 | 0.237 |
| 502 | Ohara | S-NPH 2 | 1.9178 | 1.8956 | 3.58 | 0.992 | 4.20 | 0.984 | 0.234 |
| 503 | Hikari | J-LASFH13 | 1.9006 | 1.8867 | 4.66 | 0.985 | 4.40 | 0.975 | 0.221 |
| 504 | Hoya | TAFD25 | 1.8683 | 1.8683 | 4.51 | 0.995 | 4.47 | 0.989 | 0.221 |
| 505 | NHG | H-ZLaF3 | 1.8529 | 1.8415 | 4.59 | 0.996 | 4.44 | 0.980 | 0.221 |
| 506 | Schott | N-SF66 | 1.9183 | 1.8980 | 4.00 | 0.988 | 4.34 | 0.955 | 0.220 |
| 507 | Hoya | FDS24 | 1.8742 | 1.8742 | 3.84 | 0.991 | 4.22 | 0.917 | 0.217 |
| 508 | Hoya | TAFD32 | 1.8429 | 1.8429 | 4.84 | 0.998 | 4.53 | 0.981 | 0.217 |
| 509 | Hoya | FDS24 | 1.8742 | 1.8742 | 3.84 | 0.991 | 4.23 | 0.913 | 0.216 |
| 510 | Sumita | K-VC185 | 1.8515 | 1.8410 | 5.00 | 0.998 | 4.58 | 0.981 | 0.214 |
| 511 | Hoya | FDS18-W | 1.8878 | 1.8878 | 3.51 | 0.997 | 4.69 | 0.981 | 0.209 |
| 512 | Hikari | J-LASFH13HS | 1.9006 | 1.8867 | 4.66 | 0.981 | 4.24 | 0.885 | 0.209 |
| 513 | NHG | H-ZLaF3 | 1.8529 | 1.8415 | 4.59 | 0.996 | 4.76 | 0.987 | 0.207 |
| 514 | Hoya | E-FDS1-W | 1.8720 | 1.8720 | 3.94 | 0.998 | 4.50 | 0.922 | 0.205 |
| 515 | NHG | H-ZLaF65 | 1.8710 | 1.8574 | 4.55 | 0.994 | 4.82 | 0.980 | 0.204 |
| 516 | NHG | H-ZLaF65 | 1.8710 | 1.8574 | 4.55 | 0.994 | 4.82 | 0.978 | 0.203 |
| 517 | Sumita | K-GIR79 | 1.8531 | 1.8407 | 5.14 | 0.997 | 4.94 | 0.987 | 0.200 |
| 518 | Schott | N-LASF46B | 1.9006 | 1.8867 | 4.51 | 0.994 | 4.95 | 0.989 | 0.200 |
| 519 | Schott | N-LASF46A | 1.9006 | 1.8867 | 4.45 | 0.995 | 4.49 | 0.895 | 0.199 |
| 520 | Schott | N-LASF46B | 1.9006 | 1.8867 | 4.51 | 0.994 | 4.96 | 0.988 | 0.199 |
| 521 | Schott | N-LASF46B | 1.9006 | 1.8867 | 4.51 | 0.994 | 4.97 | 0.985 | 0.198 |
| 522 | Schott | N-SF66 | 1.9183 | 1.8980 | 4.00 | 0.988 | 5.01 | 0.983 | 0.196 |
| 523 | Ohara | S-LAH93 | 1.9025 | 1.8899 | 4.83 | 0.999 | 5.06 | 0.990 | 0.196 |
| 524 | Hoya | M-TAFD307 | 1.8517 | 1.8517 | 5.49 | 0.999 | 5.11 | 0.989 | 0.194 |
| 525 | Schott | N-LASF46A | 1.9006 | 1.8867 | 4.45 | 0.995 | 5.13 | 0.985 | 0.192 |
| 526 | Hoya | TAFD33 | 1.8525 | 1.8525 | 5.40 | 0.997 | 5.30 | 0.988 | 0.186 |
| 527 | Hoya | TAFD30 | 1.8552 | 1.8552 | 5.42 | 0.999 | 5.31 | 0.988 | 0.186 |
| 528 | Hoya | M-TAFD307 | 1.8517 | 1.8517 | 5.49 | 0.999 | 5.33 | 0.989 | 0.185 |
| 529 | Hoya | M-TAFD307 | 1.8517 | 1.8517 | 5.49 | 0.999 | 5.35 | 0.993 | 0.185 |
| 530 | Hoya | TAFD33 | 1.8525 | 1.8525 | 5.40 | 0.997 | 5.29 | 0.981 | 0.185 |
| 531 | NHG | H-ZLaF78 | 1.8981 | 1.8862 | 5.05 | 0.996 | 5.37 | 0.984 | 0.183 |
| 532 | Hoya | MC-TAFD307 | 1.8517 | 1.8517 | 5.49 | 0.995 | 5.35 | 0.979 | 0.183 |
| 533 | Hoya | TAFD33 | 1.8525 | 1.8525 | 5.40 | 0.997 | 5.46 | 0.981 | 0.180 |

TABLE 8a

| | | Glass for B position | | | |
|---|---|---|---|---|---|
| Ex | glass company: | glass name: | From n(400 nm) | To n(500 nm) | density [g/cm³] | Ti integral (400-500 nm) |
| 534 | Schott | N-SF57HTultra | 1.9181 | 1.8675 | 3.53 | 0.941 |
| 535 | Schott | N-SF57 | 1.9181 | 1.8675 | 3.53 | 0.913 |
| 536 | Schott | N-SF57HTultra | 1.9181 | 1.8675 | 3.53 | 0.941 |
| 537 | Schott | N-SF57HTultra | 1.9181 | 1.8675 | 3.53 | 0.941 |
| 538 | Schott | N-SF57HT | 1.9181 | 1.8675 | 3.53 | 0.926 |
| 539 | Schott | N-LASF46A | 1.9591 | 1.9204 | 4.45 | 0.936 |
| 540 | Schott | N-SF57 | 1.9181 | 1.8675 | 3.53 | 0.913 |
| 541 | Schott | N-SF66 | 2.0140 | 1.9487 | 4.00 | 0.825 |
| 542 | Schott | N-LASF9HT | 1.9009 | 1.8656 | 4.41 | 0.940 |
| 543 | Schott | N-LASF9 | 1.9009 | 1.8656 | 4.41 | 0.931 |
| 544 | Schott | N-LASF9 | 1.9009 | 1.8656 | 4.41 | 0.931 |
| 545 | Schott | N-LASF46A | 1.9591 | 1.9204 | 4.45 | 0.936 |
| 546 | Schott | N-LASF9HT | 1.9009 | 1.8656 | 4.41 | 0.940 |
| 547 | Schott | N-SF66 | 2.0140 | 1.9487 | 4.00 | 0.825 |
| 548 | Schott | N-LASF31A | 1.9227 | 1.8955 | 5.51 | 0.972 |
| 549 | Schott | N-LASF46B | 1.9592 | 1.9204 | 4.51 | 0.932 |
| 550 | Schott | N-LASF31A | 1.9227 | 1.8955 | 5.51 | 0.972 |
| 551 | Schott | N-LASF31A | 1.9227 | 1.8955 | 5.51 | 0.972 |
| 552 | Schott | N-LASF31A | 1.9227 | 1.8955 | 5.51 | 0.972 |
| 553 | Schott | N-LASF31A | 1.9227 | 1.8955 | 5.51 | 0.972 |
| 554 | Schott | N-LASF46A | 1.9591 | 1.9204 | 4.45 | 0.936 |
| 555 | Schott | N-LASF46B | 1.9592 | 1.9204 | 4.51 | 0.932 |
| 556 | Schott | N-LASF31A | 1.9227 | 1.8955 | 5.51 | 0.972 |
| 557 | Schott | N-LASF31A | 1.9227 | 1.8955 | 5.51 | 0.972 |
| 558 | Schott | N-LASF31A | 1.9227 | 1.8955 | 5.51 | 0.972 |
| 559 | Schott | N-LASF31A | 1.9227 | 1.8955 | 5.51 | 0.972 |
| 560 | Schott | N-LASF31A | 1.9227 | 1.8955 | 5.51 | 0.972 |
| 561 | Schott | N-LASF31A | 1.9227 | 1.8955 | 5.51 | 0.972 |

TABLE 8a-continued

| | | | | | | |
|---|---|---|---|---|---|---|
| 562 | Schott | N-LASF46A | 1.9591 | 1.9204 | 4.45 | 0.936 |
| 563 | Schott | N-SF66 | 2.0140 | 1.9487 | 4.00 | 0.825 |
| 564 | Schott | N-LASF46B | 1.9592 | 1.9204 | 4.51 | 0.932 |
| 565 | Schott | N-SF66 | 2.0140 | 1.9487 | 4.00 | 0.825 |
| 566 | Ohara | S-NPH 4 | 1.9833 | 1.9185 | 3.61 | 0.931 |
| 567 | Hoya | FDS16-W | 1.9211 | 1.9211 | 3.54 | 0.768 |
| 568 | Schott | N-LASF46A | 1.9591 | 1.9204 | 4.45 | 0.936 |
| 569 | Schott | N-LASF46A | 1.9591 | 1.9204 | 4.45 | 0.936 |
| 570 | Schott | N-LASF46A | 1.9591 | 1.9204 | 4.45 | 0.936 |
| 571 | Schott | N-LASF46B | 1.9592 | 1.9204 | 4.51 | 0.932 |
| 572 | Hoya | FDS16-W | 1.9211 | 1.9211 | 3.54 | 0.768 |
| 573 | Sumita | K-LaSFn23 | 1.9598 | 1.9260 | 4.90 | 0.980 |
| 574 | Ohara | S-LAH88 | 1.9719 | 1.9334 | 4.74 | 0.956 |
| 575 | Schott | N-LASF31A | 1.9227 | 1.8955 | 5.51 | 0.972 |
| 576 | Schott | N-LASF46A | 1.9591 | 1.9204 | 4.45 | 0.936 |
| 577 | NHG | H-ZLaF68L | 1.9247 | 1.8960 | 5.04 | 0.952 |
| 578 | Sumita | K-LaSFn17 | 1.9227 | 1.8955 | 5.54 | 0.974 |
| 579 | Ohara | S-LAH58 | 1.9227 | 1.8955 | 5.52 | 0.966 |
| 580 | Hikari | J-LASF08A | 1.9228 | 1.8956 | 5.41 | 0.971 |
| 581 | Hikari | J-LASF08A | 1.9228 | 1.8956 | 5.41 | 0.971 |
| 582 | Sumita | K-LaSFn23 | 1.9598 | 1.9260 | 4.90 | 0.980 |
| 583 | Schott | N-LASF46A | 1.9591 | 1.9204 | 4.45 | 0.936 |
| 584 | Schott | N-LASF46B | 1.9592 | 1.9204 | 4.51 | 0.932 |
| 585 | Sumita | K-LaSFn23 | 1.9598 | 1.9260 | 4.90 | 0.980 |
| 586 | NHG | H-ZLaF72 | 1.9595 | 1.9258 | 4.88 | 0.929 |
| 587 | NHG | H-ZLaF72 | 1.9595 | 1.9258 | 4.88 | 0.929 |
| 588 | Schott | N-LASF46B | 1.9592 | 1.9204 | 4.51 | 0.932 |
| 589 | Sumita | K-LaSFn22 | 1.9481 | 1.9133 | 4.92 | 0.977 |
| 590 | Sumita | K-LaSFn23 | 1.9598 | 1.9260 | 4.90 | 0.980 |
| 591 | Hoya | MP-FDS2 | 1.9421 | 1.9421 | 5.09 | 0.620 |
| 592 | Sumita | K-LaSFn23 | 1.9598 | 1.9260 | 4.90 | 0.980 |
| 593 | Sumita | K-LaSFn23 | 1.9598 | 1.9260 | 4.90 | 0.980 |
| 594 | Sumita | K-LaSFn23 | 1.9598 | 1.9260 | 4.90 | 0.980 |
| 595 | NHG | H-ZLaF68A | 1.9228 | 1.8955 | 5.47 | 0.976 |
| 596 | Sumita | K-LaSFn17 | 1.9227 | 1.8955 | 5.54 | 0.974 |
| 597 | Sumita | K-LaSFn17 | 1.9227 | 1.8955 | 5.54 | 0.974 |
| 598 | Hoya | E-FDS2 | 1.9410 | 1.9409 | 5.08 | 0.707 |
| 599 | Hoya | MC-FDS2 | 1.9421 | 1.9421 | 5.09 | 0.707 |
| 600 | Ohara | S-LAH58 | 1.9227 | 1.8955 | 5.52 | 0.966 |
| 601 | Hoya | M-FDS2 | 1.9421 | 1.9421 | 5.09 | 0.620 |
| 602 | Hoya | E-FDS2 | 1.9410 | 1.9409 | 5.08 | 0.707 |
| 603 | Hoya | MP-FDS2 | 1.9421 | 1.9421 | 5.09 | 0.620 |
| 604 | Hoya | MP-TAFD405 | 1.9116 | 1.9116 | 5.45 | 0.882 |
| 605 | Hoya | M-FDS2 | 1.9421 | 1.9421 | 5.09 | 0.620 |
| 606 | Hoya | MP-FDS2 | 1.9421 | 1.9421 | 5.09 | 0.620 |
| 607 | Hoya | MP-FDS2 | 1.9421 | 1.9421 | 5.09 | 0.620 |

| | | Glass for G position | | | | |
|---|---|---|---|---|---|---|
| Ex | glass company: | glass name: | From n(500 nm) | To n(570 nm) | density [g/cm³] | Ti integral (500-570 nm) |
| 534 | Schott | N-SF66 | 1.9487 | 1.9269 | 4.00 | 0.953 |
| 535 | Schott | N-SF66 | 1.9487 | 1.9269 | 4.00 | 0.953 |
| 536 | Schott | N-SF66 | 1.9487 | 1.9269 | 4.00 | 0.953 |
| 537 | Schott | N-SF66 | 1.9487 | 1.9269 | 4.00 | 0.953 |
| 538 | Schott | N-LASF46A | 1.9204 | 1.9063 | 4.45 | 0.988 |
| 539 | Schott | N-SF66 | 1.9487 | 1.9269 | 4.00 | 0.953 |
| 540 | Schott | N-LASF46B | 1.9204 | 1.9063 | 4.51 | 0.985 |
| 541 | Schott | N-SF66 | 1.9487 | 1.9269 | 4.00 | 0.953 |
| 542 | Schott | N-LASF46A | 1.9204 | 1.9063 | 4.45 | 0.988 |
| 543 | Schott | N-SF66 | 1.9487 | 1.9269 | 4.00 | 0.953 |
| 544 | Schott | N-LASF46A | 1.9204 | 1.9063 | 4.45 | 0.988 |
| 545 | Schott | N-LASF46A | 1.9204 | 1.9063 | 4.45 | 0.988 |
| 546 | Schott | N-LASF46A | 1.9204 | 1.9063 | 4.45 | 0.988 |
| 547 | Schott | N-LASF46A | 1.9204 | 1.9063 | 4.45 | 0.988 |
| 548 | Schott | N-SF66 | 1.9487 | 1.9269 | 4.00 | 0.953 |
| 549 | Schott | N-LASF46B | 1.9204 | 1.9063 | 4.51 | 0.985 |
| 550 | Schott | N-LASF46A | 1.9204 | 1.9063 | 4.45 | 0.988 |
| 551 | Schott | N-LASF46A | 1.9204 | 1.9063 | 4.45 | 0.988 |
| 552 | Schott | N-LASF46B | 1.9204 | 1.9063 | 4.51 | 0.985 |
| 553 | Schott | N-LASF46B | 1.9204 | 1.9063 | 4.51 | 0.985 |
| 554 | Schott | N-SF66 | 1.9487 | 1.9269 | 4.00 | 0.953 |
| 555 | Schott | N-SF66 | 1.9487 | 1.9269 | 4.00 | 0.953 |
| 556 | Schott | N-LASF46A | 1.9204 | 1.9063 | 4.45 | 0.988 |
| 557 | Schott | N-LASF46A | 1.9204 | 1.9063 | 4.45 | 0.988 |
| 558 | Schott | N-LASF46A | 1.9204 | 1.9063 | 4.45 | 0.988 |
| 559 | Schott | N-LASF46B | 1.9204 | 1.9063 | 4.51 | 0.985 |
| 560 | Schott | N-LASF46B | 1.9204 | 1.9063 | 4.51 | 0.985 |
| 561 | Schott | N-LASF46B | 1.9204 | 1.9063 | 4.51 | 0.985 |

TABLE 8a-continued

| | | | | | | |
|---|---|---|---|---|---|---|
| 562 | Schott | N-LASF46A | 1.9204 | 1.9063 | 4.45 | 0.988 |
| 563 | Schott | N-LASF46B | 1.9204 | 1.9063 | 4.51 | 0.985 |
| 564 | Schott | LASF35 | 2.0425 | 2.0253 | 5.41 | 0.968 |
| 565 | Schott | LASF35 | 2.0425 | 2.0253 | 5.41 | 0.968 |
| 566 | NHG | H-ZF72B | 1.9515 | 1.9273 | 3.57 | 0.972 |
| 567 | Ohara | S-NPH 2 | 1.9515 | 1.9273 | 3.58 | 0.970 |
| 568 | Hoya | FDS16-W | 1.9211 | 1.9211 | 3.54 | 0.977 |
| 569 | Schott | N-SF66 | 1.9487 | 1.9269 | 4.00 | 0.953 |
| 570 | Schott | N-SF66 | 1.9487 | 1.9269 | 4.00 | 0.953 |
| 571 | Schott | N-SF66 | 1.9487 | 1.9269 | 4.00 | 0.953 |
| 572 | Schott | N-LASF46A | 1.9204 | 1.9063 | 4.45 | 0.988 |
| 573 | NHG | H-ZF62 | 1.9487 | 1.9269 | 3.93 | 0.971 |
| 574 | Schott | N-SF66 | 1.9487 | 1.9269 | 4.00 | 0.953 |
| 575 | Hoya | FDS16-W | 1.9211 | 1.9211 | 3.54 | 0.977 |
| 576 | Schott | N-LASF46B | 1.9204 | 1.9063 | 4.51 | 0.985 |
| 577 | Hikari | J-LASFH24 | 1.9228 | 1.9053 | 4.10 | 0.979 |
| 578 | Schott | N-LASF46A | 1.9204 | 1.9063 | 4.45 | 0.988 |
| 579 | Schott | N-LASF46A | 1.9204 | 1.9063 | 4.45 | 0.988 |
| 580 | Ohara | S-LAH95 | 1.9204 | 1.9063 | 4.64 | 0.988 |
| 581 | Ohara | S-LAH93 | 1.9203 | 1.9077 | 4.83 | 0.992 |
| 582 | NHG | H-ZF62 | 1.9487 | 1.9269 | 3.93 | 0.971 |
| 583 | Schott | N-LASF46A | 1.9204 | 1.9063 | 4.45 | 0.988 |
| 584 | Schott | N-LASF46A | 1.9204 | 1.9063 | 4.45 | 0.988 |
| 585 | Hoya | MP-FDS2 | 1.9421 | 1.9421 | 5.09 | 0.951 |
| 586 | Schott | N-SF66 | 1.9487 | 1.9269 | 4.00 | 0.953 |
| 587 | Schott | N-SF66 | 1.9487 | 1.9269 | 4.00 | 0.953 |
| 588 | Schott | N-LASF46B | 1.9204 | 1.9063 | 4.51 | 0.985 |
| 589 | Sumita | K-LaSFn23 | 1.9260 | 1.9134 | 4.90 | 0.997 |
| 590 | Sumita | K-LaSFn23 | 1.9260 | 1.9134 | 4.90 | 0.997 |
| 591 | Sumita | K-PSFn1 | 1.9319 | 1.9108 | 4.15 | 0.925 |
| 592 | Hoya | E-FDS2 | 1.9409 | 1.9409 | 5.08 | 0.974 |
| 593 | Hoya | M-FDS2 | 1.9421 | 1.9421 | 5.09 | 0.951 |
| 594 | Hoya | M-FDS2 | 1.9421 | 1.9421 | 5.09 | 0.951 |
| 595 | Sumita | K-LaSFn22 | 1.9133 | 1.9005 | 4.92 | 0.996 |
| 596 | Ohara | S-LAH93 | 1.9203 | 1.9077 | 4.83 | 0.992 |
| 597 | Sumita | K-LaSFn22 | 1.9133 | 1.9005 | 4.92 | 0.996 |
| 598 | Hoya | E-FDS2 | 1.9409 | 1.9409 | 5.08 | 0.974 |
| 599 | Hoya | MP-FDS2 | 1.9421 | 1.9421 | 5.09 | 0.951 |
| 600 | NHG | H-ZLaF78 | 1.9148 | 1.9030 | 5.05 | 0.988 |
| 601 | Hoya | E-FDS2 | 1.9409 | 1.9409 | 5.08 | 0.974 |
| 602 | Hoya | E-FDS2 | 1.9409 | 1.9409 | 5.08 | 0.974 |
| 603 | Hoya | MP-FDS2 | 1.9421 | 1.9421 | 5.09 | 0.951 |
| 604 | Hoya | MP-TAFD405 | 1.9116 | 1.9116 | 5.45 | 0.981 |
| 605 | NHG | H-ZLaF78 | 1.9148 | 1.9030 | 5.05 | 0.988 |
| 606 | Hoya | M-TAFD405 | 1.9116 | 1.9116 | 5.45 | 0.981 |
| 607 | Hoya | MP-TAFD405 | 1.9116 | 1.9116 | 5.45 | 0.981 |

TABLE 8b

| | | Glass for R position | | | | totals | | |
|---|---|---|---|---|---|---|---|---|
| Ex | glass company: | glass name: | From n(610 nm) | To n(760 nm) | density [g/cm$^3$] | Ti integral (610-760 nm) | average density | T = $(T_{red} \cdot T_{blue} \cdot T_{green})^{1/3}$ | FoM $(T_{red} \cdot T_{blue} \cdot T_{green})^{1/3}$/ average density |
| 534 | Schott | N-SF66 | 1.9183 | 1.8980 | 4.00 | 0.988 | 3.84 | 0.961 | 0.250 |
| 535 | Schott | N-SF66 | 1.9183 | 1.8980 | 4.00 | 0.988 | 3.84 | 0.951 | 0.248 |
| 536 | Schott | N-LASF46A | 1.9006 | 1.8867 | 4.45 | 0.995 | 3.99 | 0.963 | 0.241 |
| 537 | Schott | N-LASF46B | 1.9006 | 1.8867 | 4.51 | 0.994 | 4.01 | 0.963 | 0.240 |
| 538 | Schott | N-LASF46B | 1.9006 | 1.8867 | 4.51 | 0.994 | 4.16 | 0.969 | 0.233 |
| 539 | Schott | N-SF66 | 1.9183 | 1.8980 | 4.00 | 0.988 | 4.15 | 0.959 | 0.231 |
| 540 | Schott | N-LASF46B | 1.9006 | 1.8867 | 4.51 | 0.994 | 4.18 | 0.964 | 0.230 |
| 541 | Schott | N-SF66 | 1.9183 | 1.8980 | 4.00 | 0.988 | 4.00 | 0.919 | 0.230 |
| 542 | Schott | N-SF66 | 1.9183 | 1.8980 | 4.00 | 0.988 | 4.29 | 0.972 | 0.227 |
| 543 | Schott | N-LASF46B | 1.9006 | 1.8867 | 4.51 | 0.994 | 4.31 | 0.959 | 0.223 |
| 544 | Schott | N-LASF46A | 1.9006 | 1.8867 | 4.45 | 0.995 | 4.44 | 0.971 | 0.219 |
| 545 | Schott | N-LASF46A | 1.9006 | 1.8867 | 4.45 | 0.995 | 4.45 | 0.972 | 0.219 |
| 546 | Schott | N-LASF46B | 1.9006 | 1.8867 | 4.51 | 0.994 | 4.46 | 0.974 | 0.218 |
| 547 | Schott | N-LASF46A | 1.9006 | 1.8867 | 4.45 | 0.995 | 4.30 | 0.932 | 0.217 |
| 548 | Schott | N-SF66 | 1.9183 | 1.8980 | 4.00 | 0.988 | 4.50 | 0.971 | 0.216 |
| 549 | Schott | N-LASF46B | 1.9006 | 1.8867 | 4.51 | 0.994 | 4.51 | 0.970 | 0.215 |
| 550 | Schott | N-SF66 | 1.9183 | 1.8980 | 4.00 | 0.988 | 4.65 | 0.983 | 0.211 |
| 551 | Schott | N-SF66 | 1.9183 | 1.8980 | 4.00 | 0.988 | 4.65 | 0.983 | 0.211 |
| 552 | Schott | N-SF66 | 1.9183 | 1.8980 | 4.00 | 0.988 | 4.67 | 0.982 | 0.210 |
| 553 | Schott | N-SF66 | 1.9183 | 1.8980 | 4.00 | 0.988 | 4.67 | 0.982 | 0.210 |
| 554 | Schott | LASF35 | 2.0183 | 2.0015 | 5.41 | 0.991 | 4.62 | 0.960 | 0.208 |

TABLE 8b-continued

| | | Glass for R position | | | | | totals | |
| | | | | | | | T = | FoM |
| Ex | glass company: | glass name: | From n(610 nm) | To n(760 nm) | density [g/cm$^3$] | Ti integral (610-760 nm) | average density | $(T_{red} \cdot T_{blue} \cdot T_{green})^{1/3}$ | $(T_{red} \cdot T_{blue} \cdot T_{green})^{1/3}$/ average density |
|---|---|---|---|---|---|---|---|---|---|
| 555 | Schott | N-LASF31A | 1.8807 | 1.8699 | 5.51 | 0.997 | 4.67 | 0.960 | 0.206 |
| 556 | Schott | N-LASF46A | 1.9006 | 1.8867 | 4.45 | 0.995 | 4.80 | 0.985 | 0.205 |
| 557 | Schott | N-LASF46A | 1.9006 | 1.8867 | 4.45 | 0.995 | 4.80 | 0.985 | 0.205 |
| 558 | Schott | N-LASF46B | 1.9006 | 1.8867 | 4.51 | 0.994 | 4.82 | 0.985 | 0.204 |
| 559 | Schott | N-LASF46A | 1.9006 | 1.8867 | 4.45 | 0.995 | 4.82 | 0.984 | 0.204 |
| 560 | Schott | N-LASF46B | 1.9006 | 1.8867 | 4.51 | 0.994 | 4.84 | 0.984 | 0.203 |
| 561 | Schott | N-LASF46B | 1.9006 | 1.8867 | 4.51 | 0.994 | 4.84 | 0.984 | 0.203 |
| 562 | Schott | N-LASF31A | 1.8807 | 1.8699 | 5.51 | 0.997 | 4.80 | 0.973 | 0.203 |
| 563 | Schott | LASF35 | 2.0183 | 2.0015 | 5.41 | 0.991 | 4.64 | 0.930 | 0.201 |
| 564 | Schott | N-LASF31A | 1.8807 | 1.8699 | 5.51 | 0.997 | 5.14 | 0.965 | 0.188 |
| 565 | Schott | N-LASF31A | 1.8807 | 1.8699 | 5.51 | 0.997 | 4.97 | 0.927 | 0.186 |
| 566 | Hoya | FDS16-W | 1.9211 | 1.9211 | 3.54 | 0.995 | 3.57 | 0.966 | 0.270 |
| 567 | NHG | H-ZF75A | 1.9405 | 1.9167 | 3.53 | 0.989 | 3.55 | 0.909 | 0.256 |
| 568 | NHG | H-ZF75A | 1.9405 | 1.9167 | 3.53 | 0.989 | 3.84 | 0.967 | 0.252 |
| 569 | Hoya | FDS16-W | 1.9211 | 1.9211 | 3.54 | 0.995 | 4.00 | 0.961 | 0.241 |
| 570 | NHG | H-ZF75A | 1.9405 | 1.9167 | 3.53 | 0.989 | 3.99 | 0.959 | 0.240 |
| 571 | NHG | H-ZF75A | 1.9405 | 1.9167 | 3.53 | 0.989 | 4.01 | 0.958 | 0.239 |
| 572 | Hoya | FDS16-W | 1.9211 | 1.9211 | 3.54 | 0.995 | 3.84 | 0.917 | 0.239 |
| 573 | Ohara | S-NPH 3 | 1.9534 | 1.9287 | 3.59 | 0.998 | 4.14 | 0.983 | 0.237 |
| 574 | Ohara | S-NPH 3 | 1.9534 | 1.9287 | 3.59 | 0.998 | 4.11 | 0.969 | 0.236 |
| 575 | Hoya | FDS16-W | 1.9211 | 1.9211 | 3.54 | 0.995 | 4.20 | 0.981 | 0.234 |
| 576 | NHG | H-ZF75A | 1.9405 | 1.9167 | 3.53 | 0.989 | 4.16 | 0.970 | 0.233 |
| 577 | Hoya | FDS16-W | 1.9211 | 1.9211 | 3.54 | 0.995 | 4.23 | 0.975 | 0.231 |
| 578 | Hoya | FDS16-W | 1.9211 | 1.9211 | 3.54 | 0.995 | 4.51 | 0.985 | 0.218 |
| 579 | Hoya | FDS16-W | 1.9211 | 1.9211 | 3.54 | 0.995 | 4.50 | 0.983 | 0.218 |
| 580 | Hoya | FDS16-W | 1.9211 | 1.9211 | 3.54 | 0.995 | 4.53 | 0.984 | 0.217 |
| 581 | Hoya | FDS16-W | 1.9211 | 1.9211 | 3.54 | 0.995 | 4.59 | 0.986 | 0.215 |
| 582 | Ohara | S-LAH98 | 1.9506 | 1.9364 | 4.94 | 0.999 | 4.59 | 0.983 | 0.214 |
| 583 | Hoya | TAFD45 | 1.9165 | 1.9165 | 5.10 | 0.999 | 4.67 | 0.974 | 0.209 |
| 584 | Hoya | TAFD45 | 1.9165 | 1.9165 | 5.10 | 0.999 | 4.69 | 0.973 | 0.208 |
| 585 | Ohara | S-TIH57 | 1.9588 | 1.9402 | 4.20 | 0.993 | 4.73 | 0.975 | 0.206 |
| 586 | Hoya | M-FDS2 | 1.9421 | 1.9421 | 5.09 | 0.996 | 4.66 | 0.959 | 0.206 |
| 587 | NHG | H-ZLaF77 | 1.9506 | 1.9364 | 5.12 | 0.990 | 4.67 | 0.957 | 0.205 |
| 588 | Hoya | M-TAFD405 | 1.9116 | 1.9116 | 5.45 | 0.997 | 4.82 | 0.971 | 0.201 |
| 589 | Ohara | S-LAH98 | 1.9506 | 1.9364 | 4.94 | 0.999 | 4.92 | 0.991 | 0.201 |
| 590 | Hoya | TAFD45 | 1.9165 | 1.9165 | 5.10 | 0.999 | 4.97 | 0.992 | 0.200 |
| 591 | NHG | H-ZF75A | 1.9405 | 1.9167 | 3.53 | 0.989 | 4.26 | 0.845 | 0.199 |
| 592 | Ohara | S-LAH98 | 1.9506 | 1.9364 | 4.94 | 0.999 | 4.97 | 0.984 | 0.198 |
| 593 | Hikari | J-LASFH21 | 1.9506 | 1.9364 | 5.05 | 0.992 | 5.01 | 0.974 | 0.194 |
| 594 | NHG | H-ZLaF77 | 1.9506 | 1.9364 | 5.12 | 0.990 | 5.04 | 0.974 | 0.193 |
| 595 | Hoya | TAFD45 | 1.9165 | 1.9165 | 5.10 | 0.999 | 5.16 | 0.990 | 0.192 |
| 596 | Hoya | TAFD45 | 1.9165 | 1.9165 | 5.10 | 0.999 | 5.16 | 0.988 | 0.192 |
| 597 | Hoya | TAFD45 | 1.9165 | 1.9165 | 5.10 | 0.999 | 5.19 | 0.989 | 0.191 |
| 598 | Ohara | S-TIH57 | 1.9588 | 1.9402 | 4.20 | 0.993 | 4.79 | 0.891 | 0.186 |
| 599 | Ohara | S-TIH57 | 1.9588 | 1.9402 | 4.20 | 0.993 | 4.79 | 0.884 | 0.184 |
| 600 | Hoya | MP-TAFD405 | 1.9116 | 1.9116 | 5.45 | 0.997 | 5.34 | 0.984 | 0.184 |
| 601 | Ohara | S-TIH57 | 1.9588 | 1.9402 | 4.20 | 0.993 | 4.79 | 0.862 | 0.180 |
| 602 | Hikari | J-LASFH15 | 1.9466 | 1.9311 | 4.79 | 0.992 | 4.98 | 0.891 | 0.179 |
| 603 | Ohara | S-TIH57 | 1.9588 | 1.9402 | 4.20 | 0.993 | 4.79 | 0.855 | 0.178 |
| 604 | NHG | H-ZLaF77 | 1.9506 | 1.9364 | 5.12 | 0.990 | 5.34 | 0.951 | 0.178 |
| 605 | NHG | H-ZLaF77 | 1.9506 | 1.9364 | 5.12 | 0.990 | 5.09 | 0.866 | 0.170 |
| 606 | Hikari | J-LASFH21 | 1.9506 | 1.9364 | 5.05 | 0.992 | 5.20 | 0.864 | 0.166 |
| 607 | Hoya | MP-TAFD405 | 1.9116 | 1.9116 | 5.45 | 0.997 | 5.33 | 0.866 | 0.162 |

TABLE 9a

| | | Glass for B position | | | | |
|---|---|---|---|---|---|---|
| Ex | glass company: | glass name: | From n(400 nm) | To n(500 nm) | density [g/cm$^3$] | Ti integral (400-500 nm) |
| 608 | Schott | N-LASF46A | 1.9591 | 1.9204 | 4.45 | 0.936 |
| 609 | Schott | N-LASF46B | 1.9592 | 1.9204 | 4.51 | 0.932 |
| 610 | Schott | N-SF66 | 2.0140 | 1.9487 | 4.00 | 0.825 |
| 611 | Schott | N-LASF46A | 1.9591 | 1.9204 | 4.45 | 0.936 |
| 612 | Schott | N-LASF46A | 1.9591 | 1.9204 | 4.45 | 0.936 |
| 613 | Schott | N-LASF46B | 1.9592 | 1.9204 | 4.51 | 0.932 |
| 614 | Schott | N-SF66 | 2.0140 | 1.9487 | 4.00 | 0.825 |
| 615 | Schott | N-LASF46B | 1.9592 | 1.9204 | 4.51 | 0.932 |

TABLE 9a-continued

| Ex | glass company: | glass name: | | | | |
|---|---|---|---|---|---|---|
| 616 | Schott | N-SF66 | 2.0140 | 1.9487 | 4.00 | 0.825 |
| 617 | Schott | N-LASF46A | 1.9591 | 1.9204 | 4.45 | 0.936 |
| 618 | Schott | LASF35 | 2.0899 | 2.0425 | 5.41 | 0.855 |
| 619 | Schott | N-LASF46B | 1.9592 | 1.9204 | 4.51 | 0.932 |
| 620 | Schott | N-SF66 | 2.0140 | 1.9487 | 4.00 | 0.825 |
| 621 | Schott | N-SF66 | 2.0140 | 1.9487 | 4.00 | 0.825 |
| 622 | Schott | LASF35 | 2.0899 | 2.0425 | 5.41 | 0.855 |
| 623 | Schott | LASF35 | 2.0899 | 2.0425 | 5.41 | 0.855 |
| 624 | Schott | LASF35 | 2.0899 | 2.0425 | 5.41 | 0.855 |
| 625 | Hoya | TAFD40 | 1.9521 | 1.9521 | 4.73 | 0.860 |
| 626 | Hoya | TAFD40 | 1.9521 | 1.9521 | 4.73 | 0.860 |

| | | | Glass for G position | | | |
|---|---|---|---|---|---|---|
| Ex | glass company: | glass name: | From n(500 nm) | To n(570 nm) | density [g/cm³] | Ti integral (500-570 nm) |
| 608 | Schott | N-SF66 | 1.9487 | 1.9269 | 4.00 | 0.953 |
| 609 | Schott | N-SF66 | 1.9487 | 1.9269 | 4.00 | 0.953 |
| 610 | Schott | N-SF66 | 1.9487 | 1.9269 | 4.00 | 0.953 |
| 611 | Schott | N-LASF46A | 1.9204 | 1.9063 | 4.45 | 0.988 |
| 612 | Schott | N-LASF46B | 1.9204 | 1.9063 | 4.51 | 0.985 |
| 613 | Schott | N-LASF46A | 1.9204 | 1.9063 | 4.45 | 0.988 |
| 614 | Schott | N-LASF46A | 1.9204 | 1.9063 | 4.45 | 0.988 |
| 615 | Schott | N-LASF46B | 1.9204 | 1.9063 | 4.51 | 0.985 |
| 616 | Schott | N-LASF46B | 1.9204 | 1.9063 | 4.51 | 0.985 |
| 617 | Schott | LASF35 | 2.0425 | 2.0253 | 5.41 | 0.968 |
| 618 | Schott | N-SF66 | 1.9487 | 1.9269 | 4.00 | 0.953 |
| 619 | Schott | LASF35 | 2.0425 | 2.0253 | 5.41 | 0.968 |
| 620 | Schott | LASF35 | 2.0425 | 2.0253 | 5.41 | 0.968 |
| 621 | Schott | LASF35 | 2.0425 | 2.0253 | 5.41 | 0.968 |
| 622 | Schott | N-LASF46A | 1.9204 | 1.9063 | 4.45 | 0.988 |
| 623 | Schott | N-LASF46B | 1.9204 | 1.9063 | 4.51 | 0.985 |
| 624 | Schott | LASF35 | 2.0425 | 2.0253 | 5.41 | 0.968 |
| 625 | Hoya | TAFD40 | 1.9521 | 1.9521 | 4.73 | 0.979 |
| 626 | Hoya | TAFD55 | 1.9575 | 1.9575 | 5.12 | 0.991 |

TABLE 9b

| | Glass for R position | | | | | | totals | | |
|---|---|---|---|---|---|---|---|---|---|
| | | | | | | | | T = | FoM |
| Ex | glass company: | glass name: | From n(610 nm) | To n(760 nm) | density [g/cm³] | Ti integral (610-760 nm) | average density | $(T_{red} \cdot T_{blue} \cdot T_{green})$ | $(T_{red} \cdot T_{blue} \cdot T_{green})^{1/3}$/ average density |
| 608 | Schott | LASF35 | 2.0183 | 2.0015 | 5.41 | 0.991 | 4.62 | 0.960 | 0.208 |
| 609 | Schott | LASF35 | 2.0183 | 2.0015 | 5.41 | 0.991 | 4.64 | 0.958 | 0.207 |
| 610 | Schott | LASF35 | 2.0183 | 2.0015 | 5.41 | 0.991 | 4.47 | 0.920 | 0.206 |
| 611 | Schott | LASF35 | 2.0183 | 2.0015 | 5.41 | 0.991 | 4.77 | 0.971 | 0.204 |
| 612 | Schott | LASF35 | 2.0183 | 2.0015 | 5.41 | 0.991 | 4.79 | 0.970 | 0.203 |
| 613 | Schott | LASF35 | 2.0183 | 2.0015 | 5.41 | 0.991 | 4.79 | 0.970 | 0.202 |
| 614 | Schott | LASF35 | 2.0183 | 2.0015 | 5.41 | 0.991 | 4.62 | 0.931 | 0.202 |
| 615 | Schott | LASF35 | 2.0183 | 2.0015 | 5.41 | 0.991 | 4.81 | 0.969 | 0.201 |
| 616 | Schott | LASF35 | 2.0183 | 2.0015 | 5.41 | 0.991 | 4.64 | 0.930 | 0.201 |
| 617 | Schott | LASF35 | 2.0183 | 2.0015 | 5.41 | 0.991 | 5.09 | 0.965 | 0.190 |
| 618 | Schott | LASF35 | 2.0183 | 2.0015 | 5.41 | 0.991 | 4.94 | 0.931 | 0.189 |
| 619 | Schott | LASF35 | 2.0183 | 2.0015 | 5.41 | 0.991 | 5.11 | 0.963 | 0.189 |
| 620 | Schott | LASF35 | 2.0183 | 2.0015 | 5.41 | 0.991 | 4.94 | 0.925 | 0.187 |
| 621 | Schott | LASF35 | 2.0183 | 2.0015 | 5.41 | 0.991 | 4.94 | 0.925 | 0.187 |
| 622 | Schott | LASF35 | 2.0183 | 2.0015 | 5.41 | 0.991 | 5.09 | 0.942 | 0.185 |
| 623 | Schott | LASF35 | 2.0183 | 2.0015 | 5.41 | 0.991 | 5.11 | 0.942 | 0.184 |
| 624 | Schott | LASF35 | 2.0183 | 2.0015 | 5.41 | 0.991 | 5.41 | 0.936 | 0.173 |
| 625 | Ohara | S-TIH57 | 1.9588 | 1.9402 | 4.20 | 0.993 | 4.55 | 0.944 | 0.207 |
| 626 | Ohara | S-TIH57 | 1.9588 | 1.9402 | 4.20 | 0.993 | 4.68 | 0.948 | 0.202 |

TABLE 10a

| | | | Glass for B position | | | |
|---|---|---|---|---|---|---|
| Ex | glass company: | glass name: | From n(400 nm) | To n(500 nm) | density [g/cm³] | Ti integral (400-500 nm) |
| 627 | NHG | H-ZF72B | 2.0252 | 1.9515 | 3.57 | 0.840 |
| 628 | NHG | H-ZF72B | 2.0252 | 1.9515 | 3.57 | 0.840 |

TABLE 10a-continued

| Ex | company: | name: | | | | |
|---|---|---|---|---|---|---|
| 629 | Ohara | S-NPH 2 | 2.0253 | 1.9515 | 3.58 | 0.799 |
| 630 | Ohara | S-LAH98 | 2.0100 | 1.9709 | 4.94 | 0.950 |
| 631 | Hikari | J-LASFH15 | 2.0127 | 1.9688 | 4.79 | 0.908 |
| 632 | Hoya | TAFD40 | 1.9521 | 1.9521 | 4.73 | 0.860 |
| 633 | Hoya | TAFD40 | 1.9521 | 1.9521 | 4.73 | 0.860 |
| 634 | Hikari | J-LASFH21 | 2.0100 | 1.9709 | 5.05 | 0.942 |
| 635 | HOYA | TAFD40 | 1.9521 | 1.9521 | 4.73 | 0.860 |
| 636 | HOYA | TAFD40 | 1.9521 | 1.9521 | 4.73 | 0.860 |
| 637 | Ohara | S-LAH98 | 2.0100 | 1.9709 | 4.94 | 0.950 |
| 638 | HOYA | TAFD40 | 1.9521 | 1.9521 | 4.73 | 0.860 |
| 639 | HOYA | TAFD40 | 1.9521 | 1.9521 | 4.73 | 0.860 |
| 640 | NHG | H-ZLaF77 | 2.0100 | 1.9709 | 5.12 | 0.905 |
| 641 | NHG | H-ZF72B | 2.0252 | 1.9515 | 3.57 | 0.840 |
| 642 | Hikari | J-LASFH15 | 2.0127 | 1.9688 | 4.79 | 0.908 |
| 643 | Hikari | J-LASFH15 | 2.0127 | 1.9688 | 4.79 | 0.908 |
| 644 | HOYA | TAFD55 | 1.9575 | 1.9575 | 5.12 | 0.916 |
| 645 | Hikari | J-LASFH21 | 2.0100 | 1.9709 | 5.05 | 0.942 |
| 646 | Ohara | S-NPH 2 | 2.0253 | 1.9515 | 3.58 | 0.799 |
| 647 | Hoya | TAFD40 | 1.9521 | 1.9521 | 4.73 | 0.860 |
| 648 | Hikari | J-LASFH21 | 2.0100 | 1.9709 | 5.05 | 0.942 |
| 649 | Hikari | J-LASFH15 | 2.0127 | 1.9688 | 4.79 | 0.908 |
| 650 | HOYA | TAFD40 | 1.9521 | 1.9521 | 4.73 | 0.860 |
| 651 | Hoya | TAFD55 | 1.9575 | 1.9575 | 5.12 | 0.916 |
| 652 | Ohara | S-NPH 2 | 2.0253 | 1.9515 | 3.58 | 0.799 |
| 653 | Hoya | TAFD40 | 1.9521 | 1.9521 | 4.73 | 0.860 |
| 654 | Hikari | J-LASFH15 | 2.0127 | 1.9688 | 4.79 | 0.908 |
| 655 | Hikari | J-LASFH15 | 2.0127 | 1.9688 | 4.79 | 0.908 |
| 656 | Ohara | S-LAH98 | 2.0100 | 1.9709 | 4.94 | 0.950 |
| 657 | NHG | H-ZF72B | 2.0252 | 1.9515 | 3.57 | 0.840 |
| 658 | NHG | H-ZLaF75 | 2.0126 | 1.9688 | 4.77 | 0.842 |
| 659 | NHG | H-ZF72B | 2.0252 | 1.9515 | 3.57 | 0.840 |
| 660 | Ohara | S-LAH98 | 2.0100 | 1.9709 | 4.94 | 0.950 |
| 661 | Ohara | S-LAH98 | 2.0100 | 1.9709 | 4.94 | 0.950 |
| 662 | HOYA | TAFD55 | 1.9575 | 1.9575 | 5.12 | 0.916 |
| 663 | Ohara | S-LAH98 | 2.0100 | 1.9709 | 4.94 | 0.950 |
| 664 | Ohara | S-LAH98 | 2.0100 | 1.9709 | 4.94 | 0.950 |
| 665 | HOYA | TAFD55 | 1.9575 | 1.9575 | 5.12 | 0.916 |
| 666 | Hikari | J-LASFH15 | 2.0127 | 1.9688 | 4.79 | 0.908 |
| 667 | HOYA | TAFD55 | 1.9575 | 1.9575 | 5.12 | 0.916 |
| 668 | Hoya | TAFD40 | 1.9521 | 1.9521 | 4.73 | 0.860 |
| 669 | Ohara | S-LAH98 | 2.0100 | 1.9709 | 4.94 | 0.950 |
| 670 | NHG | H-ZLaF77 | 2.0100 | 1.9709 | 5.12 | 0.905 |
| 671 | HOYA | TAFD55 | 1.9575 | 1.9575 | 5.12 | 0.916 |
| 672 | Ohara | S-NPH 2 | 2.0253 | 1.9515 | 3.58 | 0.799 |
| 673 | Hoya | TAFD65 | 2.0028 | 2.0028 | 5.27 | 0.858 |
| 674 | NHG | H-ZLaF75 | 2.0126 | 1.9688 | 4.77 | 0.842 |
| 675 | HOYA | TAFD55 | 1.9575 | 1.9575 | 5.12 | 0.916 |
| 676 | Ohara | S-LAH98 | 2.0100 | 1.9709 | 4.94 | 0.950 |
| 677 | Ohara | S-LAH98 | 2.0100 | 1.9709 | 4.94 | 0.950 |
| 678 | Hoya | TAFD65 | 2.0028 | 2.0028 | 5.27 | 0.858 |
| 679 | Hoya | TAFD65 | 2.0028 | 2.0028 | 5.27 | 0.858 |
| 680 | NHG | H-ZLaF75 | 2.0126 | 1.9688 | 4.77 | 0.842 |
| 681 | Hoya | TAFD65 | 2.0028 | 2.0028 | 5.27 | 0.858 |
| 682 | Hoya | TAFD65 | 2.0028 | 2.0028 | 5.27 | 0.858 |
| 683 | Hoya | TAFD65 | 2.0028 | 2.0028 | 5.27 | 0.858 |
| 684 | NHG | H-ZLaF75 | 2.0126 | 1.9688 | 4.77 | 0.842 |
| 685 | Hoya | TAFD65 | 2.0028 | 2.0028 | 5.27 | 0.858 |
| 686 | Hoya | E-FDS3 | 2.0278 | 2.0278 | 5.63 | 0.564 |
| 687 | Hoya | E-FDS3 | 2.0278 | 2.0278 | 5.63 | 0.564 |
| 688 | Hoya | E-FDS3 | 2.0278 | 2.0278 | 5.63 | 0.564 |

| | Glass for G position | | | | | |
|---|---|---|---|---|---|---|
| Ex | glass company: | glass name: | From n(500 nm) | To n(570 nm) | density [g/cm$^3$] | Ti integral (500-570 nm) |
| 627 | Ohara | S-NPH 3 | 1.9913 | 1.9641 | 3.59 | 0.983 |
| 628 | NHG | H-ZF75A | 1.9768 | 1.9508 | 3.53 | 0.952 |
| 629 | NHG | H-ZF75A | 1.9768 | 1.9508 | 3.53 | 0.952 |
| 630 | Ohara | S-NPH 3 | 1.9913 | 1.9641 | 3.59 | 0.983 |
| 631 | Ohara | S-NPH 3 | 1.9913 | 1.9641 | 3.59 | 0.983 |
| 632 | Ohara | S-NPH 3 | 1.9913 | 1.9641 | 3.59 | 0.983 |
| 633 | Ohara | S-NPH 3 | 1.9913 | 1.9641 | 3.59 | 0.983 |
| 634 | NHG | H-ZF75A | 1.9768 | 1.9508 | 3.53 | 0.952 |
| 635 | Ohara | S-NPH 3 | 1.9913 | 1.9641 | 3.59 | 0.983 |
| 636 | NHG | H-ZF75A | 1.9768 | 1.9508 | 3.53 | 0.952 |
| 637 | Ohara | S-NPH 3 | 1.9913 | 1.9641 | 3.59 | 0.983 |
| 638 | NHG | H-ZF75A | 1.9768 | 1.9508 | 3.53 | 0.952 |
| 639 | NHG | H-ZF75A | 1.9768 | 1.9508 | 3.53 | 0.952 |
| 640 | Ohara | S-NPH 3 | 1.9913 | 1.9641 | 3.59 | 0.983 |

TABLE 10a-continued

| | | | | | | |
|---|---|---|---|---|---|---|
| 641 | Hoya | TAFD40 | 1.9521 | 1.9521 | 4.73 | 0.979 |
| 642 | NHG | H-ZF75A | 1.9768 | 1.9508 | 3.53 | 0.952 |
| 643 | Ohara | S-TIH57 | 1.9863 | 1.9667 | 4.20 | 0.969 |
| 644 | Ohara | S-NPH 3 | 1.9913 | 1.9641 | 3.59 | 0.983 |
| 645 | Ohara | S-TIH57 | 1.9863 | 1.9667 | 4.20 | 0.969 |
| 646 | Hikari | J-LASFH21 | 1.9709 | 1.9565 | 5.05 | 0.987 |
| 647 | Ohara | S-NPH 3 | 1.9913 | 1.9641 | 3.59 | 0.983 |
| 648 | NHG | H-ZF75A | 1.9768 | 1.9508 | 3.53 | 0.952 |
| 649 | Ohara | S-NPH 3 | 1.9913 | 1.9641 | 3.59 | 0.983 |
| 650 | Ohara | S-NPH 3 | 1.9913 | 1.9641 | 3.59 | 0.983 |
| 651 | NHG | H-ZF75A | 1.9768 | 1.9508 | 3.53 | 0.952 |
| 652 | Ohara | S-LAH99 | 2.0210 | 2.0042 | 5.02 | 0.990 |
| 653 | Ohara | S-TIH57 | 1.9863 | 1.9667 | 4.20 | 0.969 |
| 654 | Hoya | TAFD40 | 1.9521 | 1.9521 | 4.73 | 0.979 |
| 655 | Ohara | S-NPH 3 | 1.9913 | 1.9641 | 3.59 | 0.983 |
| 656 | Ohara | S-LAH98 | 1.9709 | 1.9565 | 4.94 | 0.993 |
| 657 | Hoya | TAFD65 | 2.0028 | 2.0028 | 5.27 | 0.980 |
| 658 | NHG | H-ZLaF75 | 1.9688 | 1.9530 | 4.77 | 0.975 |
| 659 | Ohara | S-LAH79 | 2.0240 | 2.0066 | 5.23 | 0.967 |
| 660 | Ohara | S-LAH99 | 2.0210 | 2.0042 | 5.02 | 0.990 |
| 661 | Ohara | S-LAH98 | 1.9709 | 1.9565 | 4.94 | 0.993 |
| 662 | Ohara | S-LAH98 | 1.9709 | 1.9565 | 4.94 | 0.993 |
| 663 | Hoya | TAFD55 | 1.9575 | 1.9575 | 5.12 | 0.991 |
| 664 | Ohara | S-LAH99 | 2.0210 | 2.0042 | 5.02 | 0.990 |
| 665 | NHG | H-ZLaF75 | 1.9688 | 1.9530 | 4.77 | 0.975 |
| 666 | Ohara | S-LAH98 | 1.9709 | 1.9565 | 4.94 | 0.993 |
| 667 | Ohara | S-LAH98 | 1.9709 | 1.9565 | 4.94 | 0.993 |
| 668 | Schott | LASF35 | 2.0425 | 2.0253 | 5.41 | 0.968 |
| 669 | Ohara | S-LAH98 | 1.9709 | 1.9565 | 4.94 | 0.993 |
| 670 | NHG | H-ZLaF80 | 2.0236 | 2.0043 | 4.76 | 0.966 |
| 671 | Ohara | S-LAH98 | 1.9709 | 1.9565 | 4.94 | 0.993 |
| 672 | NHG | H-ZLaF77 | 1.9709 | 1.9565 | 5.12 | 0.980 |
| 673 | Hikari | J-LASFH17 | 2.0236 | 2.0043 | 4.69 | 0.978 |
| 674 | Hikari | J-LASFH16 | 2.0210 | 2.0042 | 5.10 | 0.988 |
| 675 | NHG | H-ZLaF77 | 1.9709 | 1.9565 | 5.12 | 0.980 |
| 676 | Sumita | K-PSFn202 | 2.0474 | 2.0240 | 6.22 | 0.997 |
| 677 | Ohara | S-LAH99 | 2.0210 | 2.0042 | 5.02 | 0.990 |
| 678 | Ohara | S-LAH99 | 2.0210 | 2.0042 | 5.02 | 0.990 |
| 679 | NHG | H-ZLaF80 | 2.0236 | 2.0043 | 4.76 | 0.966 |
| 680 | NHG | H-ZLaF75 | 1.9688 | 1.9530 | 4.77 | 0.975 |
| 681 | Hoya | TAFD65 | 2.0028 | 2.0028 | 5.27 | 0.980 |
| 682 | Schott | LASF35 | 2.0425 | 2.0253 | 5.41 | 0.968 |
| 683 | Schott | LASF35 | 2.0425 | 2.0253 | 5.41 | 0.968 |
| 684 | NHG | H-ZLaF77 | 1.9709 | 1.9565 | 5.12 | 0.980 |
| 685 | Sumita | K-PSFn202 | 2.0474 | 2.0240 | 6.22 | 0.997 |
| 686 | Hikari | J-LASFH17 | 2.0236 | 2.0043 | 4.69 | 0.978 |
| 687 | Schott | LASF35 | 2.0425 | 2.0253 | 5.41 | 0.968 |
| 688 | Hoya | E-FDS3 | 2.0278 | 2.0278 | 5.63 | 0.952 |

TABLE 10b

| | | | | | | | totals | | |
|---|---|---|---|---|---|---|---|---|---|
| | | Glass for R position | | | | | | T = | FoM |
| Ex | glass company: | glass name: | From n(610 nm) | To n(760 nm) | density [g/cm$^3$] | Ti integral (610-760 nm) | average density | $(T_{red} \cdot T_{blue} \cdot T_{green})^{1/3}$ | $(T_{red} \cdot T_{blue} \cdot T_{green})^{1/3}$/ average density |
| 627 | Hikari | J-LASFH17 | 1.9965 | 1.9781 | 4.69 | 0.992 | 3.95 | 0.938 | 0.238 |
| 628 | Hikari | J-LASFH17 | 1.9965 | 1.9781 | 4.69 | 0.992 | 3.93 | 0.928 | 0.236 |
| 629 | Hikari | J-LASFH17HS | 1.9965 | 1.9781 | 4.69 | 0.987 | 3.93 | 0.913 | 0.232 |
| 630 | Hoya | TAFD40 | 1.9521 | 1.9521 | 4.73 | 0.997 | 4.42 | 0.977 | 0.221 |
| 631 | NHG | H-ZLaF80 | 1.9966 | 1.9782 | 4.76 | 0.990 | 4.38 | 0.960 | 0.219 |
| 632 | Hikari | J-LASFH17 | 1.9965 | 1.9781 | 4.69 | 0.992 | 4.34 | 0.945 | 0.218 |
| 633 | Hoya | TAFD40 | 1.9521 | 1.9521 | 4.73 | 0.997 | 4.35 | 0.947 | 0.218 |
| 634 | Hikari | J-LASFH17HS | 1.9965 | 1.9781 | 4.69 | 0.987 | 4.42 | 0.960 | 0.217 |
| 635 | NHG | H-ZLaF80 | 1.9966 | 1.9782 | 4.76 | 0.990 | 4.36 | 0.944 | 0.217 |
| 636 | Hikari | J-LASFH17 | 1.9965 | 1.9781 | 4.69 | 0.992 | 4.32 | 0.935 | 0.217 |
| 637 | Ohara | S-LAH99 | 1.9973 | 1.9810 | 5.02 | 0.999 | 4.52 | 0.977 | 0.216 |
| 638 | Hikari | J-LASFH17HS | 1.9965 | 1.9781 | 4.69 | 0.987 | 4.32 | 0.933 | 0.216 |
| 639 | NHG | H-ZLaF80 | 1.9966 | 1.9782 | 4.76 | 0.990 | 4.34 | 0.934 | 0.215 |
| 640 | Hoya | TAFD40 | 1.9521 | 1.9521 | 4.73 | 0.997 | 4.48 | 0.962 | 0.215 |
| 641 | Ohara | S-LAH99 | 1.9973 | 1.9810 | 5.02 | 0.999 | 4.44 | 0.939 | 0.212 |
| 642 | Hoya | TAFD65 | 2.0028 | 2.0028 | 5.27 | 0.996 | 4.53 | 0.952 | 0.210 |
| 643 | Hoya | TAFD40 | 1.9521 | 1.9521 | 4.73 | 0.997 | 4.57 | 0.958 | 0.209 |
| 644 | Hikari | J-LASFH16 | 1.9973 | 1.9810 | 5.10 | 0.994 | 4.60 | 0.964 | 0.209 |
| 645 | Hoya | TAFD40 | 1.9521 | 1.9521 | 4.73 | 0.997 | 4.66 | 0.969 | 0.208 |

TABLE 10b-continued

| | | Glass for R position | | | | totals | | |
|---|---|---|---|---|---|---|---|---|
| | | | | | | | T = | FoM |
| Ex | glass company: | glass name: | From n(610 nm) | To n(760 nm) | density [g/cm³] | Ti integral (610-760 nm) | average density | $(T_{red} \cdot T_{blue} \cdot T_{green})^{1/3}$ | $(T_{red} \cdot T_{blue} \cdot T_{green})^{1/3}$ / average density |

| Ex | glass company: | glass name: | From n(610 nm) | To n(760 nm) | density [g/cm³] | Ti integral (610-760 nm) | average density | $(T_{red} \cdot T_{blue} \cdot T_{green})^{1/3}$ | FoM |
|---|---|---|---|---|---|---|---|---|---|
| 646 | NHG | H-ZLaF80 | 1.9966 | 1.9782 | 4.76 | 0.990 | 4.46 | 0.925 | 0.207 |
| 647 | Schott | LASF35 | 2.0183 | 2.0015 | 5.41 | 0.991 | 4.58 | 0.945 | 0.206 |
| 648 | Schott | LASF35 | 2.0183 | 2.0015 | 5.41 | 0.991 | 4.66 | 0.962 | 0.206 |
| 649 | Hoya | E-FDS3 | 2.0278 | 2.0278 | 5.63 | 0.990 | 4.67 | 0.960 | 0.206 |
| 650 | Sumita | K-PSFn2 | 1.9967 | 1.9744 | 5.48 | 0.989 | 4.60 | 0.944 | 0.205 |
| 651 | Sumita | K-PSFn2 | 1.9967 | 1.9744 | 5.48 | 0.989 | 4.71 | 0.952 | 0.202 |
| 652 | Hoya | TAFD65 | 2.0028 | 2.0028 | 5.27 | 0.996 | 4.62 | 0.928 | 0.201 |
| 653 | Ohara | S-LAH79 | 1.9995 | 1.9826 | 5.23 | 0.992 | 4.72 | 0.941 | 0.199 |
| 654 | Ohara | S-LAH99 | 1.9973 | 1.9810 | 5.02 | 0.999 | 4.85 | 0.962 | 0.198 |
| 655 | Sumita | K-PSFn202 | 2.0146 | 1.9928 | 6.22 | 0.997 | 4.87 | 0.963 | 0.198 |
| 656 | Ohara | S-LAH99 | 1.9973 | 1.9810 | 5.02 | 0.999 | 4.97 | 0.980 | 0.197 |
| 657 | Schott | LASF35 | 2.0183 | 2.0015 | 5.41 | 0.991 | 4.75 | 0.937 | 0.197 |
| 658 | Hikari | J-LASFH17HS | 1.9965 | 1.9781 | 4.69 | 0.987 | 4.74 | 0.935 | 0.197 |
| 659 | Schott | LASF35 | 2.0183 | 2.0015 | 5.41 | 0.991 | 4.74 | 0.933 | 0.197 |
| 660 | Ohara | S-LAH99 | 1.9973 | 1.9810 | 5.02 | 0.999 | 4.99 | 0.979 | 0.196 |
| 661 | Hoya | TAFD55 | 1.9575 | 1.9575 | 5.12 | 0.998 | 5.00 | 0.980 | 0.196 |
| 662 | NHG | H-ZLaF80 | 1.9966 | 1.9782 | 4.76 | 0.990 | 4.94 | 0.966 | 0.196 |
| 663 | Ohara | S-LAH99 | 1.9973 | 1.9810 | 5.02 | 0.999 | 5.03 | 0.980 | 0.195 |
| 664 | Hikari | J-LASFH16 | 1.9973 | 1.9810 | 5.10 | 0.994 | 5.02 | 0.978 | 0.195 |
| 665 | Ohara | S-LAH99 | 1.9973 | 1.9810 | 5.02 | 0.999 | 4.97 | 0.963 | 0.194 |
| 666 | Ohara | S-LAH79 | 1.9995 | 1.9826 | 5.23 | 0.992 | 4.99 | 0.964 | 0.193 |
| 667 | Ohara | S-LAH99 | 1.9973 | 1.9810 | 5.02 | 0.999 | 5.03 | 0.969 | 0.193 |
| 668 | Hikari | J-LASFH17 | 1.9965 | 1.9781 | 4.69 | 0.992 | 4.94 | 0.940 | 0.190 |
| 669 | Hoya | E-FDS3 | 2.0278 | 2.0278 | 5.63 | 0.990 | 5.17 | 0.977 | 0.189 |
| 670 | Schott | LASF35 | 2.0183 | 2.0015 | 5.41 | 0.991 | 5.10 | 0.954 | 0.187 |
| 671 | Sumita | K-PSFn2 | 1.9967 | 1.9744 | 5.48 | 0.989 | 5.18 | 0.966 | 0.186 |
| 672 | Sumita | K-PSFn202 | 2.0146 | 1.9928 | 6.22 | 0.997 | 4.97 | 0.925 | 0.186 |
| 673 | Hoya | TAFD65 | 2.0028 | 2.0028 | 5.27 | 0.996 | 5.08 | 0.944 | 0.186 |
| 674 | Schott | LASF35 | 2.0183 | 2.0015 | 5.41 | 0.991 | 5.09 | 0.940 | 0.185 |
| 675 | Sumita | K-PSFn2 | 1.9967 | 1.9744 | 5.48 | 0.989 | 5.24 | 0.961 | 0.183 |
| 676 | Ohara | S-LAH99 | 1.9973 | 1.9810 | 5.02 | 0.999 | 5.39 | 0.982 | 0.182 |
| 677 | Sumita | K-PSFn202 | 2.0146 | 1.9928 | 6.22 | 0.997 | 5.39 | 0.979 | 0.182 |
| 678 | Schott | LASF35 | 2.0183 | 2.0015 | 5.41 | 0.991 | 5.23 | 0.946 | 0.181 |
| 679 | Hoya | E-FDS3 | 2.0278 | 2.0278 | 5.63 | 0.990 | 5.22 | 0.938 | 0.180 |
| 680 | Sumita | K-PSFn202 | 2.0146 | 1.9928 | 6.22 | 0.997 | 5.25 | 0.938 | 0.179 |
| 681 | Schott | LASF35 | 2.0183 | 2.0015 | 5.41 | 0.991 | 5.32 | 0.943 | 0.177 |
| 682 | Hoya | TAFD65 | 2.0028 | 2.0028 | 5.27 | 0.996 | 5.32 | 0.941 | 0.177 |
| 683 | Schott | LASF35 | 2.0183 | 2.0015 | 5.41 | 0.991 | 5.36 | 0.939 | 0.175 |
| 684 | Sumita | K-PSFn202 | 2.0146 | 1.9928 | 6.22 | 0.997 | 5.37 | 0.940 | 0.175 |
| 685 | Hoya | TAFD65 | 2.0028 | 2.0028 | 5.27 | 0.996 | 5.59 | 0.950 | 0.170 |
| 686 | Hoya | TAFD65 | 2.0028 | 2.0028 | 5.27 | 0.996 | 5.20 | 0.846 | 0.163 |
| 687 | Schott | LASF35 | 2.0183 | 2.0015 | 5.41 | 0.991 | 5.48 | 0.841 | 0.153 |
| 688 | Hoya | E-FDS3 | 2.0278 | 2.0278 | 5.63 | 0.990 | 5.63 | 0.835 | 0.148 |

TABLE 11a

| | | Glass for B position | | | |
|---|---|---|---|---|---|
| Ex | glass company: | glass name: | From n(400 nm) | To n(500 nm) | density [g/cm³] | Ti integral (400-500 nm) |
| 689 | Hikari | J-LASFH17HS | 2.0786 | 2.0236 | 4.69 | 0.871 |
| 690 | Hikari | J-LASFH17HS | 2.0786 | 2.0236 | 4.69 | 0.871 |
| 691 | Hoya | TAFD65 | 2.0028 | 2.0028 | 5.27 | 0.858 |
| 692 | Hoya | TAFD65 | 2.0028 | 2.0028 | 5.27 | 0.858 |
| 693 | Ohara | S-LAH99 | 2.0675 | 2.0210 | 5.02 | 0.917 |
| 694 | Hoya | TAFD65 | 2.0028 | 2.0028 | 5.27 | 0.858 |
| 695 | Hikari | J-LASFH17HS | 2.0786 | 2.0236 | 4.69 | 0.871 |
| 696 | NHG | H-ZLaF80 | 2.0786 | 2.0236 | 4.76 | 0.787 |
| 697 | Ohara | S-LAH99 | 2.0675 | 2.0210 | 5.02 | 0.917 |
| 698 | Hoya | TAFD65 | 2.0028 | 2.0028 | 5.27 | 0.858 |
| 699 | Hoya | TAFD65 | 2.0028 | 2.0028 | 5.27 | 0.858 |
| 700 | NHG | H-ZLaF80 | 2.0786 | 2.0236 | 4.76 | 0.787 |
| 701 | Hoya | TAFD65 | 2.0028 | 2.0028 | 5.27 | 0.858 |
| 702 | Hikari | J-LASFH17HS | 2.0786 | 2.0236 | 4.69 | 0.871 |
| 703 | Hoya | TAFD65 | 2.0028 | 2.0028 | 5.27 | 0.858 |
| 704 | Hoya | TAFD65 | 2.0028 | 2.0028 | 5.27 | 0.858 |
| 705 | Ohara | S-LAH99 | 2.0675 | 2.0210 | 5.02 | 0.917 |
| 706 | Hikari | J-LASFH17 | 2.0786 | 2.0236 | 4.69 | 0.848 |
| 707 | Hoya | TAFD65 | 2.0028 | 2.0028 | 5.27 | 0.858 |

TABLE 11a-continued

| | glass company: | glass name: | n(500 nm) | n(570 nm) | density [g/cm³] | Ti integral |
|---|---|---|---|---|---|---|
| 708 | Hikari | J-LASFH16 | 2.0675 | 2.0210 | 5.10 | 0.915 |
| 709 | Hoya | TAFD65 | 2.0028 | 2.0028 | 5.27 | 0.858 |
| 710 | Schott | LASF35 | 2.0899 | 2.0425 | 5.41 | 0.855 |
| 711 | Hoya | TAFD65 | 2.0028 | 2.0028 | 5.27 | 0.858 |
| 712 | Sumita | K-PSFn202 | 2.1173 | 2.0474 | 6.22 | 0.926 |
| 713 | Ohara | S-LAH79 | 2.0718 | 2.0240 | 5.23 | 0.815 |
| 714 | Sumita | K-PSFn202 | 2.1173 | 2.0474 | 6.22 | 0.926 |
| 715 | Hoya | TAFD65 | 2.0028 | 2.0028 | 5.27 | 0.858 |
| 716 | Sumita | K-PSFn202 | 2.1173 | 2.0474 | 6.22 | 0.926 |
| 717 | Hikari | J-LASFH16 | 2.0675 | 2.0210 | 5.10 | 0.915 |
| 718 | Hoya | TAFD65 | 2.0028 | 2.0028 | 5.27 | 0.858 |
| 719 | Hoya | TAFD65 | 2.0028 | 2.0028 | 5.27 | 0.858 |
| 720 | Sumita | K-PSFn202 | 2.1173 | 2.0474 | 6.22 | 0.926 |
| 721 | Hoya | TAFD65 | 2.0028 | 2.0028 | 5.27 | 0.858 |
| 722 | Hoya | TAFD65 | 2.0028 | 2.0028 | 5.27 | 0.858 |
| 723 | Sumita | K-PSFn202 | 2.1173 | 2.0474 | 6.22 | 0.926 |
| 724 | Hoya | E-FDS3 | 2.0278 | 2.0278 | 5.63 | 0.564 |
| 725 | Hoya | E-FDS3 | 2.0278 | 2.0278 | 5.63 | 0.564 |
| 726 | Hoya | E-FDS3 | 2.0278 | 2.0278 | 5.63 | 0.564 |
| 727 | Hoya | E-FDS3 | 2.0278 | 2.0278 | 5.63 | 0.564 |

| | Glass for G position | | | | | |
|---|---|---|---|---|---|---|
| Ex | glass company: | glass name: | From n(500 nm) | To n(570 nm) | density [g/cm³] | Ti integral (500-570 nm) |
| 689 | Hikari | J-LASFH17 | 2.0236 | 2.0043 | 4.69 | 0.978 |
| 690 | Hikari | J-LASFH17 | 2.0236 | 2.0043 | 4.69 | 0.978 |
| 691 | Hikari | J-LASFH17 | 2.0236 | 2.0043 | 4.69 | 0.978 |
| 692 | NHG | H-ZLaF80 | 2.0236 | 2.0043 | 4.76 | 0.966 |
| 693 | Hikari | J-LASFH17 | 2.0236 | 2.0043 | 4.69 | 0.978 |
| 694 | Ohara | S-LAH99 | 2.0210 | 2.0042 | 5.02 | 0.990 |
| 695 | Hikari | J-LASFH17 | 2.0236 | 2.0043 | 4.69 | 0.978 |
| 696 | Hikari | J-LASFH17 | 2.0236 | 2.0043 | 4.69 | 0.978 |
| 697 | Ohara | S-LAH99 | 2.0210 | 2.0042 | 5.02 | 0.990 |
| 698 | Hikari | J-LASFH17 | 2.0236 | 2.0043 | 4.69 | 0.978 |
| 699 | Ohara | S-LAH99 | 2.0210 | 2.0042 | 5.02 | 0.990 |
| 700 | Hikari | J-LASFH17HS | 2.0236 | 2.0043 | 4.69 | 0.972 |
| 701 | Hikari | J-LASFH16 | 2.0210 | 2.0042 | 5.10 | 0.988 |
| 702 | Schott | LASF35 | 2.0425 | 2.0253 | 5.41 | 0.968 |
| 703 | NHG | H-ZLaF80 | 2.0236 | 2.0043 | 4.76 | 0.966 |
| 704 | Hikari | J-LASFH17 | 2.0236 | 2.0043 | 4.69 | 0.978 |
| 705 | Hikari | J-LASFH16 | 2.0210 | 2.0042 | 5.10 | 0.988 |
| 706 | Ohara | S-LAH79 | 2.0240 | 2.0066 | 5.23 | 0.967 |
| 707 | Ohara | S-LAH99 | 2.0210 | 2.0042 | 5.02 | 0.990 |
| 708 | Schott | LASF35 | 2.0425 | 2.0253 | 5.41 | 0.968 |
| 709 | NHG | H-ZLaF80 | 2.0236 | 2.0043 | 4.76 | 0.966 |
| 710 | Hikari | J-LASFH17 | 2.0236 | 2.0043 | 4.69 | 0.978 |
| 711 | Ohara | S-LAH99 | 2.0210 | 2.0042 | 5.02 | 0.990 |
| 712 | Hikari | J-LASFH17 | 2.0236 | 2.0043 | 4.69 | 0.978 |
| 713 | Ohara | S-LAH99 | 2.0210 | 2.0042 | 5.02 | 0.990 |
| 714 | Hikari | J-LASFH17 | 2.0236 | 2.0043 | 4.69 | 0.978 |
| 715 | Ohara | S-LAH79 | 2.0240 | 2.0066 | 5.23 | 0.967 |
| 716 | Hikari | J-LASFH16 | 2.0210 | 2.0042 | 5.10 | 0.988 |
| 717 | Sumita | K-PSFn202 | 2.0474 | 2.0240 | 6.22 | 0.997 |
| 718 | Hikari | J-LASFH17 | 2.0236 | 2.0043 | 4.69 | 0.978 |
| 719 | Schott | LASF35 | 2.0425 | 2.0253 | 5.41 | 0.968 |
| 720 | Ohara | S-LAH99 | 2.0210 | 2.0042 | 5.02 | 0.990 |
| 721 | Ohara | S-LAH99 | 2.0210 | 2.0042 | 5.02 | 0.990 |
| 722 | Ohara | S-LAH79 | 2.0240 | 2.0066 | 5.23 | 0.967 |
| 723 | Sumita | K-PSFn202 | 2.0474 | 2.0240 | 6.22 | 0.997 |
| 724 | NHG | H-ZLaF80 | 2.0236 | 2.0043 | 4.76 | 0.966 |
| 725 | Schott | LASF35 | 2.0425 | 2.0253 | 5.41 | 0.968 |
| 726 | NHG | H-ZLaF80 | 2.0236 | 2.0043 | 4.76 | 0.966 |
| 727 | Hoya | E-FDS3 | 2.0278 | 2.0278 | 5.63 | 0.952 |

TABLE 11b

| | Glass for R position | | | | | totals | | |
|---|---|---|---|---|---|---|---|---|
| Ex | glass company: | glass name: | From n(610 nm) | To n(760 nm) | density [g/cm³] | Ti integral (610-760 nm) | average density | T = $(T_{red} \cdot T_{blue} \cdot T_{green})^{1/3}$ | FoM $(T_{red} \cdot T_{blue} \cdot T_{green})^{1/3}$/ average density |
| 689 | Hoya | TAFD65 | 2.0028 | 2.0028 | 5.27 | 0.996 | 4.88 | 0.948 | 0.194 |
| 690 | Schott | LASF35 | 2.0183 | 2.0015 | 5.41 | 0.991 | 4.93 | 0.947 | 0.192 |

TABLE 11b-continued

| | | Glass for R position | | | | | totals | |
| | | | | | | | T = | FoM |
| Ex | glass company: | glass name: | From n(610 nm) | To n(760 nm) | density [g/cm³] | Ti integral (610-760 nm) | average density | $(T_{red} \cdot T_{blue} \cdot T_{green})^{1/3}$ | $(T_{red} \cdot T_{blue} \cdot T_{green})^{1/3}$/ average density |
|---|---|---|---|---|---|---|---|---|---|
| 691 | NHG | H-ZLaF80 | 1.9966 | 1.9782 | 4.76 | 0.990 | 4.91 | 0.942 | 0.192 |
| 692 | Hikari | J-LASFH17HS | 1.9965 | 1.9781 | 4.69 | 0.987 | 4.91 | 0.937 | 0.191 |
| 693 | Schott | LASF35 | 2.0183 | 2.0015 | 5.41 | 0.991 | 5.04 | 0.962 | 0.191 |
| 694 | Hikari | J-LASFH17 | 1.9965 | 1.9781 | 4.69 | 0.992 | 4.99 | 0.947 | 0.190 |
| 695 | Hoya | E-FDS3 | 2.0278 | 2.0278 | 5.63 | 0.990 | 5.00 | 0.946 | 0.189 |
| 696 | Hoya | TAFD65 | 2.0028 | 2.0028 | 5.27 | 0.996 | 4.91 | 0.920 | 0.188 |
| 697 | Schott | LASF35 | 2.0183 | 2.0015 | 5.41 | 0.991 | 5.15 | 0.966 | 0.188 |
| 698 | Hoya | TAFD65 | 2.0028 | 2.0028 | 5.27 | 0.996 | 5.08 | 0.944 | 0.186 |
| 699 | Ohara | S-LAH99 | 1.9973 | 1.9810 | 5.02 | 0.999 | 5.10 | 0.949 | 0.186 |
| 700 | Schott | LASF35 | 2.0183 | 2.0015 | 5.41 | 0.991 | 4.95 | 0.917 | 0.185 |
| 701 | Ohara | S-LAH99 | 1.9973 | 1.9810 | 5.02 | 0.999 | 5.13 | 0.948 | 0.185 |
| 702 | Hoya | TAFD65 | 2.0028 | 2.0028 | 5.27 | 0.996 | 5.12 | 0.945 | 0.184 |
| 703 | Hoya | TAFD65 | 2.0028 | 2.0028 | 5.27 | 0.996 | 5.10 | 0.940 | 0.184 |
| 704 | Schott | LASF35 | 2.0183 | 2.0015 | 5.41 | 0.991 | 5.12 | 0.942 | 0.184 |
| 705 | Hoya | E-FDS3 | 2.0278 | 2.0278 | 5.63 | 0.990 | 5.25 | 0.965 | 0.184 |
| 706 | Schott | LASF35 | 2.0183 | 2.0015 | 5.41 | 0.991 | 5.11 | 0.935 | 0.183 |
| 707 | Hoya | TAFD65 | 2.0028 | 2.0028 | 5.27 | 0.996 | 5.19 | 0.948 | 0.183 |
| 708 | Hoya | TAFD65 | 2.0028 | 2.0028 | 5.27 | 0.996 | 5.26 | 0.959 | 0.182 |
| 709 | Schott | LASF35 | 2.0183 | 2.0015 | 5.41 | 0.991 | 5.15 | 0.938 | 0.182 |
| 710 | Schott | LASF35 | 2.0183 | 2.0015 | 5.41 | 0.991 | 5.17 | 0.941 | 0.182 |
| 711 | Schott | LASF35 | 2.0183 | 2.0015 | 5.41 | 0.991 | 5.23 | 0.946 | 0.181 |
| 712 | Hoya | TAFD65 | 2.0028 | 2.0028 | 5.27 | 0.996 | 5.39 | 0.967 | 0.179 |
| 713 | Schott | LASF35 | 2.0183 | 2.0015 | 5.41 | 0.991 | 5.22 | 0.932 | 0.178 |
| 714 | Schott | LASF35 | 2.0183 | 2.0015 | 5.41 | 0.991 | 5.44 | 0.965 | 0.177 |
| 715 | Schott | LASF35 | 2.0183 | 2.0015 | 5.41 | 0.991 | 5.30 | 0.939 | 0.177 |
| 716 | Hoya | TAFD65 | 2.0028 | 2.0028 | 5.27 | 0.996 | 5.53 | 0.970 | 0.175 |
| 717 | Hoya | TAFD65 | 2.0028 | 2.0028 | 5.27 | 0.996 | 5.53 | 0.969 | 0.175 |
| 718 | Sumita | K-PSFn202 | 2.0146 | 1.9928 | 6.22 | 0.997 | 5.39 | 0.944 | 0.175 |
| 719 | Schott | LASF35 | 2.0183 | 2.0015 | 5.41 | 0.991 | 5.36 | 0.939 | 0.175 |
| 720 | Schott | LASF35 | 2.0183 | 2.0015 | 5.41 | 0.991 | 5.55 | 0.969 | 0.175 |
| 721 | Sumita | K-PSFn202 | 2.0146 | 1.9928 | 6.22 | 0.997 | 5.50 | 0.948 | 0.172 |
| 722 | Sumita | K-PSFn202 | 2.0146 | 1.9928 | 6.22 | 0.997 | 5.57 | 0.941 | 0.169 |
| 723 | Hoya | TAFD65 | 2.0028 | 2.0028 | 5.27 | 0.996 | 5.90 | 0.973 | 0.165 |
| 724 | Hoya | E-FDS3 | 2.0278 | 2.0278 | 5.63 | 0.990 | 5.34 | 0.840 | 0.157 |
| 725 | Schott | LASF35 | 2.0183 | 2.0015 | 5.41 | 0.991 | 5.48 | 0.841 | 0.153 |
| 726 | Sumita | K-PSFn202 | 2.0146 | 1.9928 | 6.22 | 0.997 | 5.54 | 0.842 | 0.152 |
| 727 | Hoya | TAFD65 | 2.0028 | 2.0028 | 5.27 | 0.996 | 5.51 | 0.837 | 0.152 |

COMPARATIVE EXAMPLES

Comparative Examples are Shown in Table 12.

TABLE 12a

| | | Glass for B position | | | | |
|---|---|---|---|---|---|---|
| Ex | glass company: | glass name: | From n(400 nm) | To n(500 nm) | density [g/cm³] | Ti integral (400-500 nm) |
| 1201 | Schott | N-SF4 | 1.8094 | 1.7712 | 3.15 | 0.941 |
| 1202 | Hoya | M-NBFD10 | 1.8068 | 1.8068 | 4.39 | 0.954 |
| 1204 | Schott | N-SF4 | 1.8094 | 1.7712 | 3.15 | 0.941 |
| 1205 | Sumita | K-LaSFn9 | 1.8476 | 1.8261 | 4.96 | 0.975 |
| 1206 | Schott | N-SF66 | 2.0140 | 1.9487 | 4.00 | 0.825 |
| 1207 | Sumita | K-LaSFn10 | 1.8488 | 1.8261 | 4.8 | 0.971 |
| 1208 | Hoya | TAFD32 | 1.8429 | 1.8429 | 4.84 | 0.971 |
| 1209 | NHG | H-ZLaF68A | 1.9228 | 1.8955 | 5.47 | 0.976 |
| 1210 | Ohara | S-LAH58 | 1.9227 | 1.8955 | 5.52 | 0.966 |
| 1211 | Hikari | J-LASF08A | 1.9228 | 1.8956 | 5.41 | 0.971 |
| 1212 | Hoya | FDS18 | 1.8878 | 1.8878 | 3.51 | 0.694 |
| 1213 | Hoya | TAFD65 | 2.0028 | 2.0028 | 5.27 | 0.858 |
| 1214 | Schott | LASF35 | 2.0899 | 2.0425 | 5.41 | 0.855 |
| 1215 | Hoya | M-TAFD307 | 1.8517 | 1.8517 | 5.49 | 0.955 |
| 1216 | Schott | N-SF6HT | 1.8682 | 1.8237 | 3.37 | 0.953 |

TABLE 12a-continued

| | | Glass for G position | | | |
|---|---|---|---|---|---|
| Ex | glass company: | glass name: | From n(500 nm) | To n(570 nm) | density [g/cm$^3$] | Ti integral (500-570 nm) |
| 1201 | Hoya | BAF10 | 1.6530 | 1.6530 | 3.61 | 0.994 |
| 1202 | Schott | N-SF8 | 1.7017 | 1.6910 | 2.904 | 0.990 |
| 1204 | Schott | N-SF5 | 1.6848 | 1.6746 | 2.86 | 0.993 |
| 1205 | NHG | H-LaF53 | 1.7520 | 1.7447 | 4.15 | 0.998 |
| 1206 | Schott | N-SF14 | 1.7786 | 1.7645 | 3.12 | 0.990 |
| 1207 | Ohara | S-TIM28 | 1.7018 | 1.6910 | 2.98 | 0.992 |
| 1208 | Hoya | NBFD10 | 1.8060 | 1.8060 | 4.57 | 0.997 |
| 1209 | Schott | N-LASF9 | 1.8474 | 1.8347 | 4.41 | 0.993 |
| 1210 | Sumita | K-VC91 | 1.9013 | 1.8890 | 4.87 | 0.996 |
| 1211 | NHG | H-ZLaF65 | 1.8907 | 1.8768 | 4.55 | 0.979 |
| 1212 | Hikari | J-LASF017 | 1.8051 | 1.7967 | 4.34 | 0.994 |
| 1213 | Sumita | K-VC91 | 1.9013 | 1.8890 | 4.87 | 0.996 |
| 1214 | Schott | N-SF57HT | 1.8675 | 1.8499 | 3.53 | 0.982 |
| 1215 | Ohara | S-NBH53V | 1.7513 | 1.7401 | 3.19 | 0.996 |
| 1216 | Schott | N-BASF64 | 1.7144 | 1.7057 | 3.2 | 0.978 |

TABLE 12b

| | | Glass for R position | | | | | totals | | |
|---|---|---|---|---|---|---|---|---|---|
| Ex | glass company: | glass name: | From n(610 nm) | To n(760 nm) | density [g/cm$^3$] | Ti integral (610-760 nm) | average density | T = $(T_{red} \cdot T_{blue} \cdot T_{green})^{1/3}$ | FoM $(T_{red} \cdot T_{blue} \cdot T_{green})^{1/3}/$ average density |
| 1201 | Schott | N-BAK4 | 1.5677 | 1.5625 | 3.046 | 0.998 | 3.27 | 0.977 | 0.2992 |
| 1202 | Hikari | J-PSK03 | 1.6020 | 1.5971 | 3.52 | 0.989 | 3.60 | 0.977 | 0.2712 |
| 1203 | Schott | N-SK11 | 1.5628 | 1.5580 | 3.08 | 0.998 | 3.03 | 0.977 | 0.3227 |
| 1204 | Ohara | S-BAM4 | 1.6041 | 1.5972 | 2.91 | 0.997 | 4.01 | 0.990 | 0.2470 |
| 1205 | Schott | N-SF10 | 1.7256 | 1.7134 | 3.05 | 0.992 | 3.39 | 0.932 | 0.2751 |
| 1206 | NHG | H-ZK14 | 1.6020 | 1.5968 | 3.4 | 0.998 | 3.73 | 0.987 | 0.2648 |
| 1207 | Hoya | M-BACD15 | 1.6096 | 1.6096 | 3.02 | 0.997 | 4.14 | 0.988 | 0.2385 |
| 1208 | NHG | H-LaK1 | 1.6582 | 1.6523 | 3.64 | 0.998 | 4.51 | 0.989 | 0.2194 |
| 1209 | Schott | N-KZFS5 | 1.6523 | 1.6441 | 3.041 | 0.998 | 4.48 | 0.986 | 0.2203 |
| 1210 | NHG | H-LaK10 | 1.6499 | 1.6439 | 3.72 | 0.998 | 4.56 | 0.982 | 0.2154 |
| 1211 | Hoya | BACED5 | 1.6412 | 1.6412 | 3.64 | 0.997 | 3.83 | 0.883 | 0.2305 |
| 1212 | Sumita | K-LaSKn1 | 1.7534 | 1.746 | 4.51 | 0.998 | 4.88 | 0.948 | 0.1942 |
| 1213 | Schott | N-SF11 | 1.7815 | 1.7671 | 3.22 | 0.993 | 4.06 | 0.941 | 0.2321 |
| 1214 | Sumita | K-BaSF4 | 1.6495 | 1.6411 | 2.96 | 0.998 | 3.88 | 0.983 | 0.2533 |
| 1215 | Schott | N-SK2 | 1.6062 | 1.6007 | 3.55 | 0.998 | 3.37 | 0.976 | 0.2894 |
| 1216 | Sumita | K-VC79 | 1.6092 | 1.6037 | 3.09 | 0.997 | 3.90 | 0.987 | 0.2528 |

REFERENCE LIST

101 Substrate
106 Backwards direction
107 Forwards direction
201 Coating
202 Projector
203 Overlaid image
204 Real world image
301 Screen
501 Optical element
502 Spacer
503 Coating
601 Width
602 Length
603 Thickness
604 Front face
605 Back face
801 Light guiding fiber
802 Light path
803 Light trap
804 Target
805 Camera

The invention claimed is:

1. A device comprising:
   a. a grouping of x optical elements, wherein each of the optical elements has a front face and a back face, wherein the x optical elements are arranged in a stack from first to last in which the front face of an optical element faces the back face of the next optical element; and
   b. a spacer region made of a material having a refractive index below 1.4 for vacuum wavelengths in the range from 400 to 760 nm located between each pair of adjacent optical elements,
   wherein:
   x is an integer that is at least 3,
   the grouping of x optical elements comprises a first R-type optical element, a first G-type optical element and a first B-type optical element,
   $R_{610}$ is the refractive index of the first R-type optical element for light of vacuum wavelength 610 nm;
   $R_{760}$ is the refractive index of the first R-type optical element for light of vacuum wavelength 760 nm;
   $G_{500}$ is the refractive index of the first G-type optical element for light of vacuum wavelength 500 nm;
   $G_{610}$ is the refractive index of the first G-type optical element for light of vacuum wavelength 610 nm;

$B_{400}$ is the refractive index of the first B-type optical element for light of vacuum wavelength 400 nm;

$B_{500}$ is the refractive index of the first B-type optical element for light of vacuum wavelength 500 nm;

$n_0$ is the minimum selected from $R_{760}$, $G_{610}$ and $B_{500}$;

$\delta$ is the difference between $n_0$ and the maximum selected from $R_{610}$, $G_{500}$ and $B_{400}$;

$n_0$ is in the range from 1.550 to 2.500;

$\delta$ is equal to or less than 0.200.

2. The device according to claim 1, wherein one or more of the following is satisfied:

i.) $n_0$ is in the range from 1.550 to less than 1.600 and $\delta$ satisfies:

$\delta \leq 0.05(1+(n_0-1.54)*10/6)$;

ii.) $n_0$ is in the range from 1.600 to less than 1.650 and $\delta$ satisfies:

$\delta \leq 0.05(1+(n_0-1.52)*10/6)$;

iii.) $n_0$ is in the range from 1.650 to less than 1.700 and $\delta$ satisfies:

$\delta \leq 0.05(1+(n_0-1.54)*10/6)$;

iv.) $n_0$ is in the range from 1.700 to less than 1.750 and $\delta$ satisfies:

$\delta \leq 0.05(1+(n_0-1.58)*10/6)$;

v.) $n_0$ is in the range from 1.750 to less than 1.800 and $\delta$ satisfies:

$\delta \leq 0.05(1+(n_0-1.34)*10/6)$;

vi.) $n_0$ is in the range from 1.800 to less than 1.850 and $\delta$ satisfies:

$\delta \leq 0.05(1+(n_0-1.40)*10/6)$;

vii.) $n_0$ is in the range from 1.850 to less than 1.900 and $\delta$ satisfies:

$\delta \leq 0.05(1+(n_0-1.43)*10/6)$;

viii.) $n_0$ is in the range from 1.900 to less than 1.950 and $\delta$ satisfies:

$\delta \leq 0.05(1+(n_0-0.39)*10/6)$;

ix.) $n_0$ is in the range from 1.950 to less than 2.300 and $\delta$ satisfies:

$\delta \leq 0.05(1+(n_0-0.30)*10/6)$.

3. The device according to claim 1, wherein one or more of the optical elements has a coating.

4. The device according to claim 1, wherein the first R-type optical element is at least 50% by volume of a material A; the first G-type optical element is at least 50% by volume of a material B; and the first B-type optical element is at least 50% by volume of a material C; wherein A, B and C are different materials.

5. The device according to claim 1, wherein the x optical elements comprise an optical element which comprises a material selected from the group consisting of: a glass, a ceramic, a crystal, a polymer and a combination of two or more thereof.

6. The device according to claim 1, wherein the first R-type optical element is separated from the first G-type optical element by a distance RG, the first R-type optical element is separated from the first B-type optical element by a distance RB and the first G-type optical element is separated from the first B-type optical element by a distance GB, wherein RG, RB and GB are each less than 500 µm.

7. The device according to claim 3, wherein one or more of the following is satisfied by one or more of the x optical elements:
a. A thickness of in the range from 10 to 1500 µm;
b. A radius of curvature greater than 600 mm;
c. An optical loss measured perpendicular to the front face of at most 25%;
d. A surface roughness of the optical element of less than 5 nm;
e. A surface roughness of the coating of less than 5 nm;
f. Maximum thickness variation over the area of the optical element of less than 5 µm;
g. A min-max local thickness variation over 75% of the total area of the optical element of less than 5 µm;
h. A warp of less than 350 µm;
i. A bow of less than 300 µm.

8. The device according to claim 1, wherein one or more of the x optical elements comprises a coupler for coupling light into or decoupling light out of the optical element.

9. The device according to claim 1, wherein one or more of the following criteria are satisfied:
a. $n_0$ is in the range from 1.550 to less than 1.600 and the value of the geometric mean of the integrated internal transmission in RGB-range divided by the average density is at least 0.263 $g^{-1} \cdot cm^3$;
b. $n_0$ is in the range from 1.600 to less than 1.650 and the value of the geometric mean of the integrated internal transmission in RGB-range divided by the average density is at least 0.260 $g^{-1} \cdot cm^3$;
c. $n_0$ is in the range from 1.650 to less than 1.700 and the value of the geometric mean of the integrated internal transmission in RGB-range divided by the average density is at least 0.261 $g^{-1} \cdot cm^3$;
d. $n_0$ is in the range from 1.700 to less than 1.750 and the value of the geometric mean of the integrated internal transmission in RGB-range divided by the average density is at least 0.230 $g^{-1} \cdot cm^3$;
e. $n_0$ is in the range from 1.750 to less than 1.800 and the value of the geometric mean of the integrated internal transmission in RGB-range divided by the average density is at least 0.220 $g^{-1} \cdot cm^3$;
f. $n_0$ is in the range from 1.800 to less than 1.850 and the value of the geometric mean of the integrated internal transmission in RGB-range divided by the average density is at least 0.200 $g^{-1} \cdot cm^3$;
g. $n_0$ is in the range from 1.850 to less than 1.900 and the value of the integrated internal transmission in RGB-range divided by the average density is at least 0.190 $g^{-1} \cdot cm^3$;
h. $n_0$ is in the range from 1.900 to less than 1.950 and the value of the integrated internal transmission in RGB-range divided by the average density is at least 0.180 $g^{-1} \cdot cm^3$;
i. $n_0$ is in the range from 1.950 to less than 2.000 and the value of the integrated internal transmission in RGB-range divided by the average density is at least 0.173 $g^{-1} \cdot cm^3$.

10. A kit comprising two or more devices according to claim 1.

11. A process for creating a visual impression comprising the following steps:
a. Providing a device according to claim 1;
b. Coupling a generated light image into the device;
c. Decoupling the generated light image out of the device.

12. A kit of x optical elements, each of the x optical elements comprising an R-type optical element, a G-type optical element and a B-type optical element, wherein:

$R_{610}$ is the refractive index of the first R-type optical element for light of vacuum wavelength 610 nm;

$R_{760}$ is the refractive index of the first R-type optical element for light of vacuum wavelength 760 nm;

$G_{500}$ is the refractive index of the first G-type optical element for light of vacuum wavelength 500 nm;

$G_{610}$ is the refractive index of the first G-type optical element for light of vacuum wavelength 610 nm;

$B_{400}$ is the refractive index of the first B-type optical element for light of vacuum wavelength 400 nm;

$B_{500}$ is the refractive index of the first B-type optical element for light of vacuum wavelength 500 nm;

$n_0$ is the minimum selected from $R_{760}$, $G_{610}$ and $B_{500}$;

$\delta$ is the difference between $n_0$ and the maximum selected from $R_{610}$, $G_{500}$ and $B_{400}$;

$n_0$ is in the range from 1.550 to 2.500;

$\delta$ is equal to or less than 0.200.

13. The kit according to claim 12, wherein one or more of the optical elements is a wafer having a front face.

14. The kit according to claim 13, wherein one or more of the optical elements has a coating.

15. The kit according to claim 14, wherein one or more of the wafers satisfies one or more of the following criteria:
  a. The front face has a surface area in the range from 0.010 to 0.500 m²;
  b. A thickness $d_s$ in the range from 10 to 1500 μm;
  c. A radius of curvature greater than 600 mm;
  d. An in-plane optical loss measured perpendicular to the front face of at most 20%;
  e. A surface roughness of the wafer of less than 5 nm;
  f. A surface roughness of the coating of less than 5 nm;
  g. Total thickness variation of less than 5 μm;
  h. A min-max local thickness variation over 75% of the front face of less than 5 μm;
  i. A warp of less than 350 μm;
  j. A bow of less than 300 μm;
  k. A square or circular shape;
  l. Has an indentation of depth in the range from 100 μm to 5 mm.

16. A process for making a device comprising the following steps:
  a. Providing a kit according to claim 12;
  b. Reducing the surface area of the front face of each of the optical elements to obtain portions;
  c. Providing the portions as a viewing screen in the device.

17. A device obtainable by the process of claim 15.

18. A process for preparing a set of three optical elements comprising the following steps:
  a. Providing a group of at least two optical elements; wherein each optical element has:
    a refractive index $R_{610}$ for light of vacuum wavelength 610 nm;
    a refractive index $R_{760}$ for light of vacuum wavelength 760 nm;
    a refractive index $G_{500}$ for light of vacuum wavelength 500 nm;
    a refractive index $G_{610}$ for light of vacuum wavelength 610 nm;
    a refractive index $B_{400}$ for light of vacuum wavelength 400 nm;
    a refractive index $B_{500}$ for light of vacuum wavelength 500 nm;
  b. For a value of $n_0$ in the range from 1.550 to 2.500 and for a value of $\delta$ of 0.200 or less, selecting from the following:
    i. A first optical element satisfying the following:
      a) $R_{760} \geq n_0$;
      b) $R_{610} \leq n_0 \delta$;
    ii. A second optical element satisfying the following:
      a) $G_{610} \geq n_0$;
      b) $G_{500} \leq n_0 + \delta$;
    iii. A third optical element satisfying the following:
      a) $B_{500} \geq n_0$;
      b) $B_{400} \leq n_0 + \delta$.

* * * * *